US009434471B2

(12) United States Patent
Arlton et al.

(10) Patent No.: US 9,434,471 B2
(45) Date of Patent: *Sep. 6, 2016

(54) ROTARY WING VEHICLE

(71) Applicants: Paul E Arlton, West Lafayette, IN (US); David J Arlton, Lafayette, IN (US)

(72) Inventors: Paul E Arlton, West Lafayette, IN (US); David J Arlton, Lafayette, IN (US)

(*) Notice: Subject to any disclaimer, the term of this patent is extended or adjusted under 35 U.S.C. 154(b) by 188 days.

This patent is subject to a terminal disclaimer.

(21) Appl. No.: 13/899,252

(22) Filed: May 21, 2013

(65) Prior Publication Data

US 2014/0091172 A1  Apr. 3, 2014

Related U.S. Application Data

(60) Continuation-in-part of application No. 13/270,872, filed on Oct. 11, 2011, now Pat. No. 8,469,307, and a division of application No. 12/872,622, filed on Aug. 31, 2010, now Pat. No. 8,042,763, and a division of application No. 11/105,746, filed on Apr. 14, 2005, now Pat. No. 7,789,341.

(60) Provisional application No. 61/649,741, filed on May 21, 2012, provisional application No. 61/799,878, filed on Mar. 15, 2013.

(51) Int. Cl.
*B64C 27/10* (2006.01)
*B64C 27/605* (2006.01)
*B64C 7/00* (2006.01)
*B64C 39/02* (2006.01)
*B64C 27/14* (2006.01)
*B64C 27/82* (2006.01)

(52) U.S. Cl.
CPC ............... *B64C 27/10* (2013.01); *B64C 7/00* (2013.01); *B64C 27/14* (2013.01); *B64C 27/605* (2013.01); *B64C 39/024* (2013.01); *B64C 2027/8236* (2013.01); *B64C 2027/8281* (2013.01); *B64C 2201/027* (2013.01); *B64C 2201/042* (2013.01); *B64C 2201/082* (2013.01); *B64C 2201/102* (2013.01); *B64C 2201/108* (2013.01); *B64C 2201/141* (2013.01); *B64C 2201/146* (2013.01); *B64C 2201/165* (2013.01); *B64C 2201/201* (2013.01); *B64C 2201/203* (2013.01); *B64C 2201/205* (2013.01)

(58) Field of Classification Search
CPC ............................. B64C 27/10; B64C 27/605
See application file for complete search history.

(56) References Cited

U.S. PATENT DOCUMENTS 1,769,203 A    7/1930   Buckley
2,406,625 A    8/1946   Oglesby (Continued)

FOREIGN PATENT DOCUMENTS

EP    1384662 B1    1/2004
EP    0757647 B1    2/2006

(Continued)

OTHER PUBLICATIONS

European Search Report and Written Opinion for Application No. 14002518.0-1757 / 2799332, Feb. 24, 2015, 6 pages.

(Continued)

*Primary Examiner* — Joseph W Sanderson
(74) *Attorney, Agent, or Firm* — Barnes & Thornburg LLP

(57) ABSTRACT

A rotary wing vehicle includes a body structure having an elongated tubular backbone or core, and a counter-rotating coaxial rotor system having rotors with each rotor having a separate motor to drive the rotors about a common rotor axis of rotation. The rotor system is used to move the rotary wing vehicle in directional flight.

45 Claims, 54 Drawing Sheets

(56) References Cited

U.S. PATENT DOCUMENTS

| | | | |
|---|---|---|---|
| 2,481,745 A * | 9/1949 | Hiller, Jr. | 416/115 |
| 2,486,059 A | 10/1949 | Pentecost | |
| 2,497,040 A * | 2/1950 | Williams | 416/143 |
| 3,118,504 A | 1/1964 | Cresap | |
| 3,149,803 A | 9/1964 | Petrides et al. | |
| 3,570,787 A | 3/1971 | Stahmer | |
| 3,612,444 A | 10/1971 | Girard | |
| 3,643,599 A | 2/1972 | Hubich | |
| 3,722,830 A | 3/1973 | Barber | |
| 4,080,922 A | 3/1978 | Brubaker | |
| 4,170,437 A | 10/1979 | Korsak | |
| 4,267,987 A | 5/1981 | McDonnell | |
| 4,478,379 A | 10/1984 | Kerr | |
| 5,015,187 A | 5/1991 | Lord | |
| 5,058,824 A | 10/1991 | Cycon et al. | |
| 5,497,960 A | 3/1996 | Previnaire | |
| 6,179,247 B1 | 1/2001 | Milde, Jr. | |
| 6,343,768 B1 | 2/2002 | Muldoon | |
| 6,347,764 B1 | 2/2002 | Brandon et al. | |
| 6,402,031 B1 | 6/2002 | Hall | |
| 6,450,445 B1 | 9/2002 | Moller | |
| 7,789,341 B2 | 9/2010 | Arlton et al. | |
| 8,042,763 B2 | 10/2011 | Arlton et al. | |
| 8,052,500 B2 | 11/2011 | Van de Rostyne et al. | |
| 8,083,173 B2 | 12/2011 | Arlton et al. | |
| 8,469,307 B2 * | 6/2013 | Arlton et al. | 244/17.23 |
| 2012/0025012 A1 | 2/2012 | Arlton et al. | |

FOREIGN PATENT DOCUMENTS

| | | | |
|---|---|---|---|
| FR | 2 735 200 A1 | 12/1996 | |
| JP | 2002-316699 A | 10/2002 | |
| WO | 03/059735 A2 | 7/2003 | |
| WO | 2004085249 A1 | 10/2004 | |
| WO | WO 2004085249 A1 * | 10/2004 | B64C 27/43 |

OTHER PUBLICATIONS

Supplementary European Search Report, European Application No. 05 76 1246, dated Aug. 16, 2011.

Predator Unmanned Aerial Vehicle (UAV), USA, www.airforce-technology.com/projects/predator, printed Dec. 16, 2002.

International Search Report and Written Opinion for PCT/US05/12560, dated Jun. 25, 2008.

PCT International Search Report and Written Opinion completed Mar. 7, 2014 and issued in connection with PCT/US2013/042026.

* cited by examiner

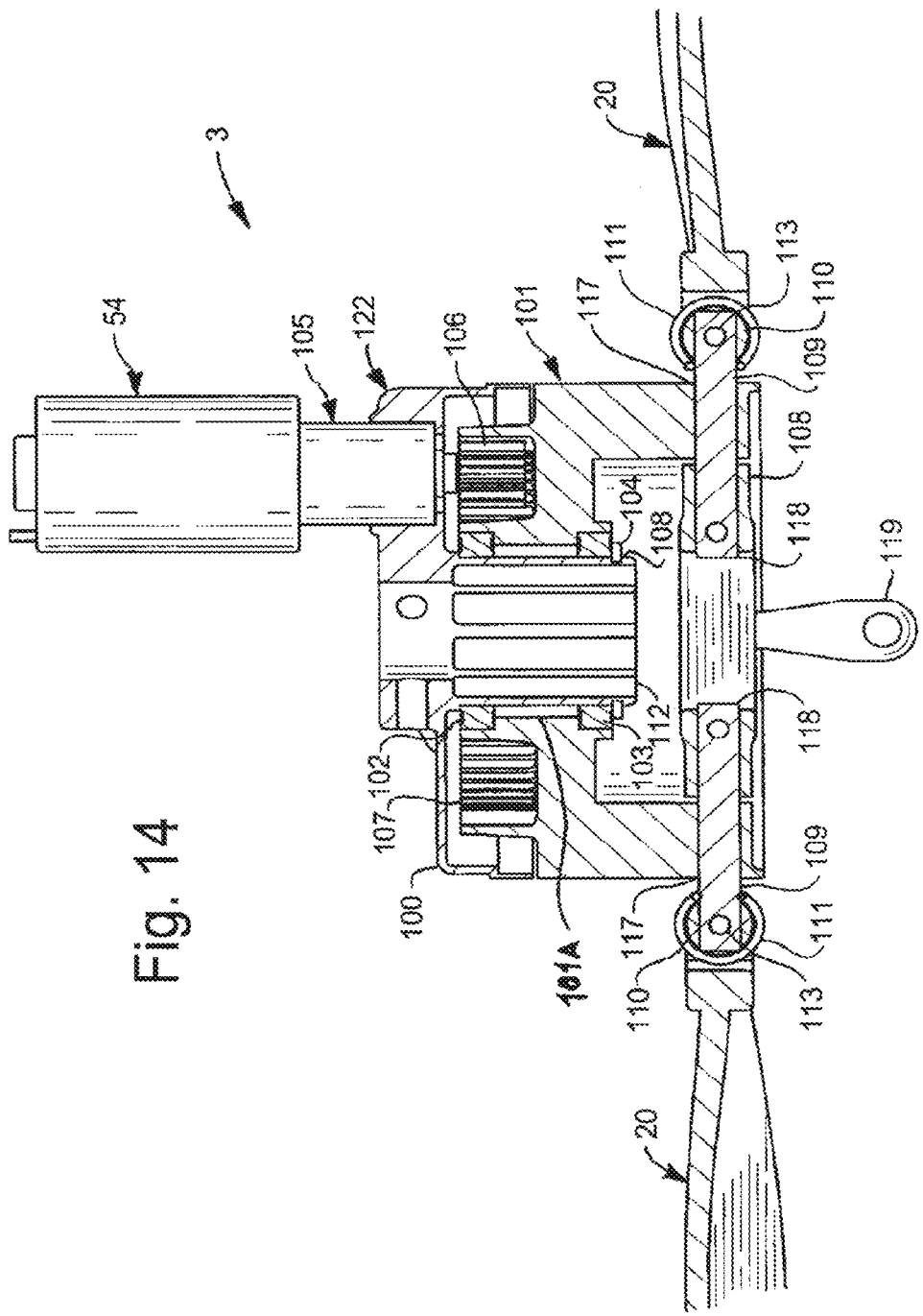

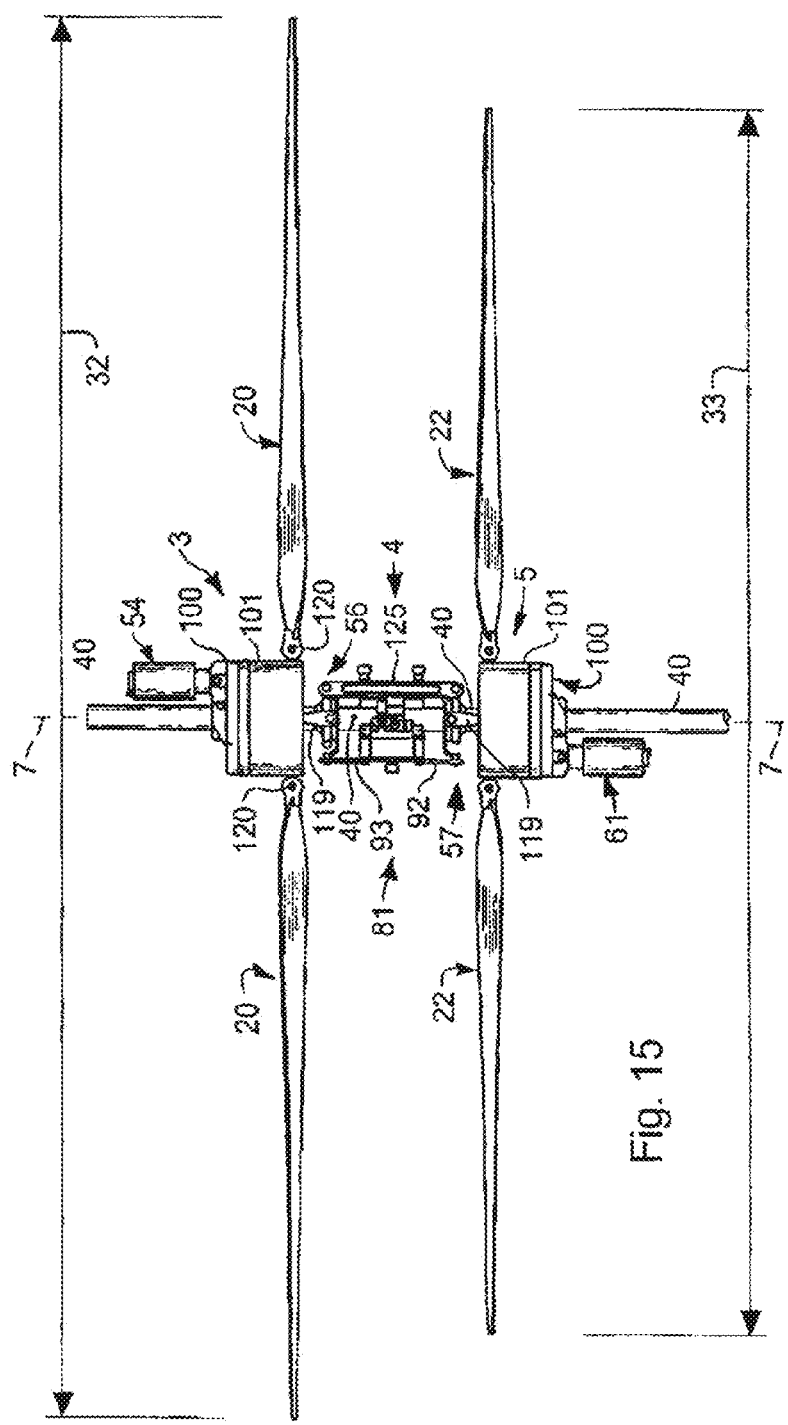

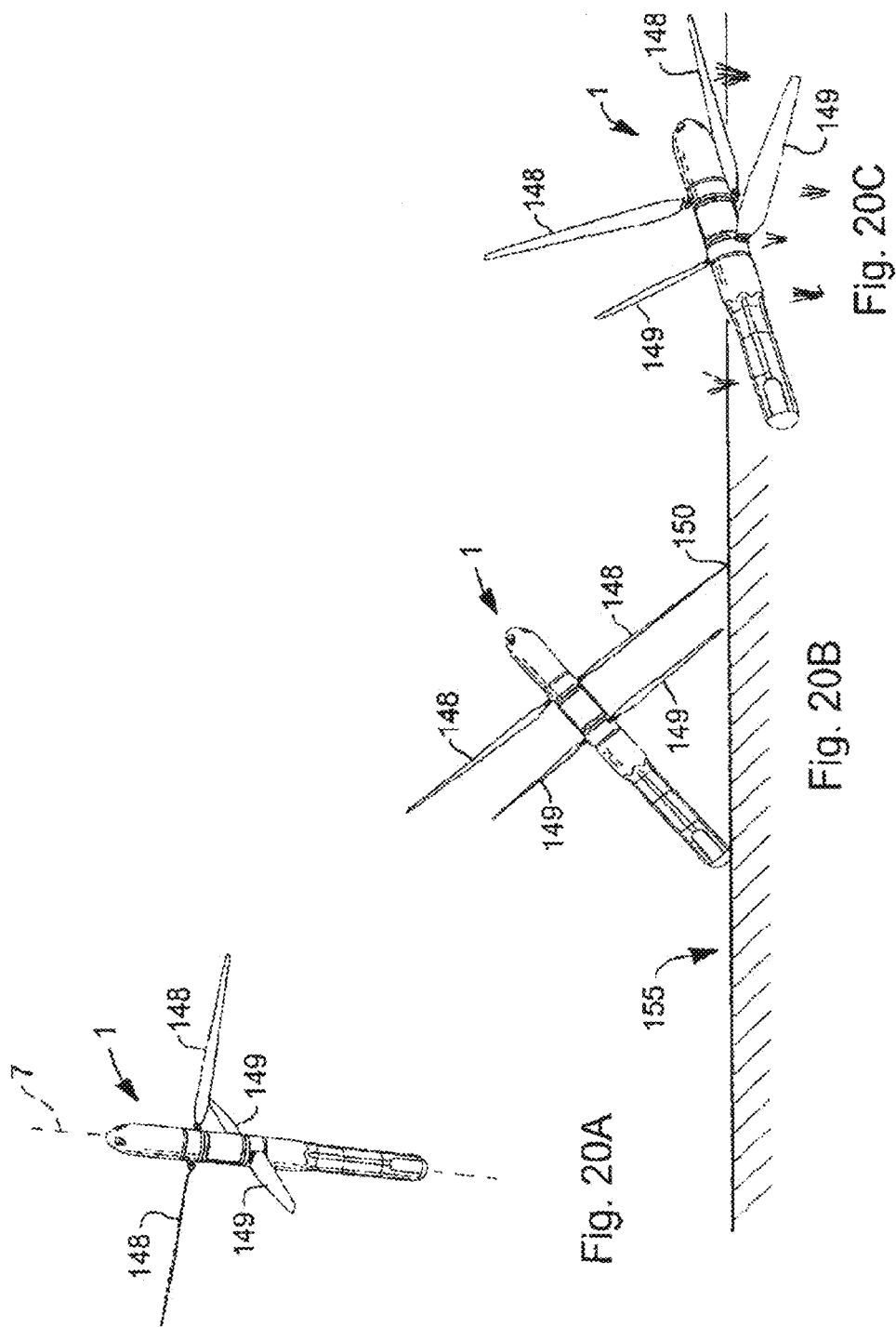

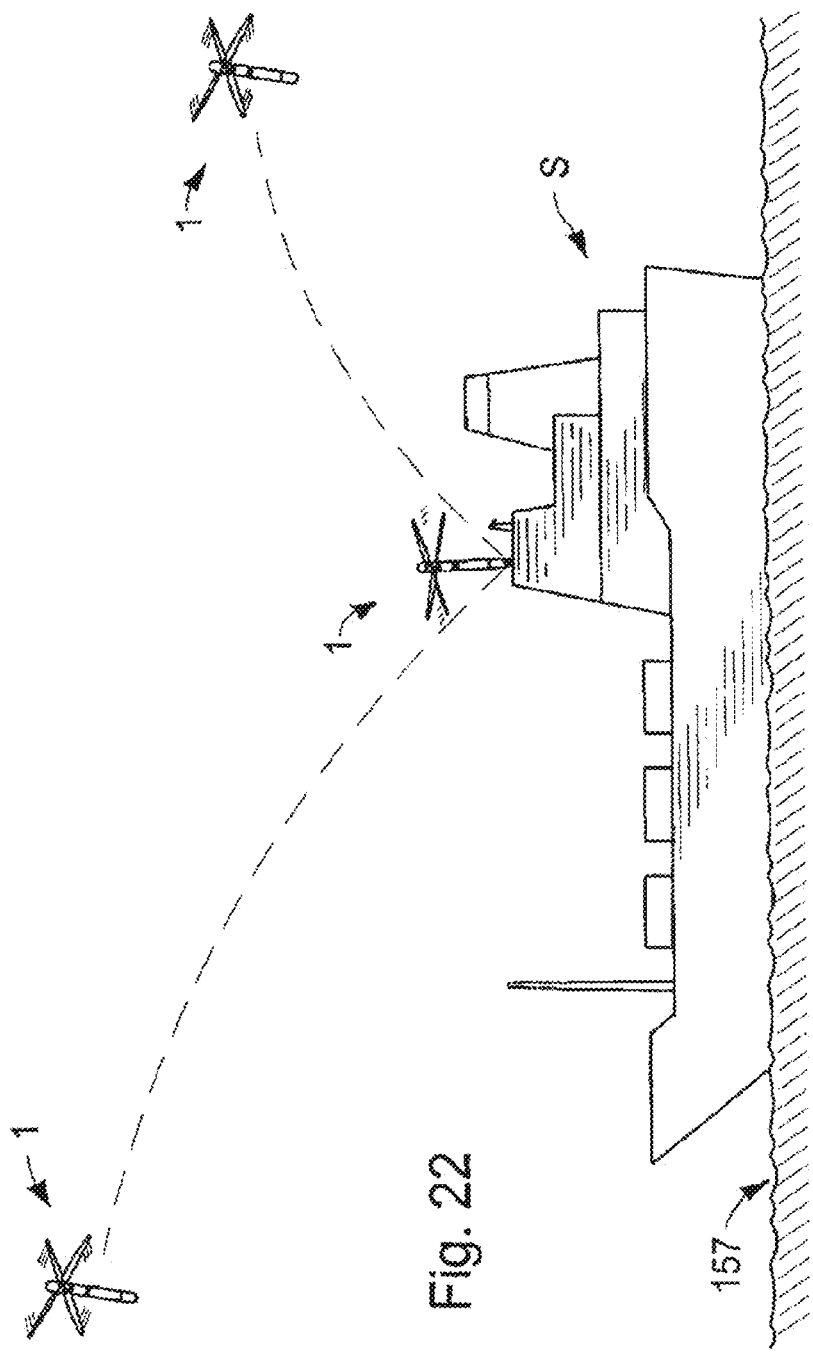

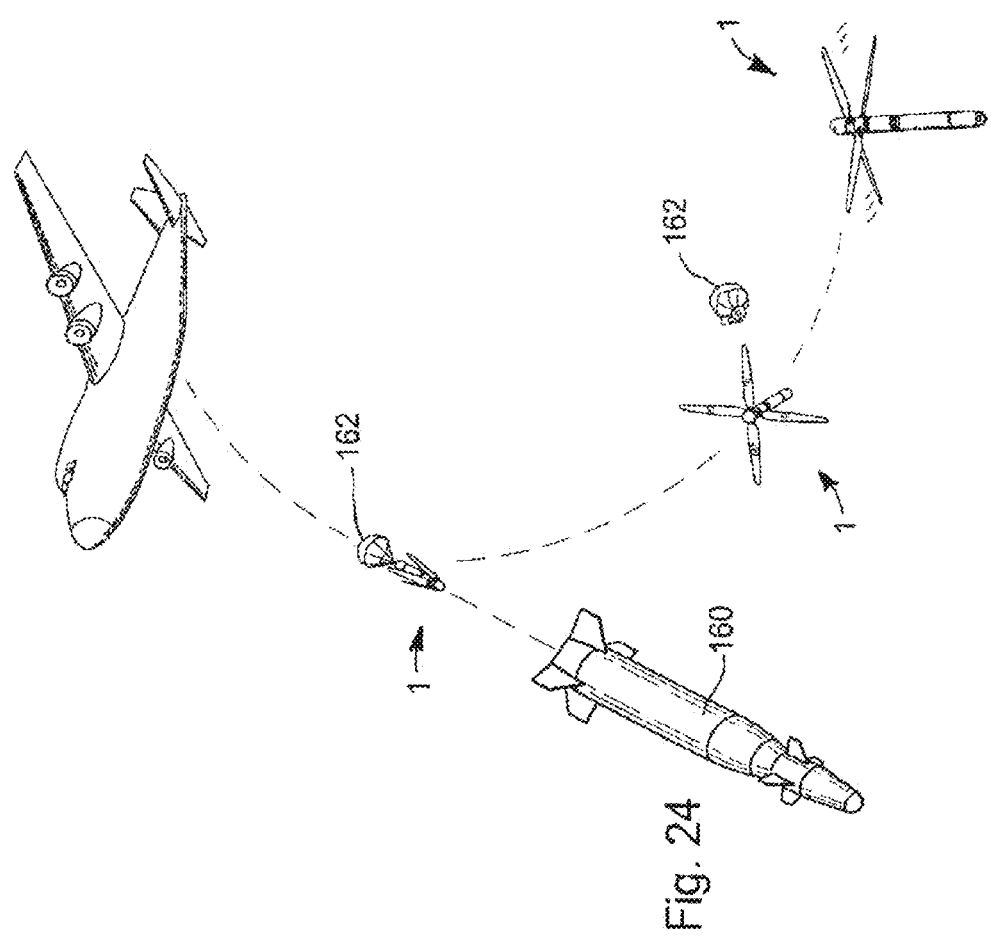

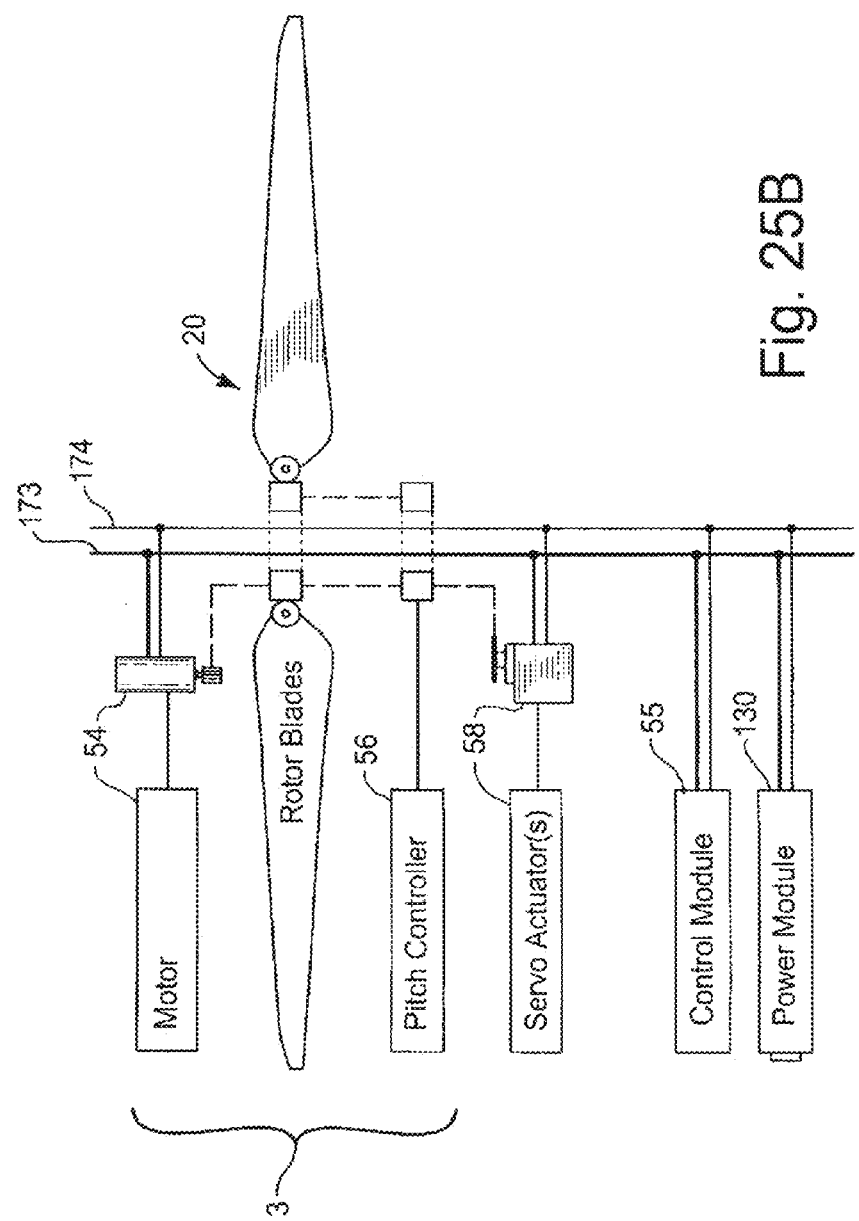

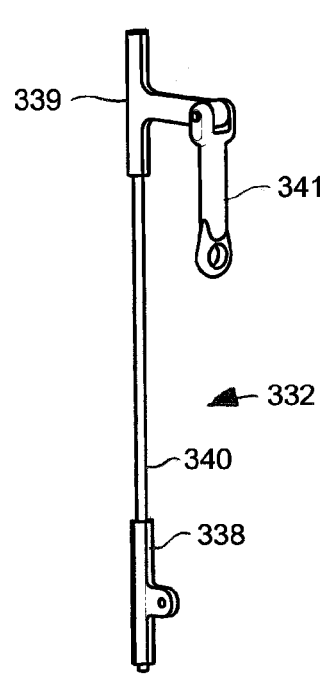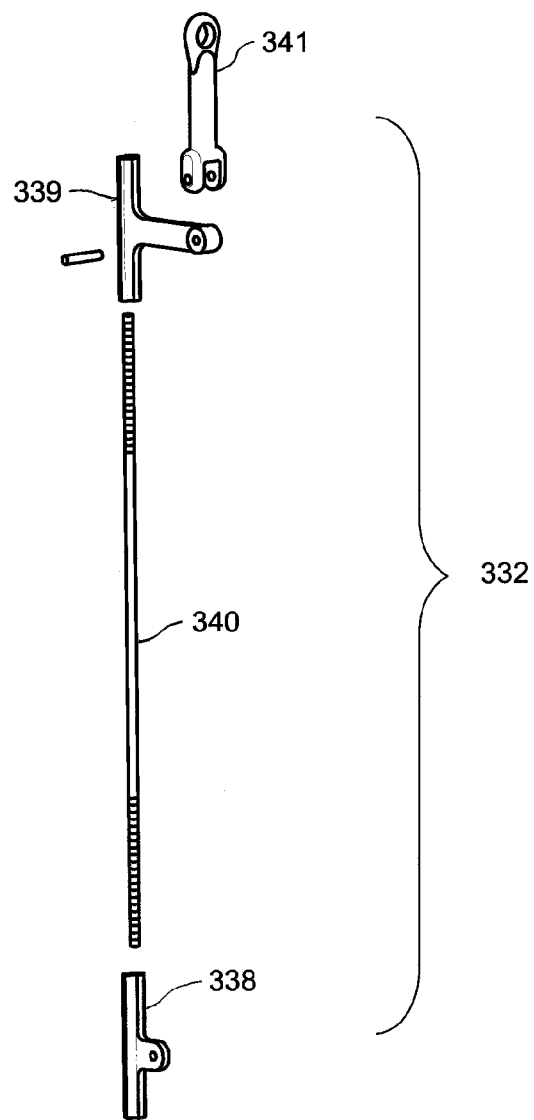
Fig. 44A
Fig. 44B

SECTION A-A

ROTARY WING VEHICLE

RELATED APPLICATIONS

This application is a continuation-in-part of U.S. application Ser. No. 13/270,872, filed Oct. 11, 2011, which is a divisional of U.S. application Ser. No. 12/872,622, filed Aug. 31, 2010 (now U.S. Pat. No. 8,042,763, issued Oct. 25, 2011), which is a divisional of U.S. application Ser. No. 11/105,746, filed Apr. 14, 2005 (now U.S. Pat. No. 7,789, 341, issued Sep. 7, 2010), all of which are incorporated by reference herein in their entirety. This application also claims priority under 35 U.S.C. §119(e) to U.S. Provisional Application Ser. No. 61/649,741, filed May 21, 2012 and U.S. Provisional Application Ser. No. 61/799,878, filed Mar. 15, 2013, both of which are incorporated by reference herein in their entirety. This application is also related to U.S. Provisional Application No. 60/562,081, filed Apr. 14, 2004, which is incorporated by reference herein in its entirety.

BACKGROUND

The present disclosure relates to aerial vehicles and particularly to unmanned aerial vehicles (UAV). More particularly, the present disclosure relates to unmanned rotary wing vehicles.

Rotary wing vehicles are used in a variety of applications. Unmanned rotary wing vehicles are often used by the military, law enforcement agencies, and commercial activities for aerial reconnaissance operations.

SUMMARY

A rotary wing vehicle, in accordance with the present disclosure includes a body structure having an elongated tubular backbone or core and a counter-rotating coaxial rotor system having rotors with each rotor having a separate motor to drive the rotors about a common rotor axis of rotation. A power source comprising, for example, a battery, fuel cell, or hybrid gas-electric generator is provided to supply electric power to the motors. Power transmission to and between the rotor systems is accomplished primarily by means of electrical wiring instead of mechanical shafting. A modular structure is described which assists manufacturability.

In illustrative embodiments, a torque tube is provided to transmit mechanical power inside the non-rotating tubular backbone creating a modular mast structure that can be used to support coaxial rotor systems on many types of vehicles.

In illustrative embodiments, a blade pitch control system is located between the rotor blades. A fixed, non-rotating body shell or aerodynamic fairing may be provided between the upper and lower rotors to protect the pitch control system and airframe against the elements and to reduce aerodynamic drag of the aircraft.

In illustrative embodiments, an auxiliary power-pack is provided which is separable from the vehicle in flight to facilitate, for instance, delivery of the vehicle to a distant location. In another embodiment, the power-pack comprises a payload such as an explosive munition, dipping sonar, hydrophones, or a separable sonobouy module. While aspects of the disclosure are applicable to many helicopters, including full-sized man carrying helicopters, the current disclosure is especially well suited for application to autonomous or radio-controlled rotary wing aircraft known as remotely piloted vehicles (RPVs), or unmanned aerial vehicles (UAVs).

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 14 is a sectional view taken along lines 14-14 of FIG. 2B, showing the rotor module;

FIG. 15 is a side elevation view of the counter-rotating coaxial rotor system of FIG. 2A, and a core tube depending from the rotor system;

Figures 21A, 21B:
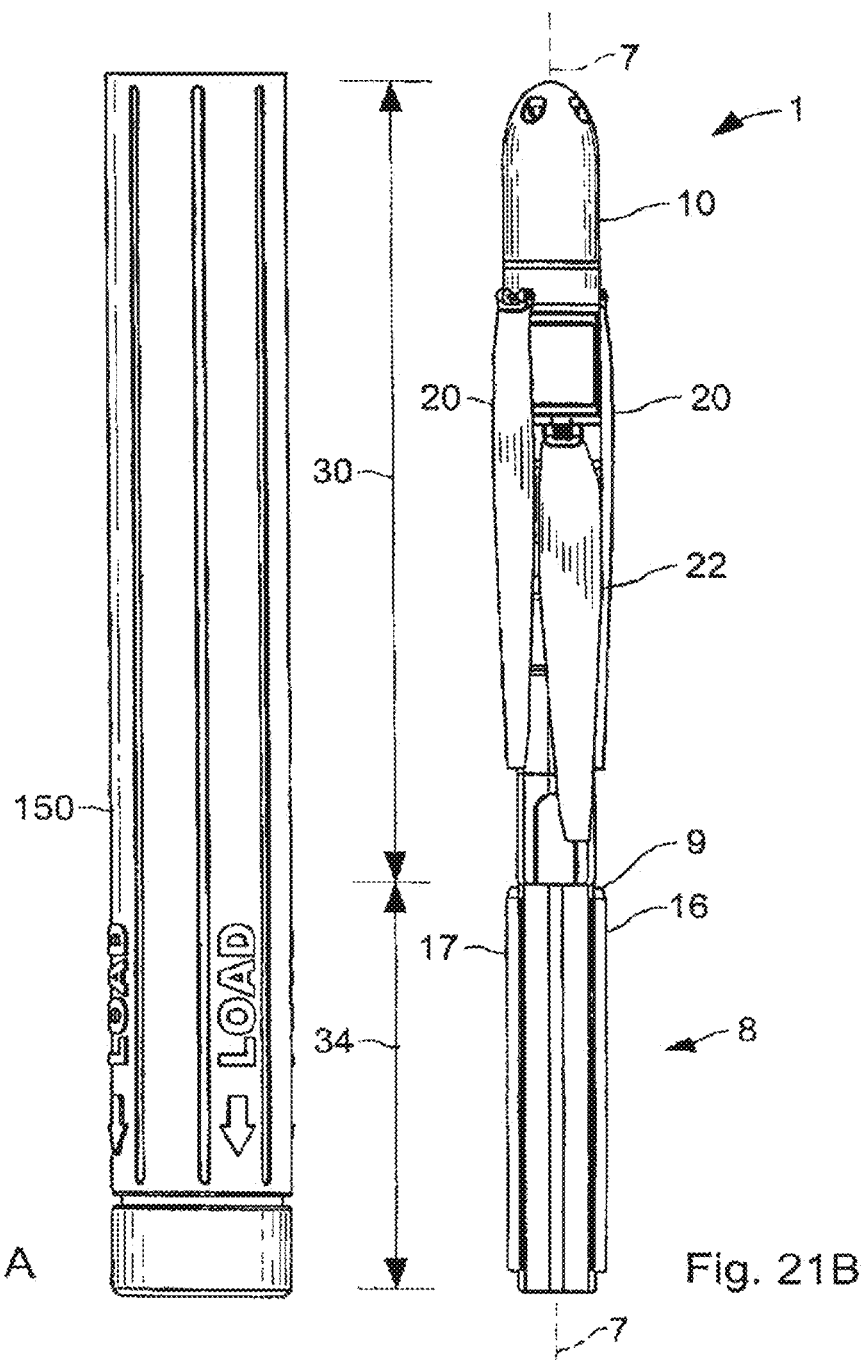
Figure 23:
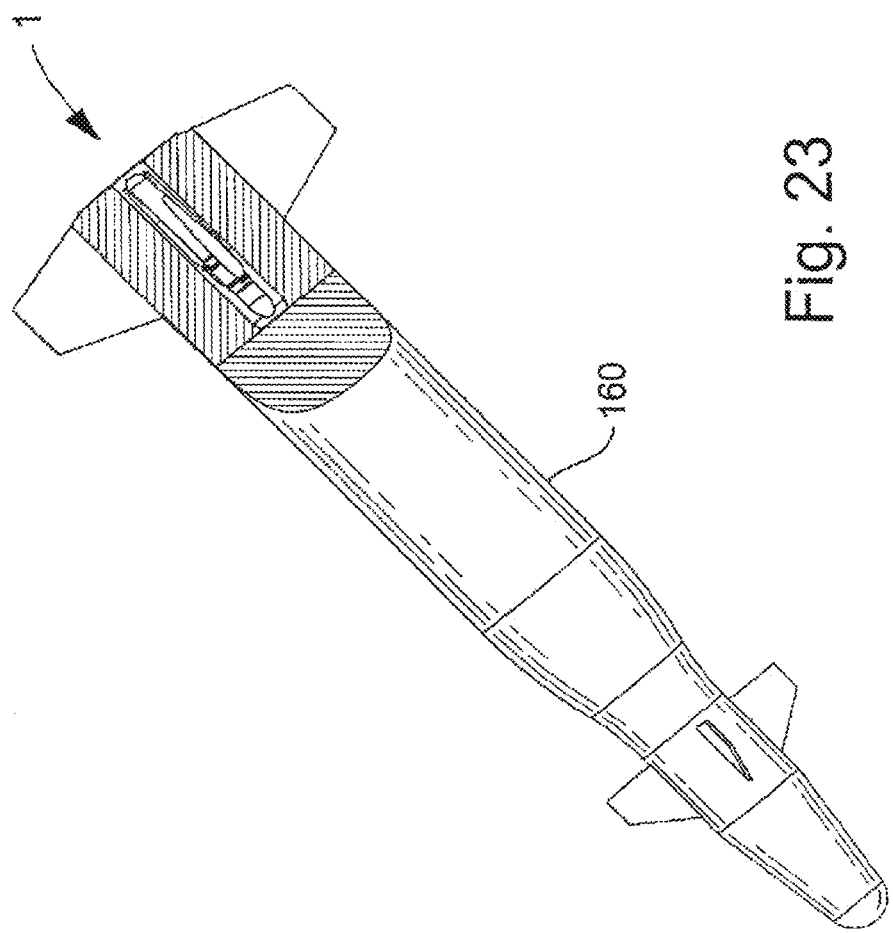
Figure 25A:
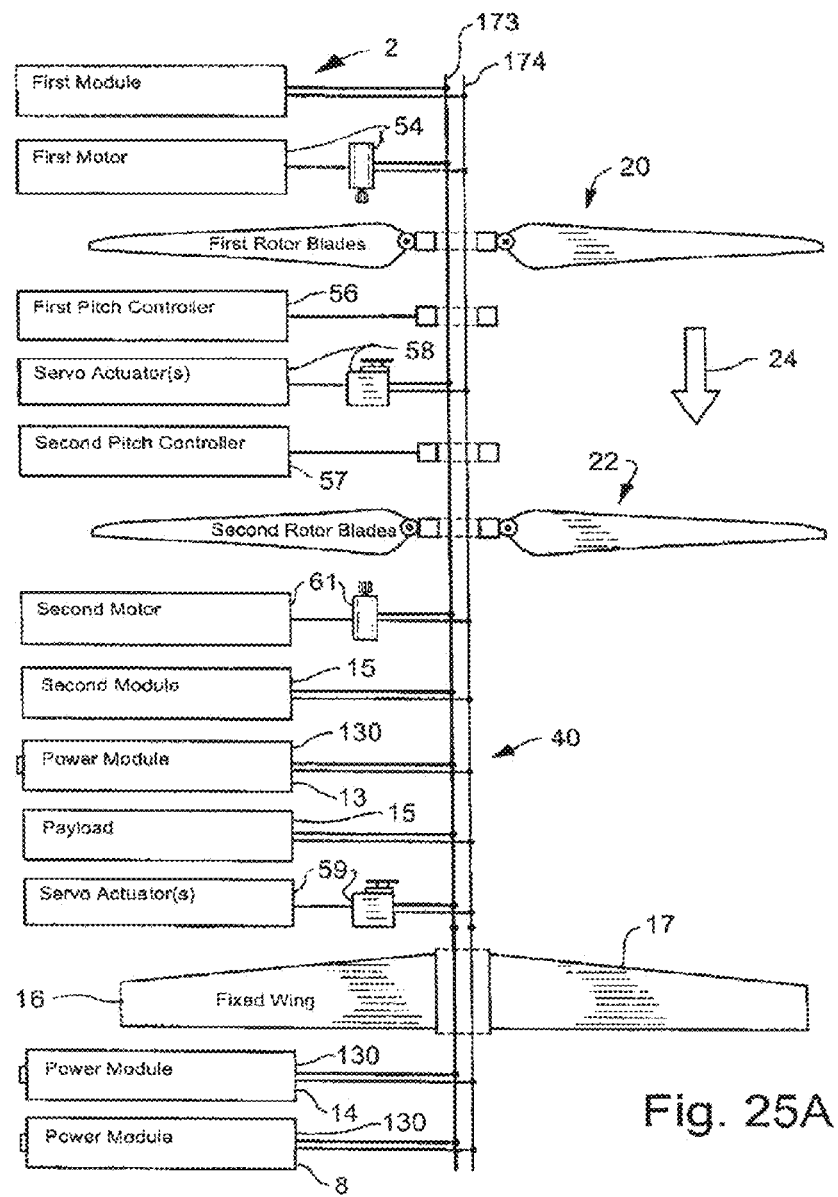
Figure 26:
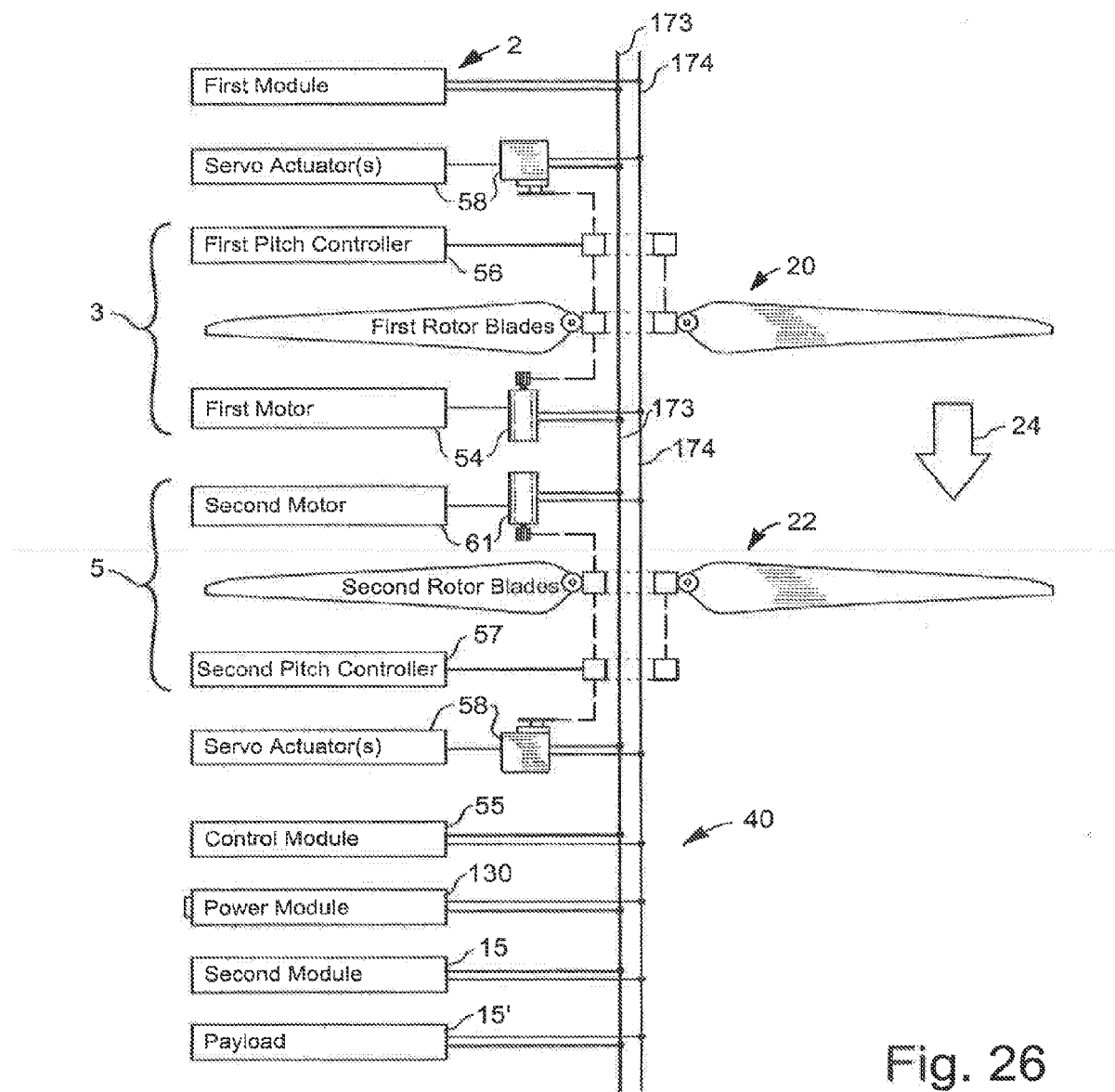
Figure 27:
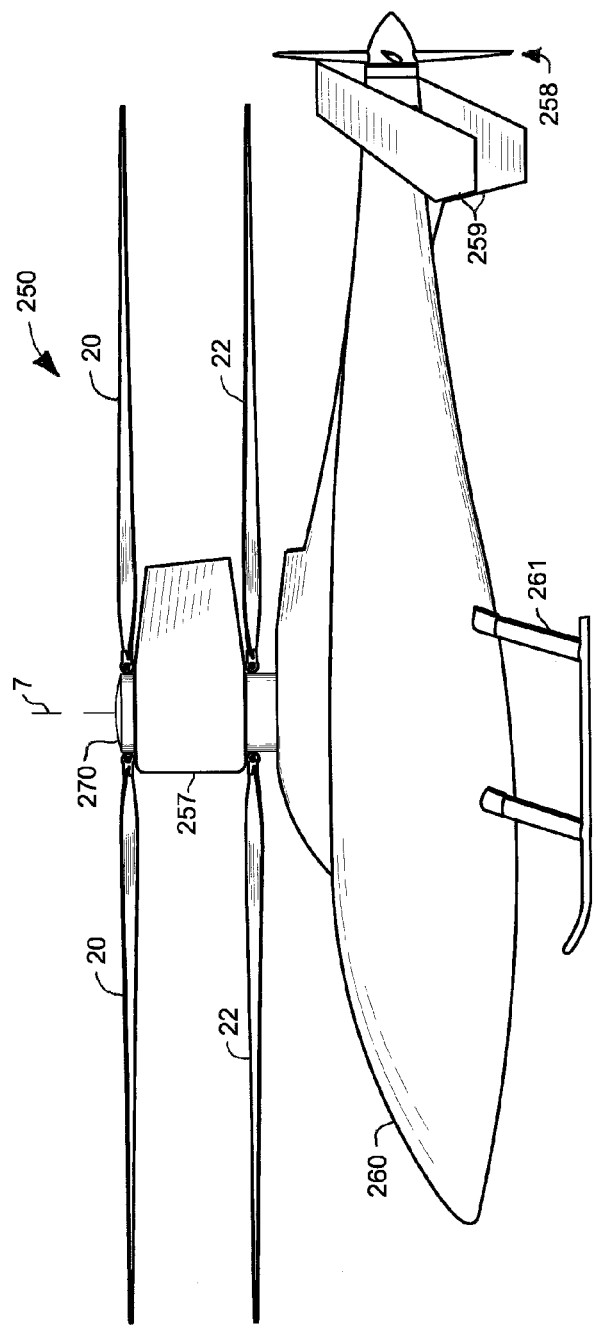
Figure 28:
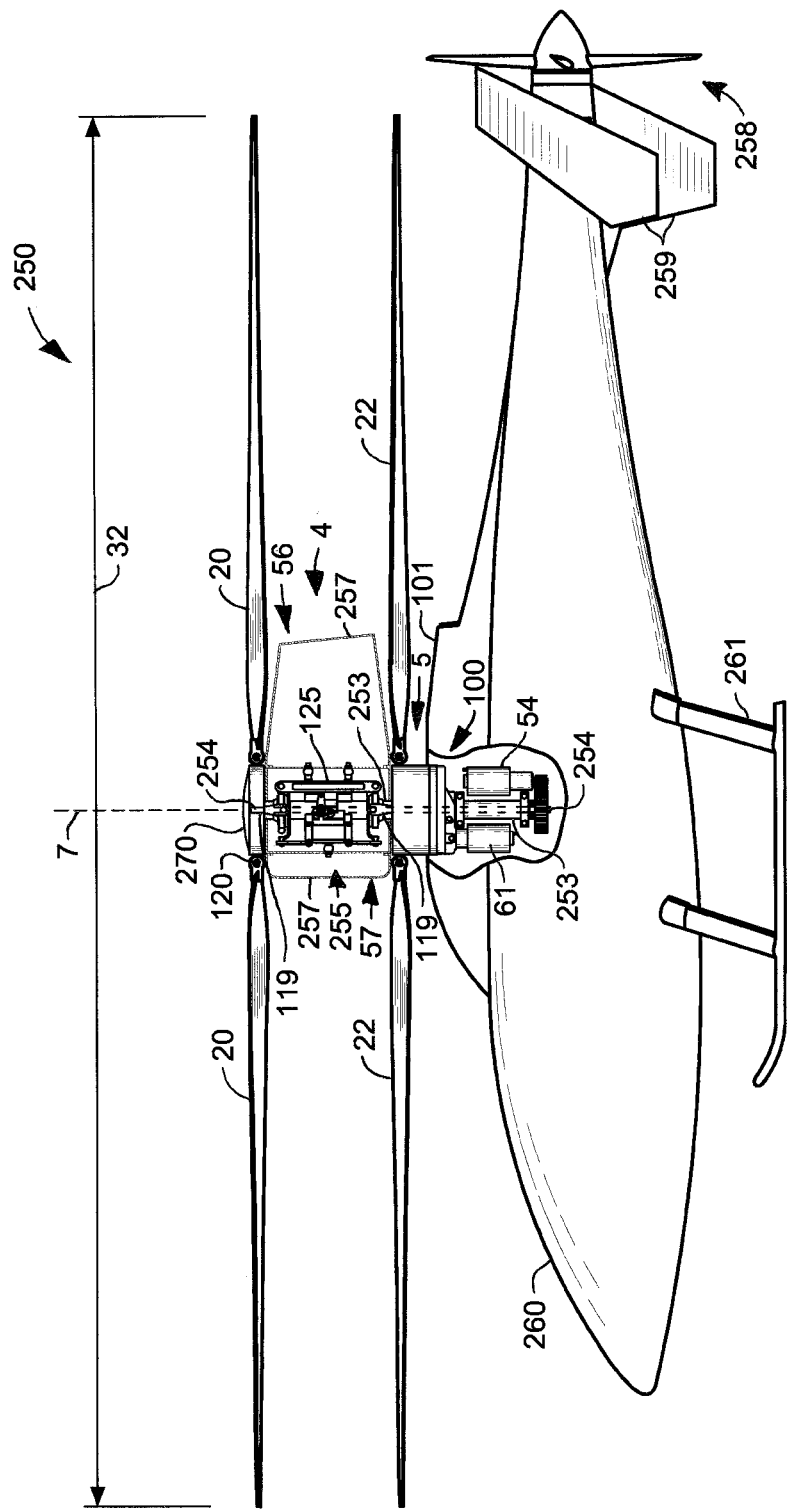
Figure 29A:
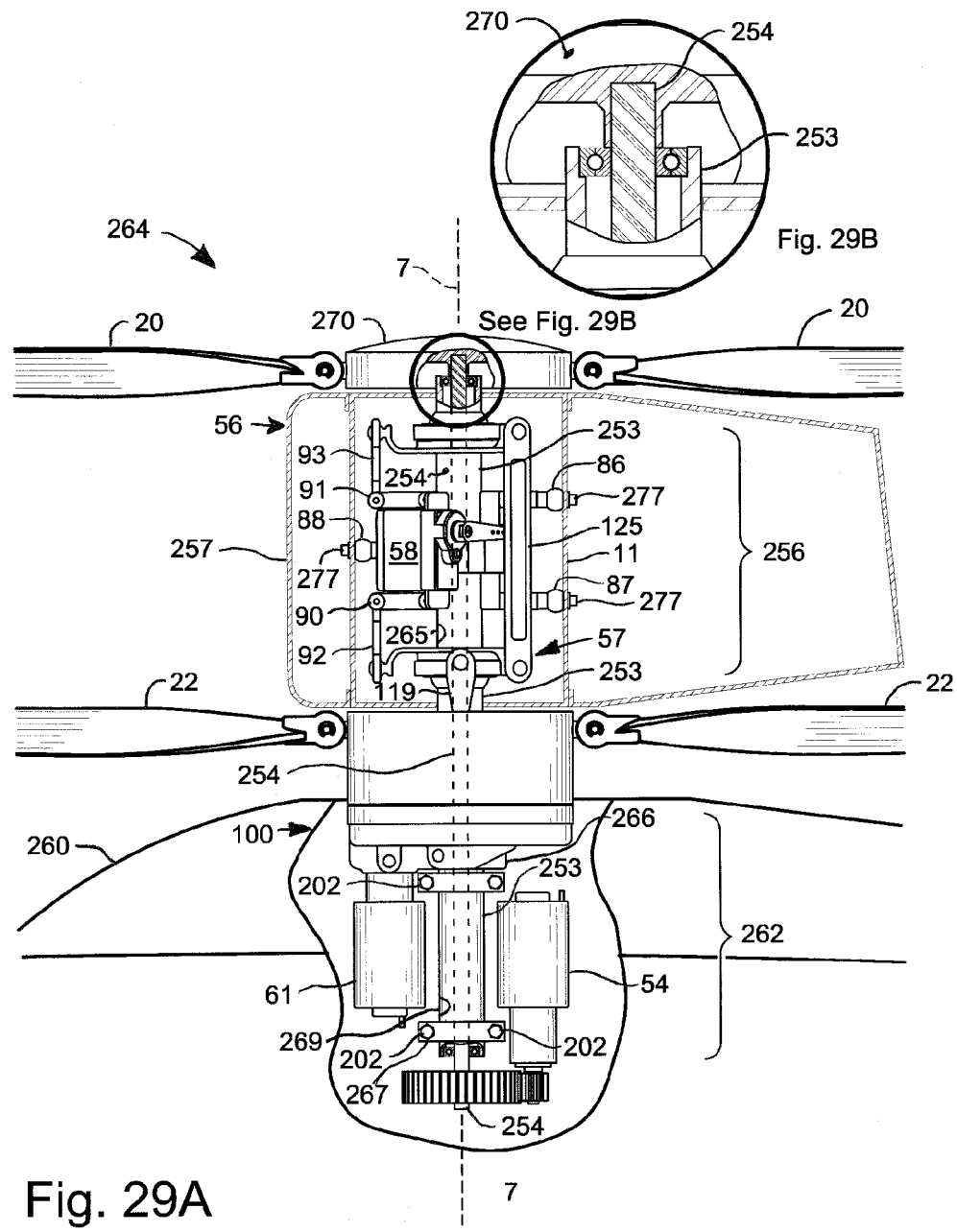
Figure 30:
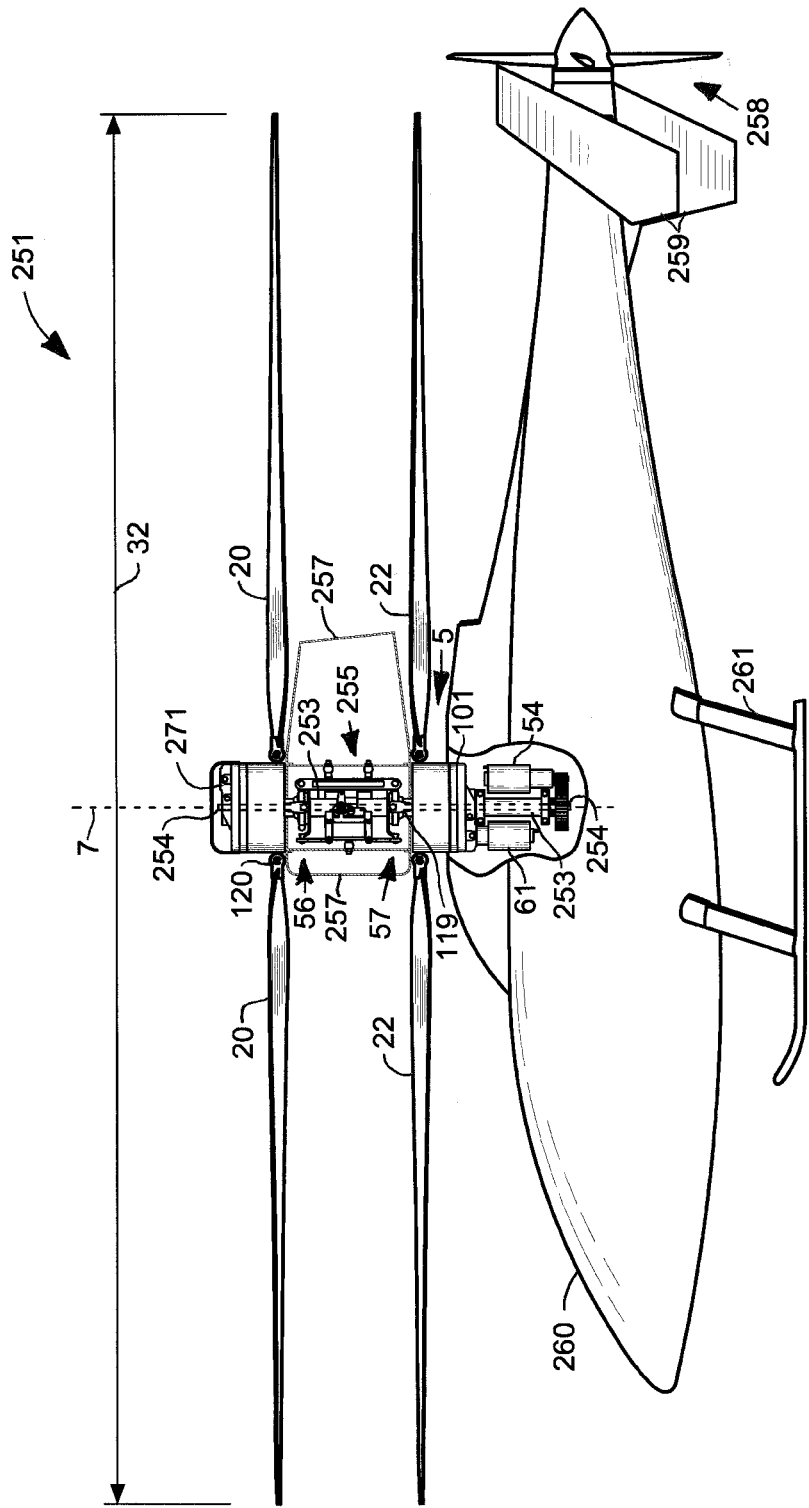
Figure 31:
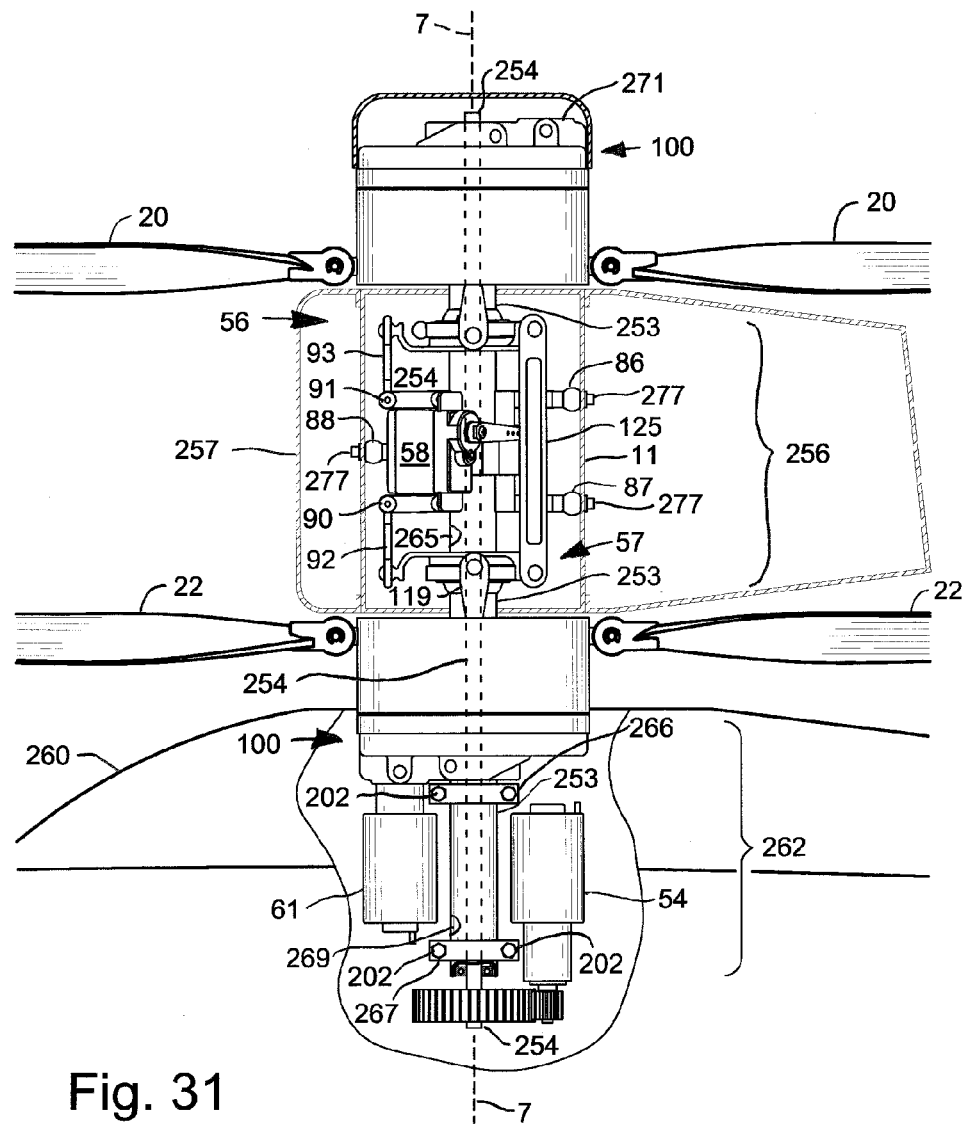
Figure 32:
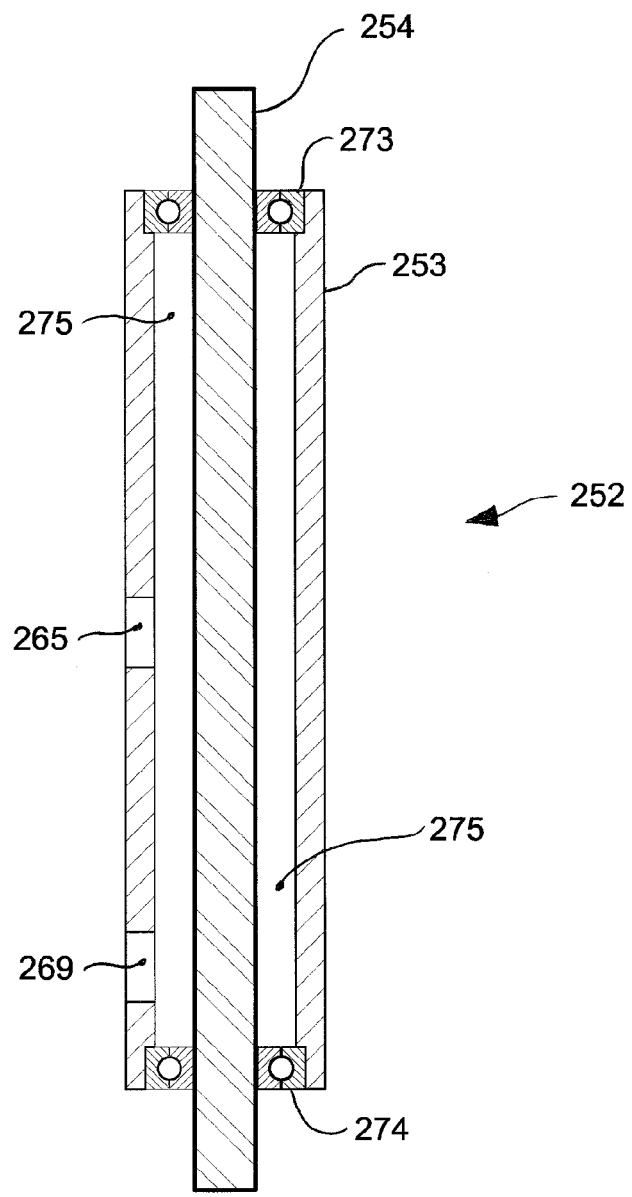
Figure 33:
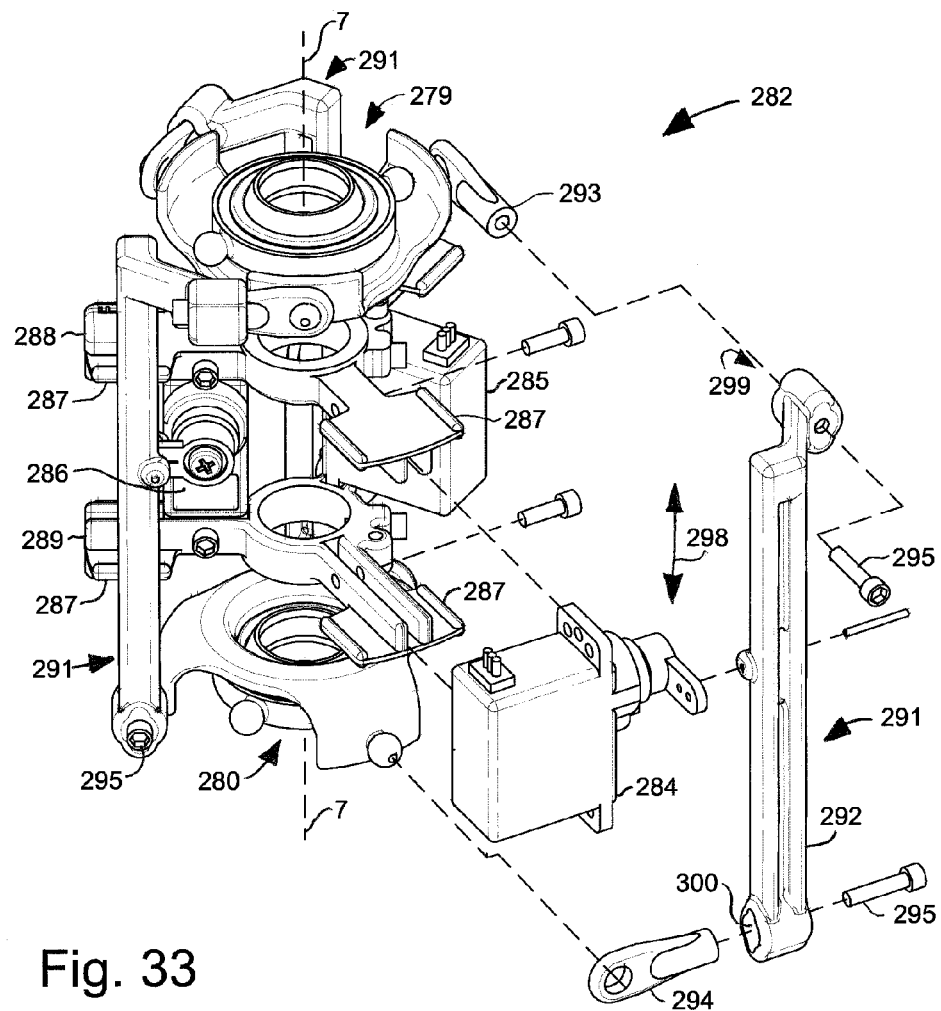
Figure 34:
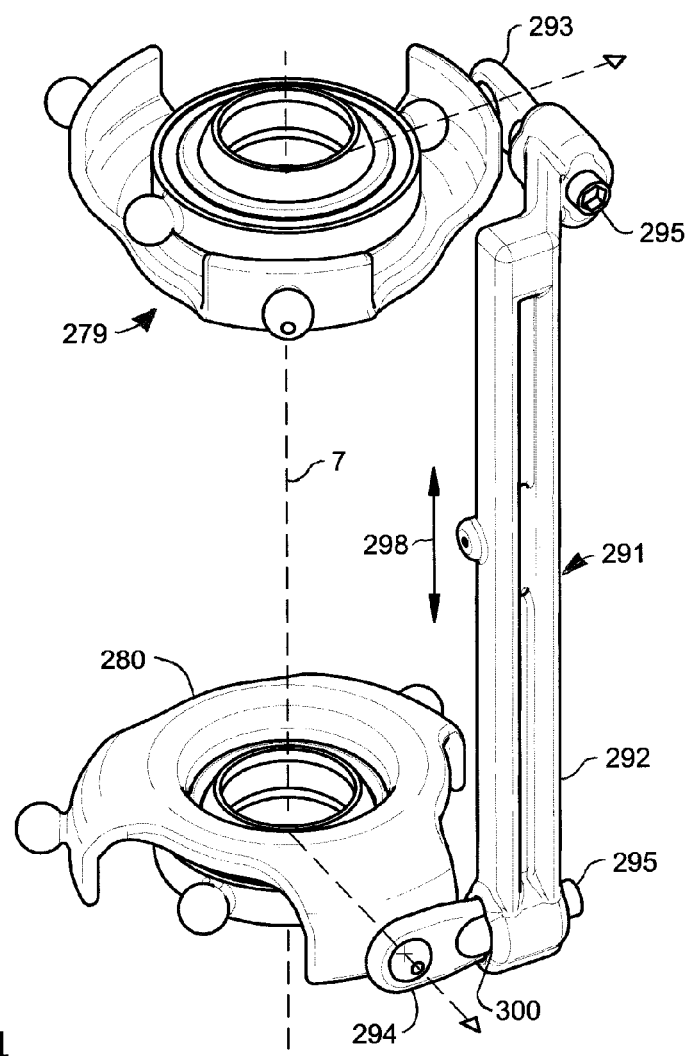
Figure 35:
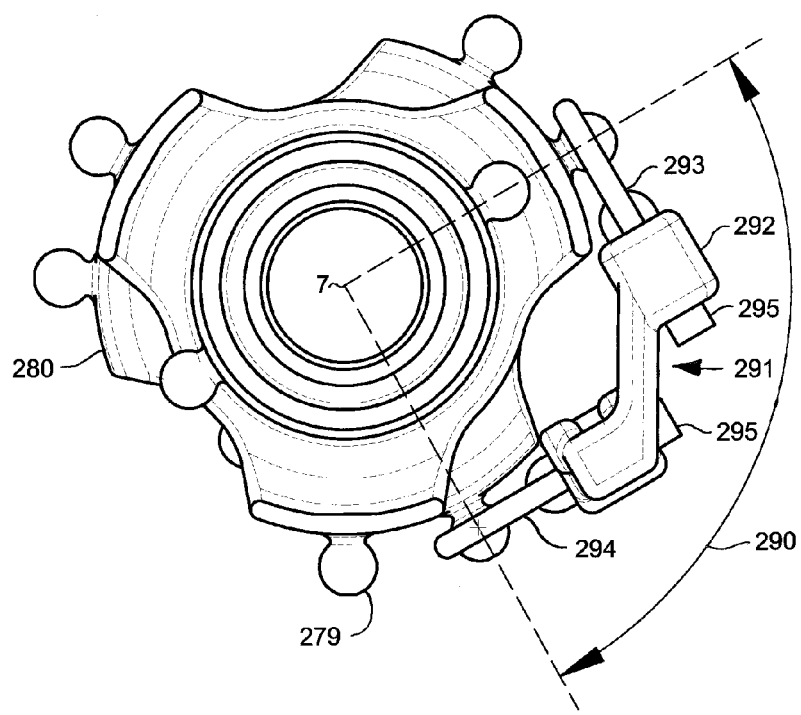
Figure 36:
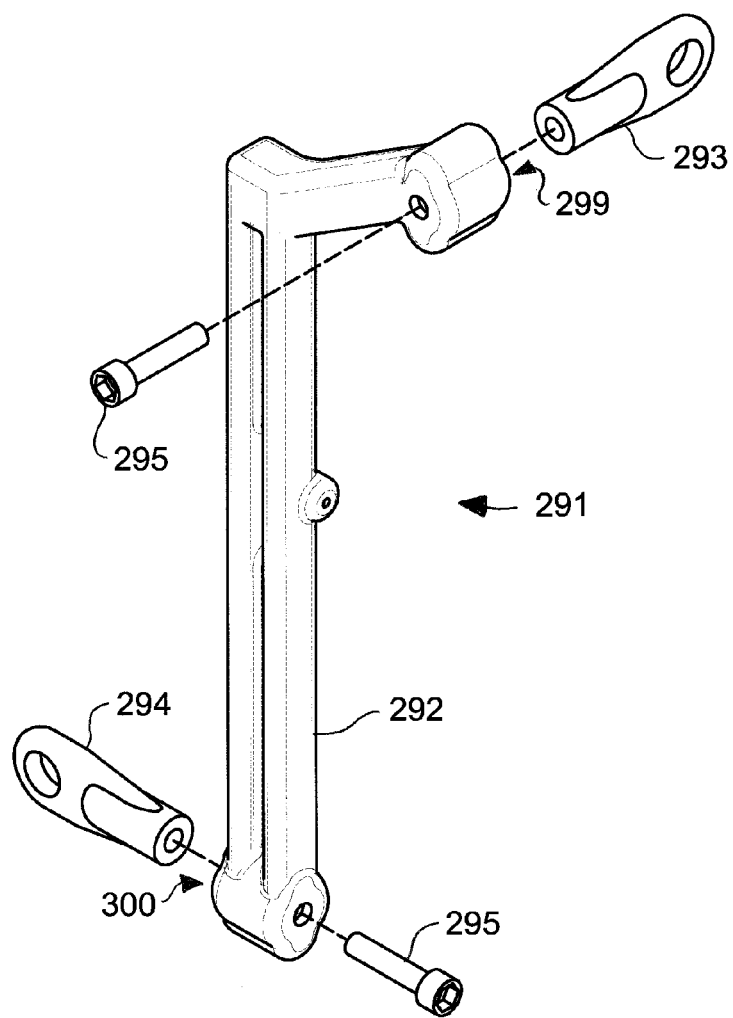
Figure 37:
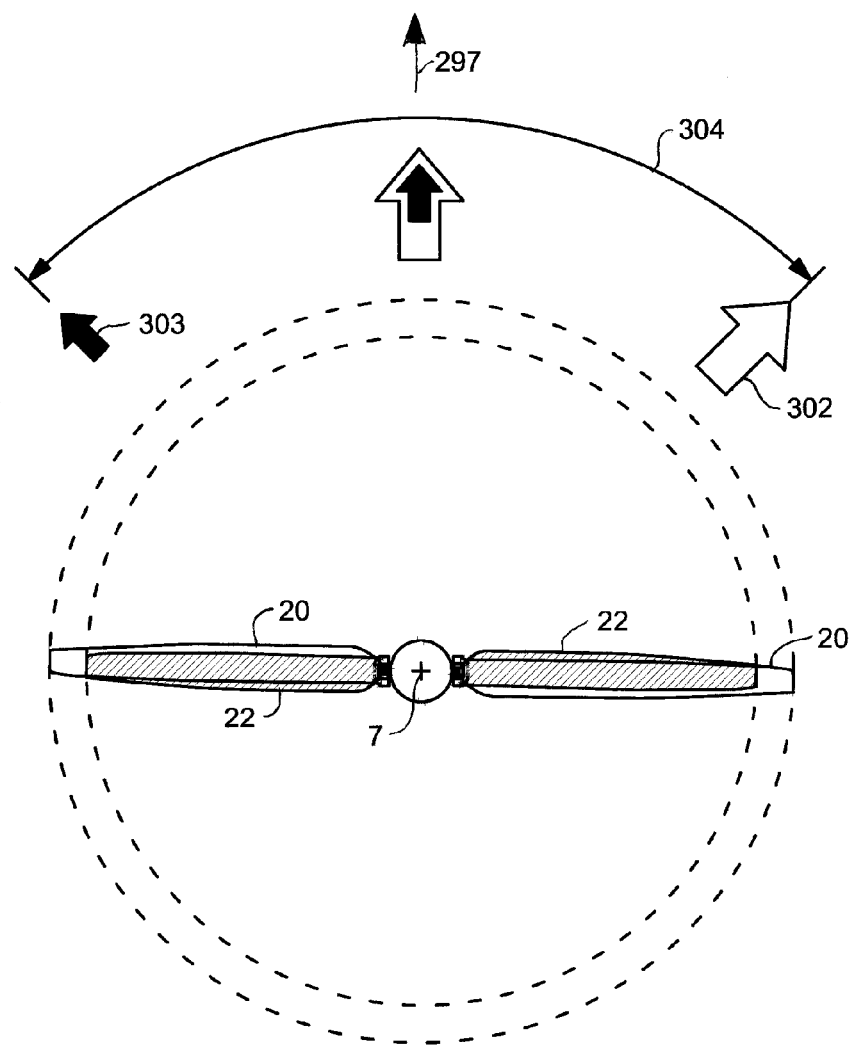
Figure 38:
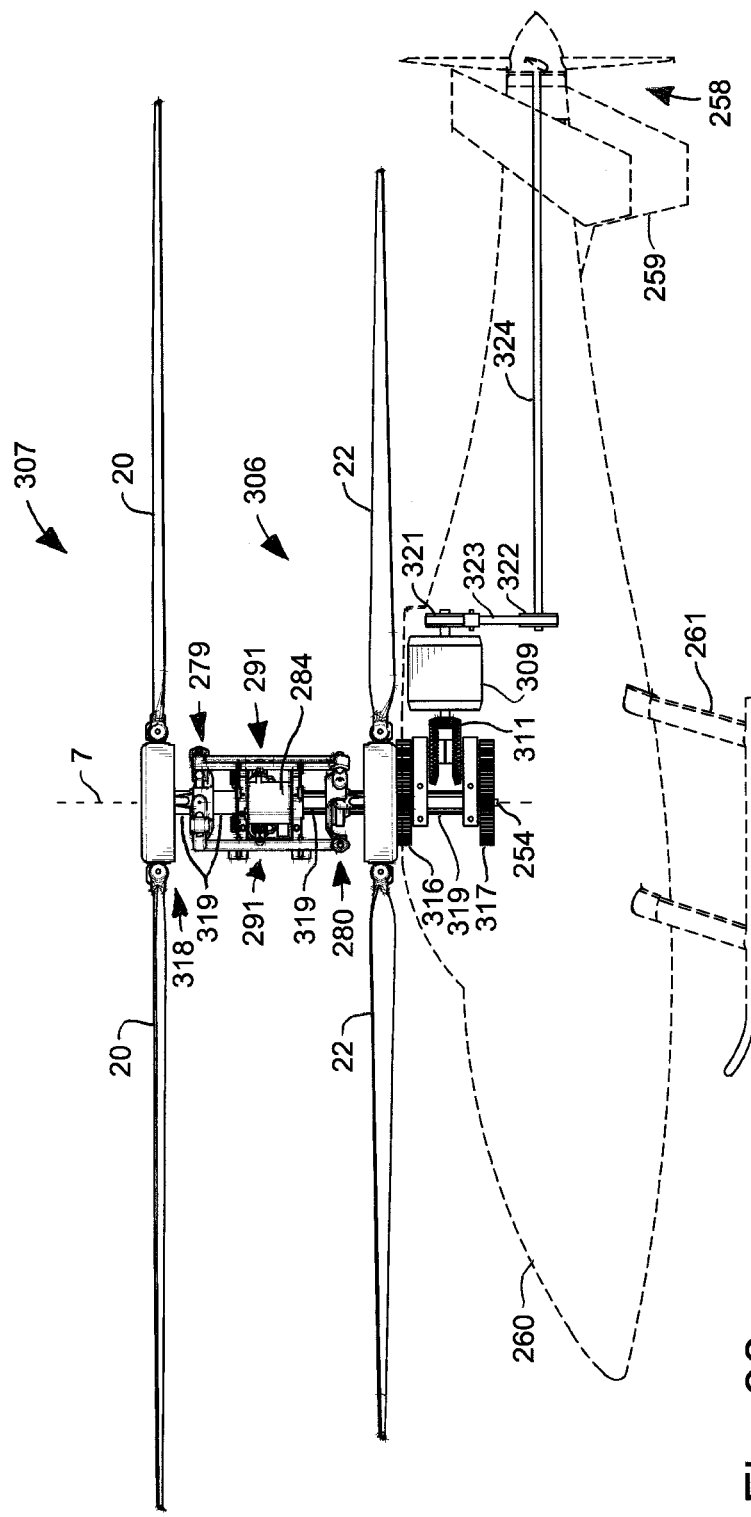
Figure 39:
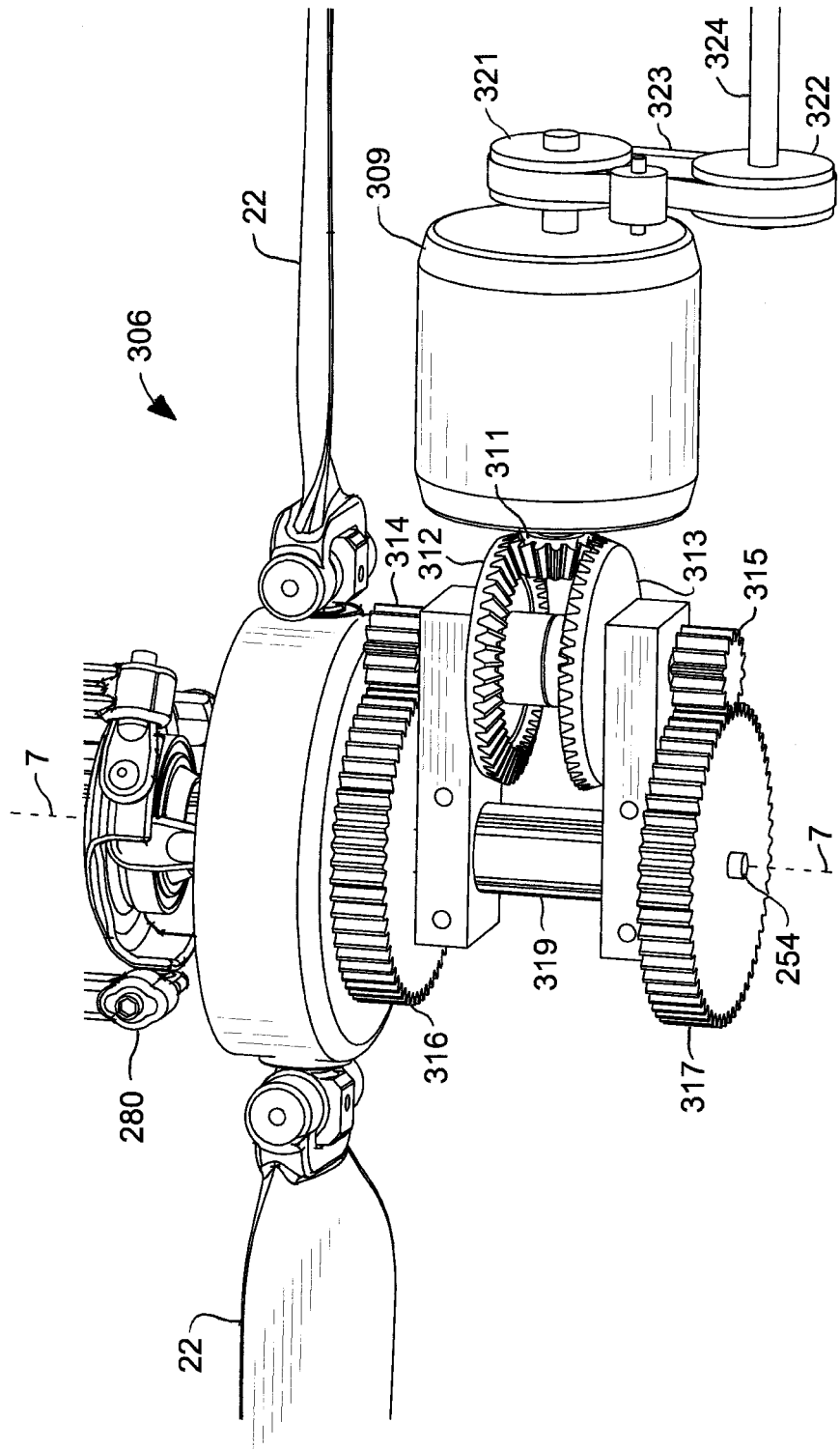
Figure 40:
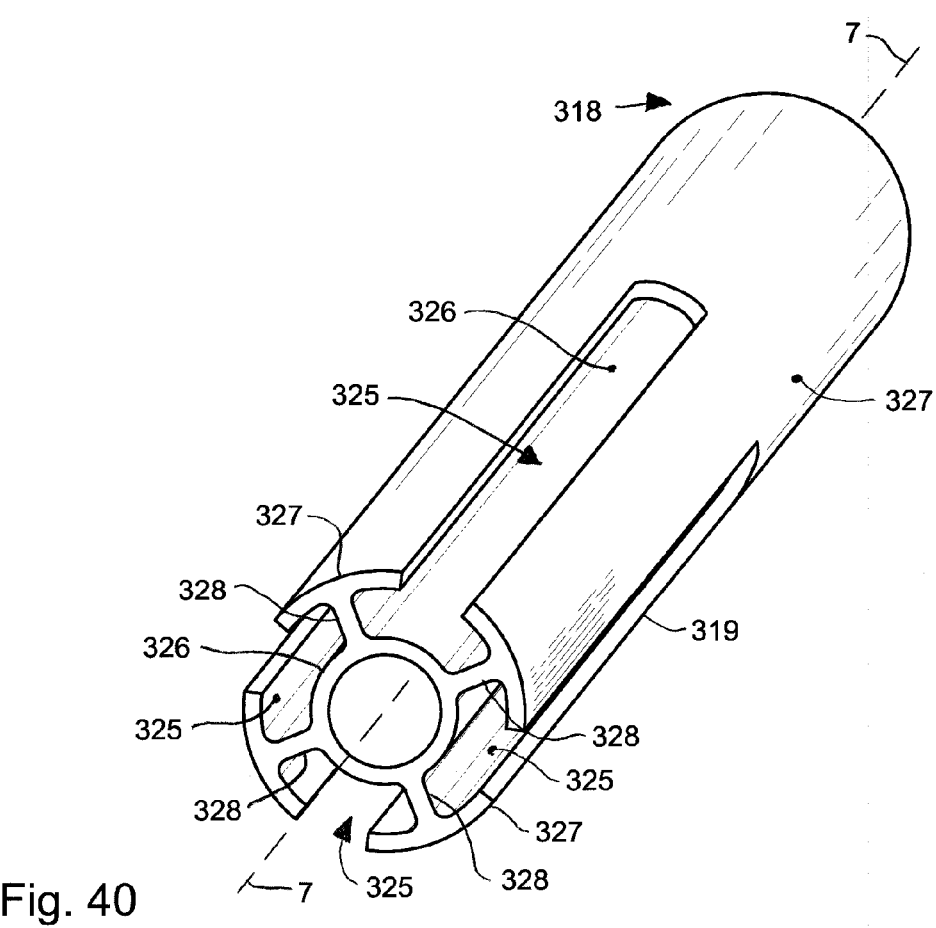
Figure 41:
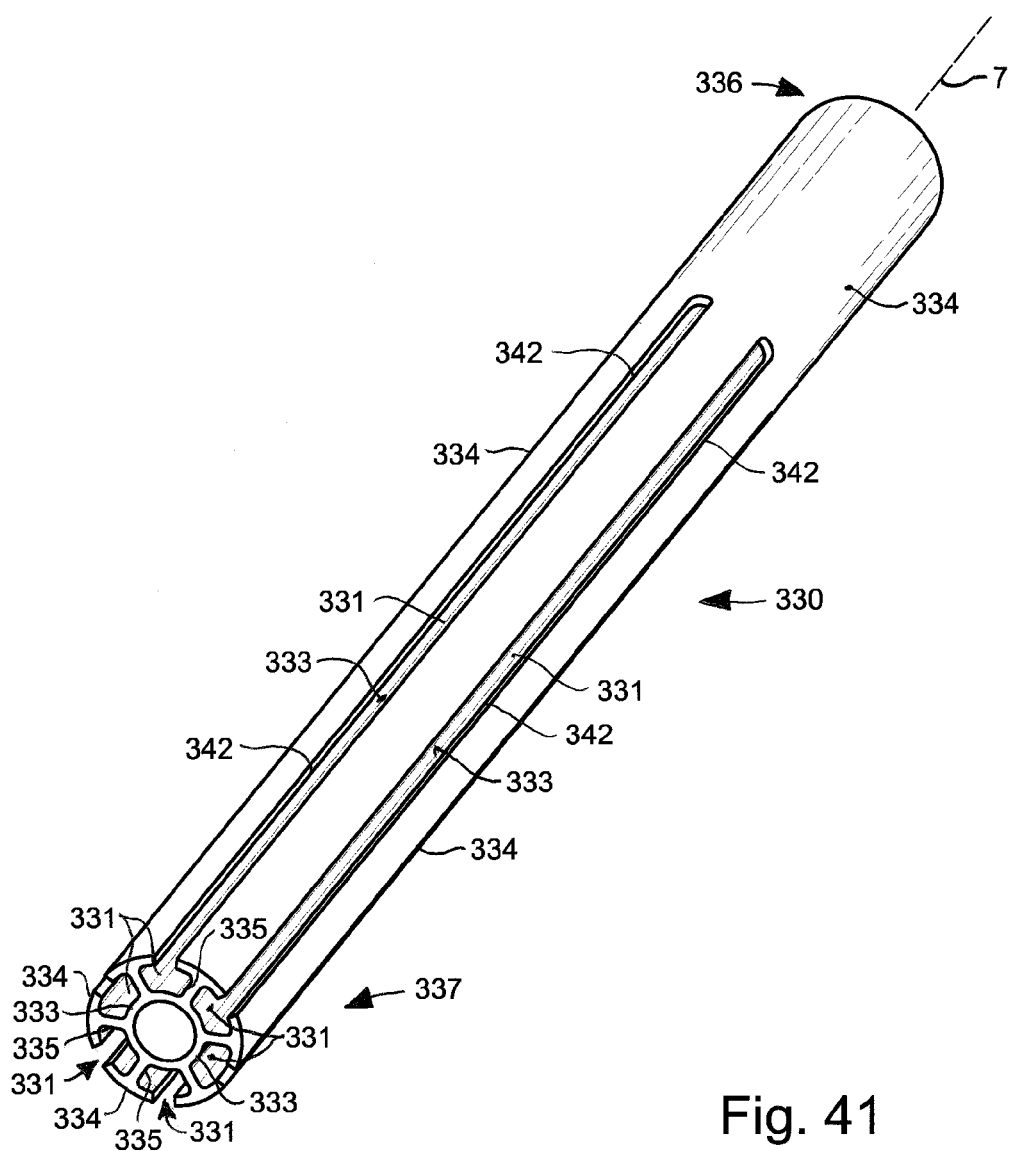
Figure 42:
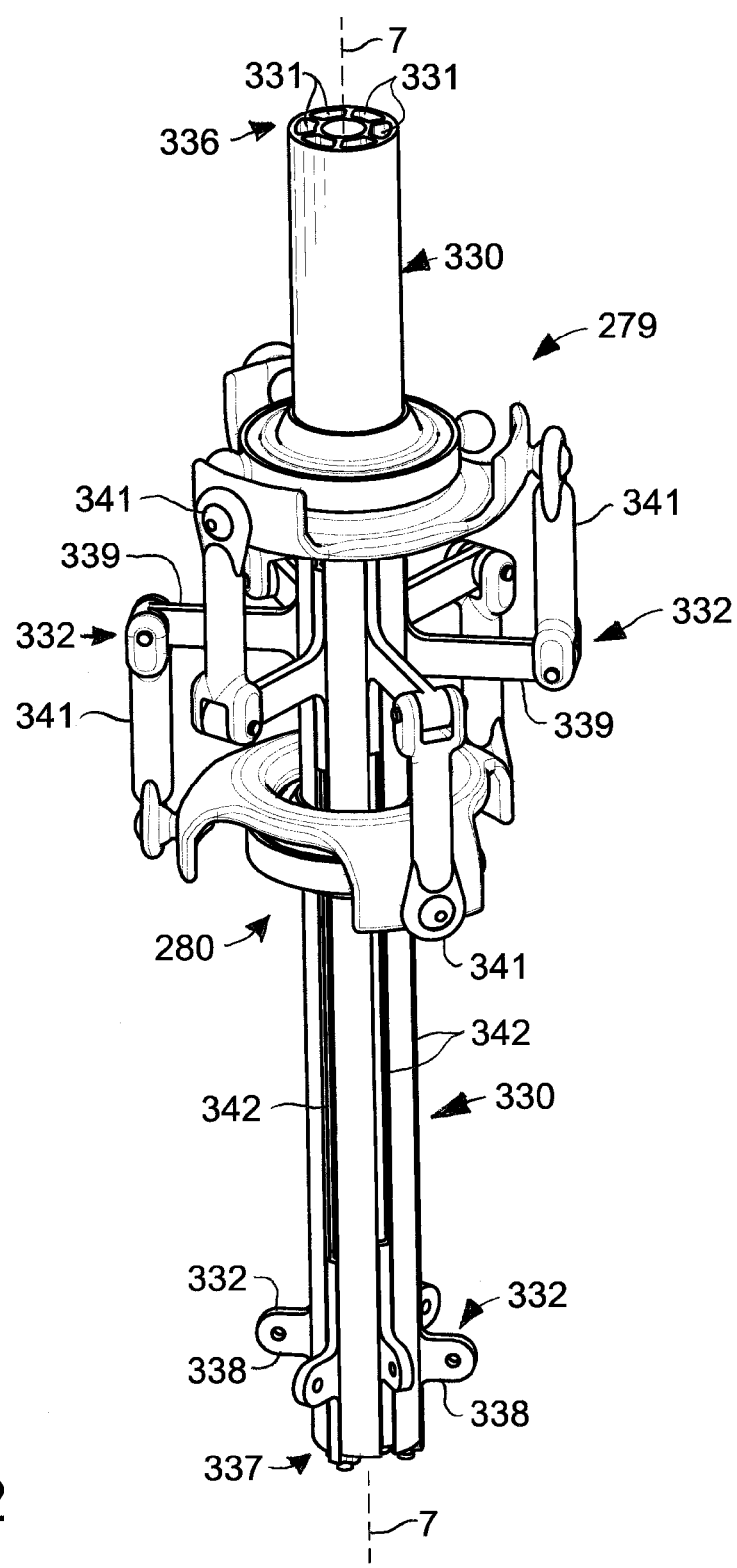
Figure 43:
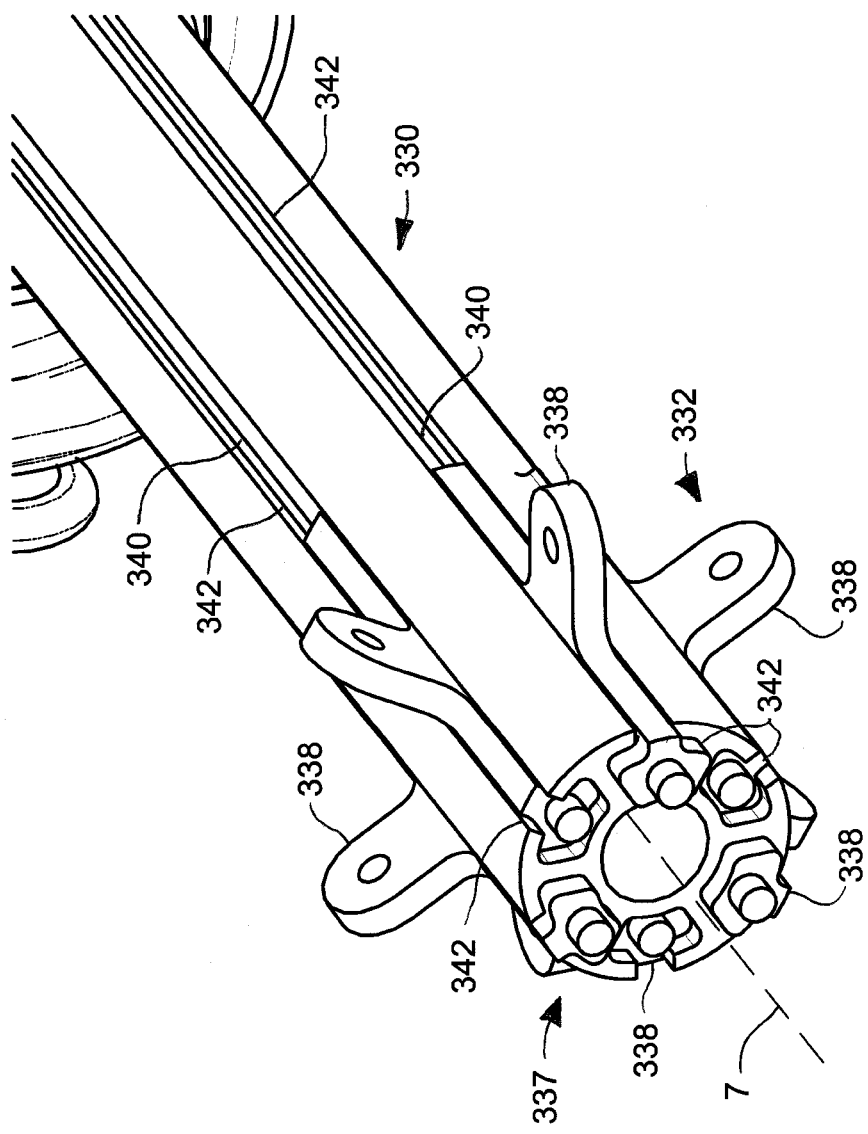
Figure 45:
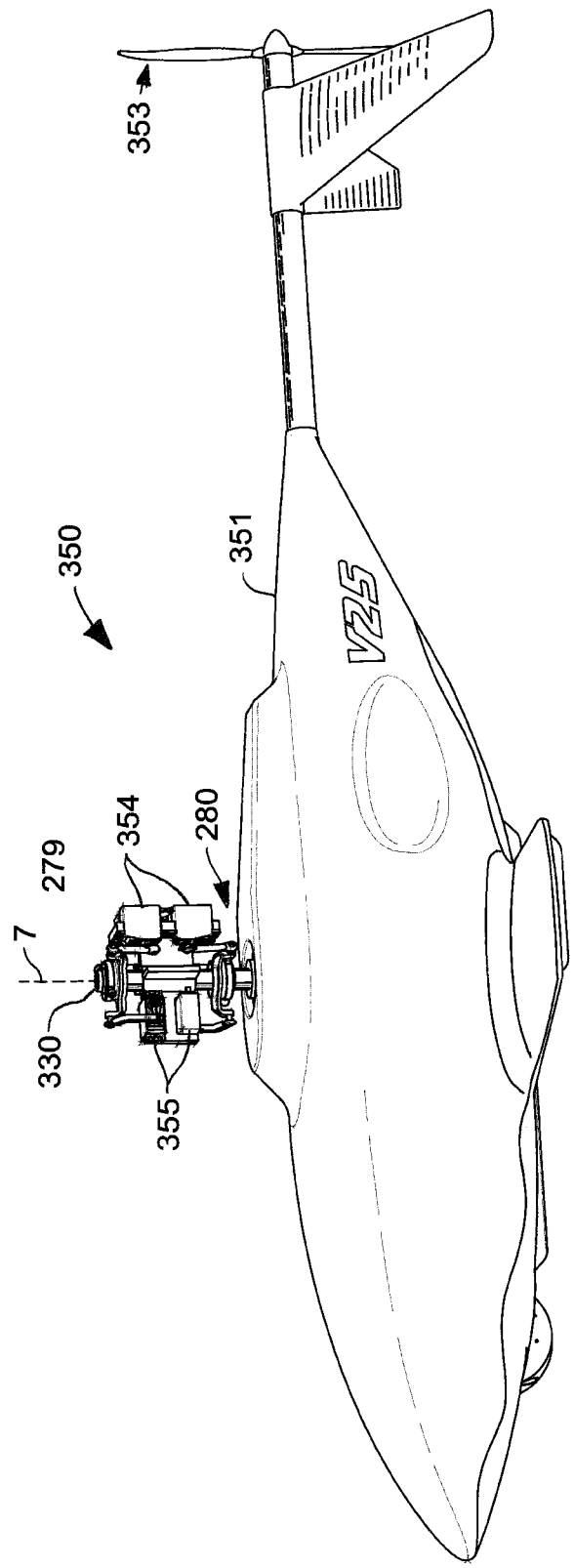
Figure 46:
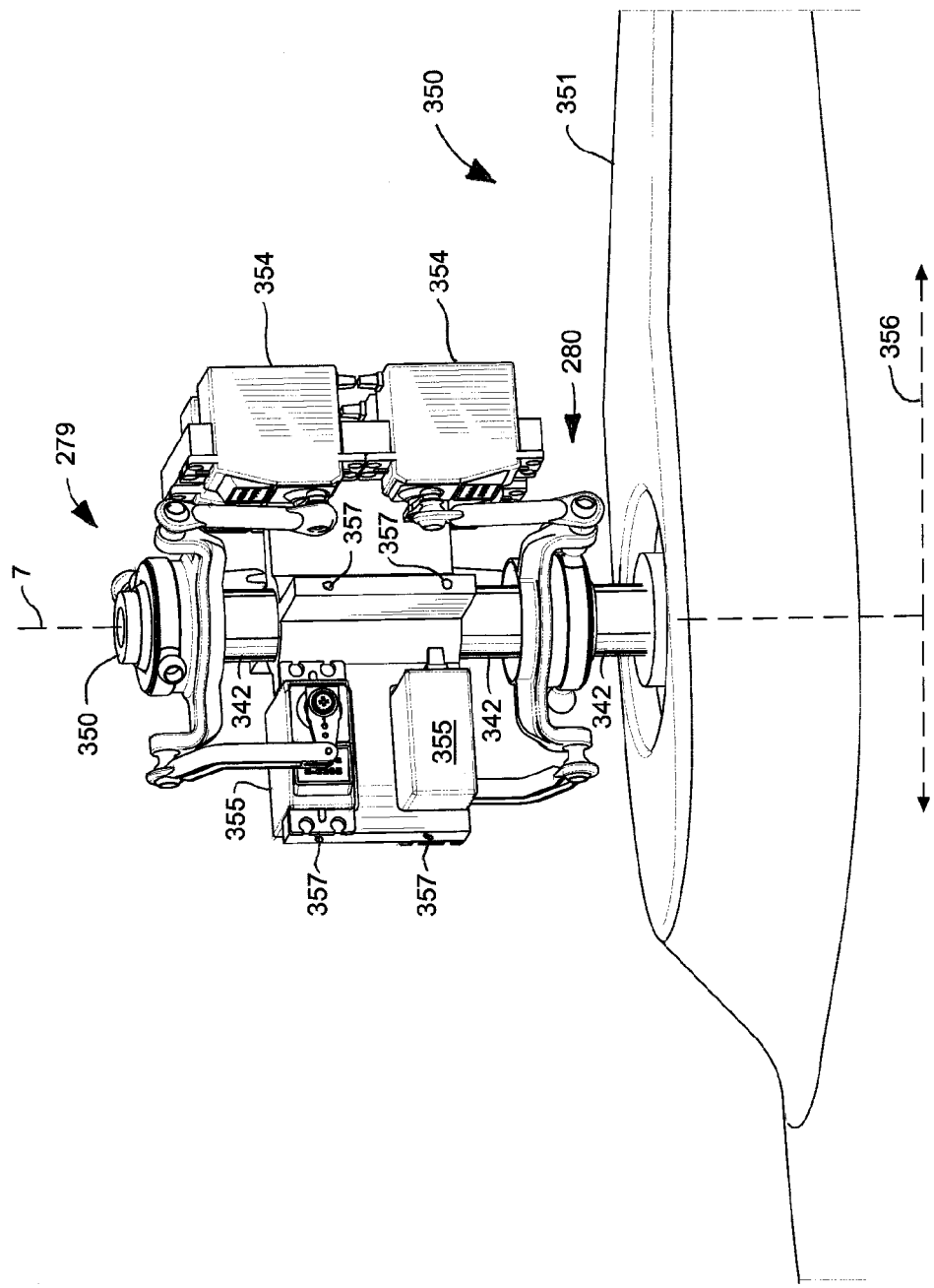
Figure 47:
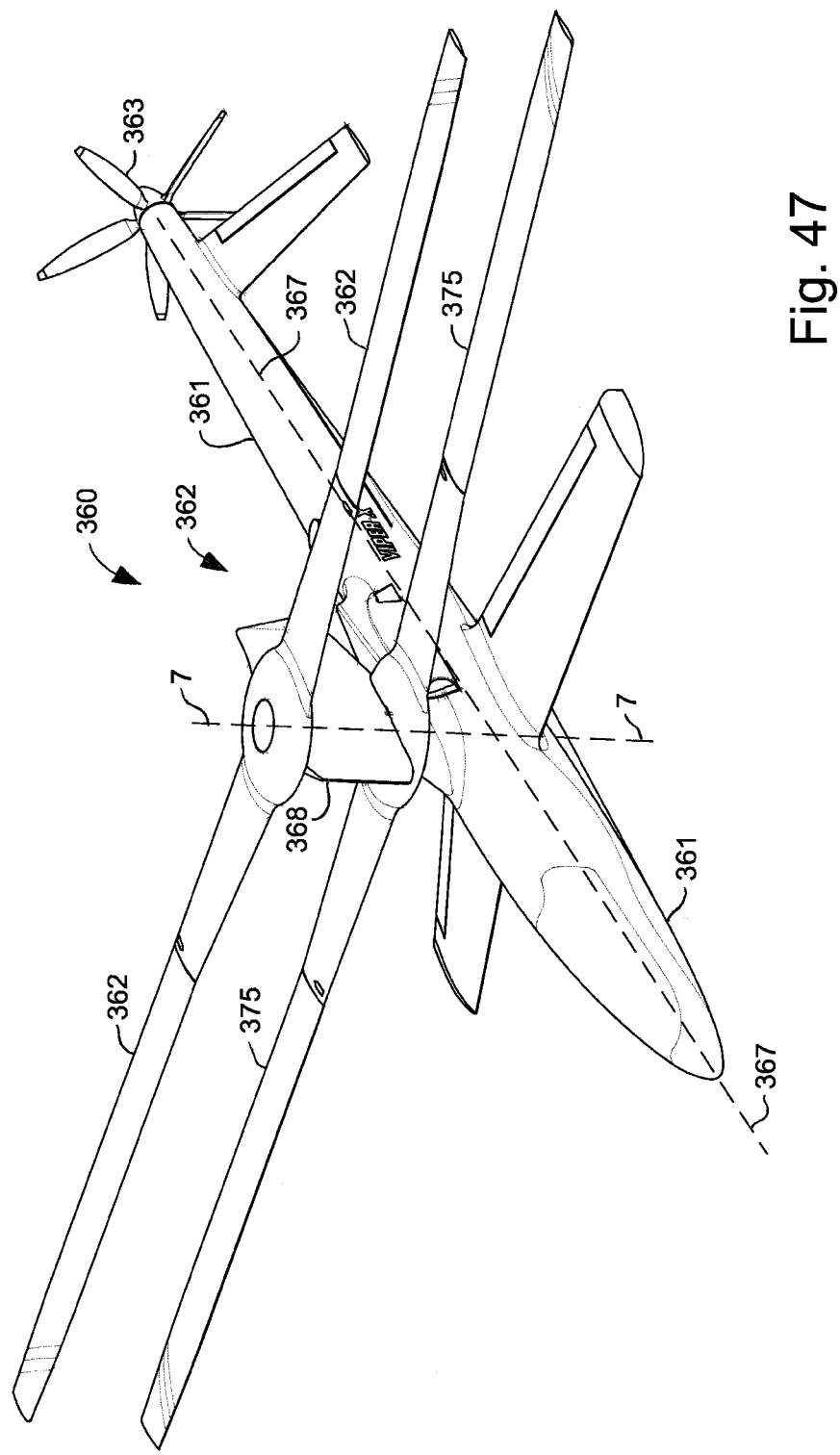
Figure 48:
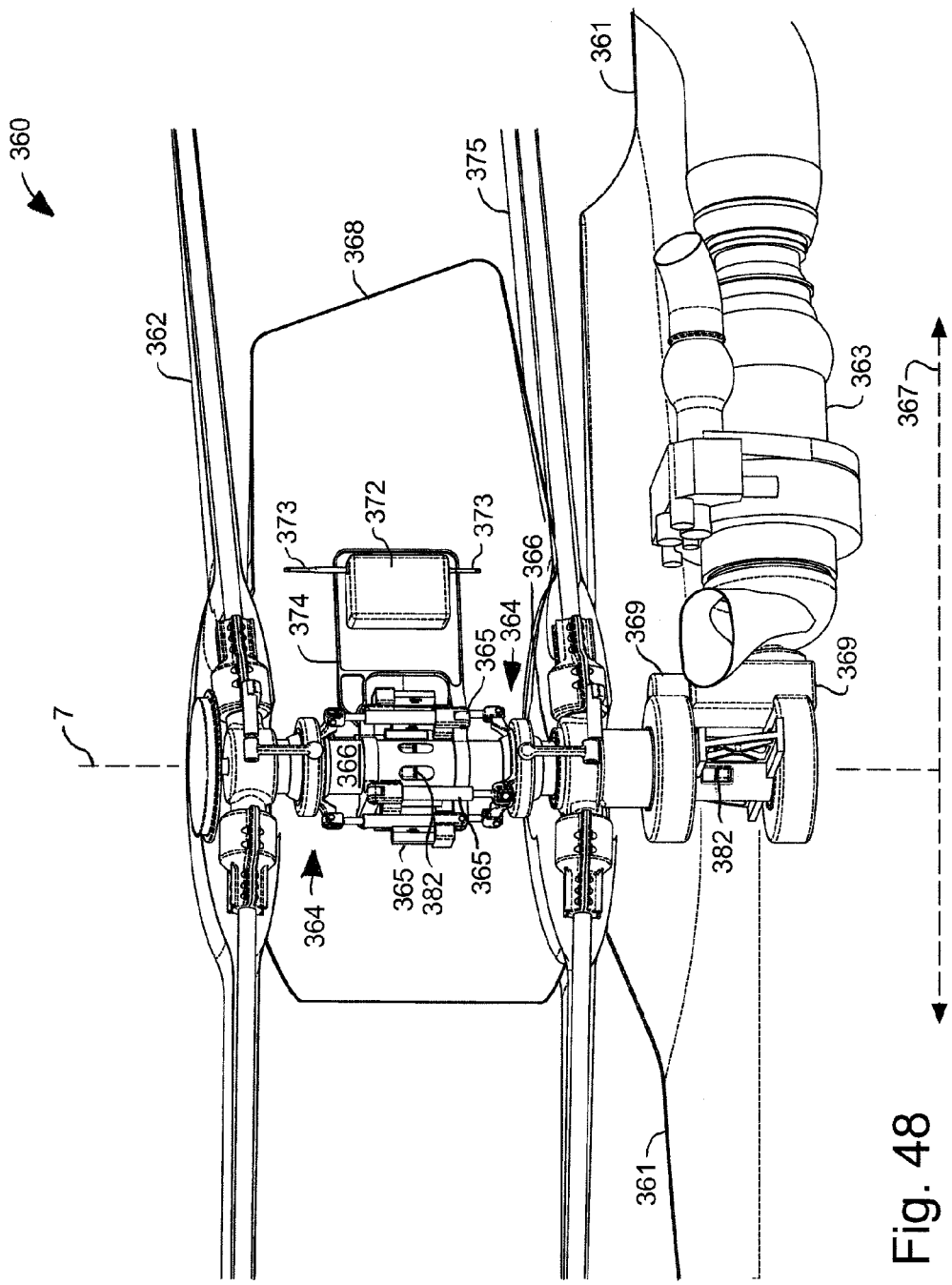
Figure 49:
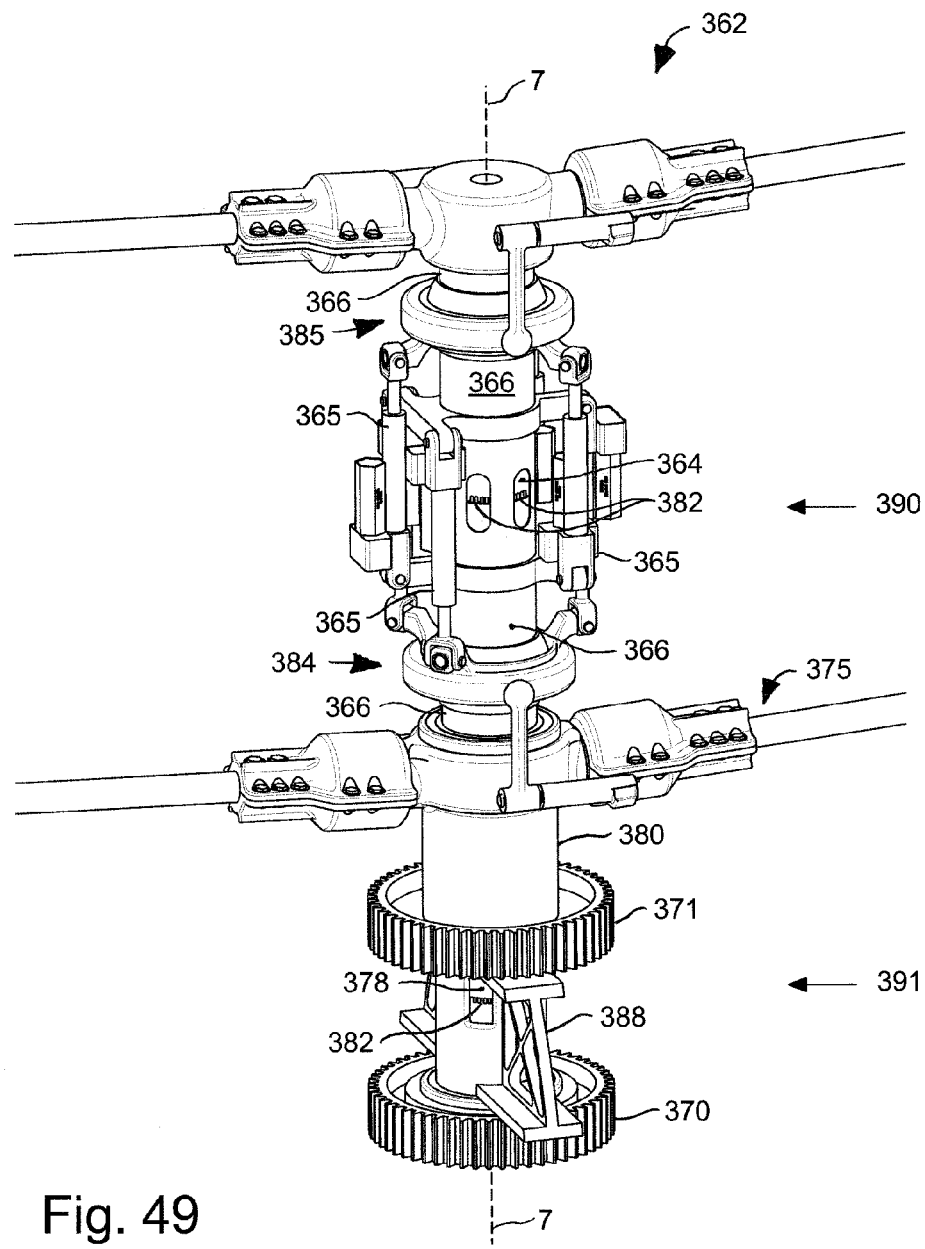
Figure 50:
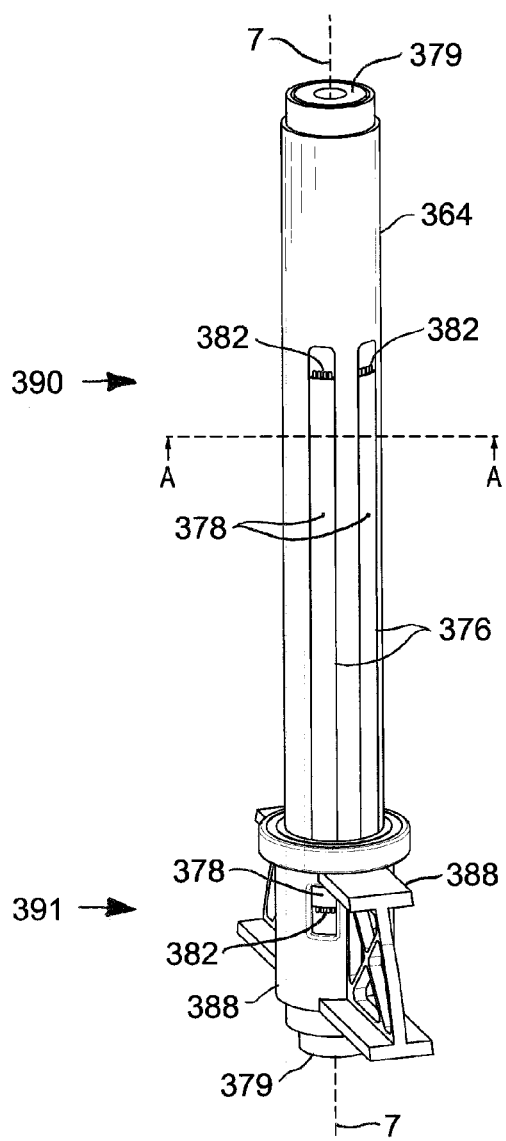
Figure 52:
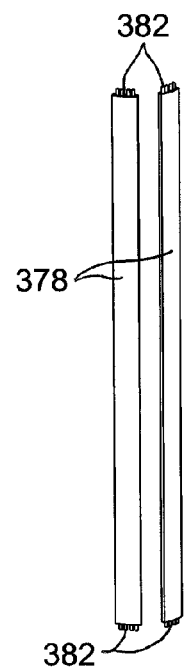
Figure 51:
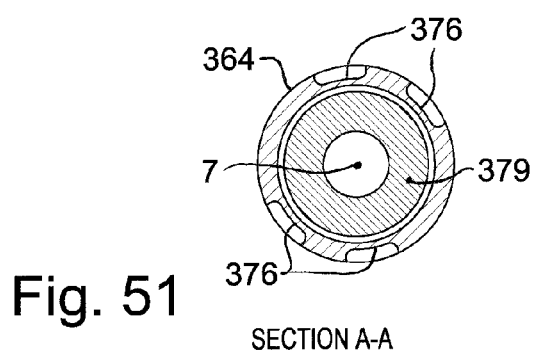
Figure 54:
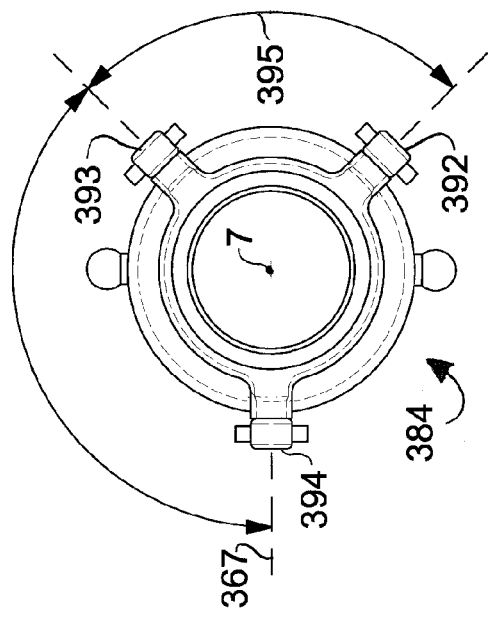
Figure 53:
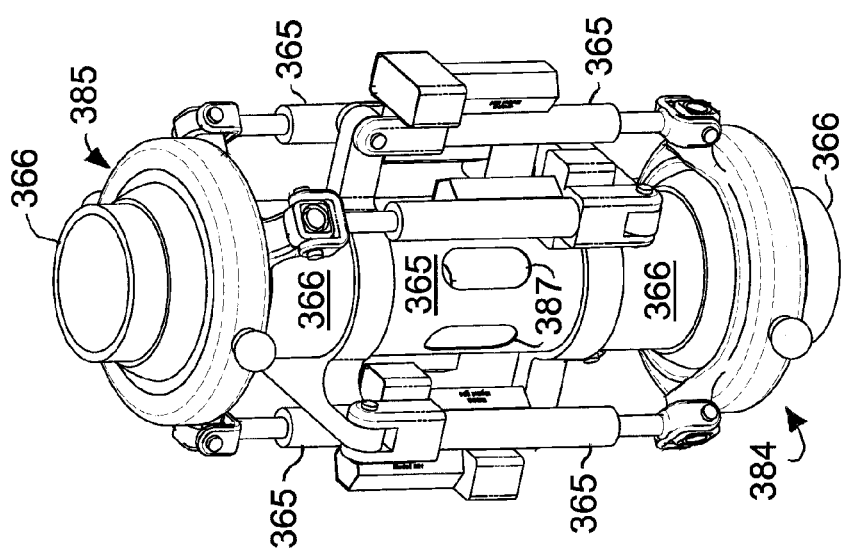

FIGS. 20A, 20B, and 20C are sequential views of the rotary wing vehicle showing the operation of unequal length folding blades during a crash landing of the vehicle on ground underlying the rotary wing vehicle;

FIGS. 21A and 21B are side elevation views of a storage tube and the rotary wing vehicle showing the vehicle folded for storage;

FIG. 22 is a perspective view of a rotary wing vehicle in accordance with present disclosure delivering a sensor or marking to a remote location shown for the purpose of illustration to be a ship on the open ocean;

FIG. 23 is a side elevation view of a rotary wing vehicle folded for storage in a rear portion of a gravity-delivered bomb;

FIG. 24 is a perspective view of a rotary wing vehicle deploying from the rear of a gravity-delivered bomb to the vicinity of a target site showing the gravity-delivered bomb ejecting the rotary wing vehicle and the rotary wing vehicle deploying into a vertical flight mode to loiter in the target area to provide an attacking force with real-time battle damage assessment after the gravity delivered bomb has struck the target;

FIG. 25A is a diagrammatic view of another rotary wing vehicle showing an aircraft having a central buss architecture with power and signal conduits, a guidance system, and a pair of rotor systems coupled to an airframe comprising a non-rotating structural spine or backbone and carrying a payload;

FIG. 25 B is a diagrammatic view of the rotary wing vehicle of FIG. 25A showing a rotor system, control system, and power supply communicating through a central data/power buss with power and signal conduit;

FIG. 26 is a diagrammatic view of another embodiment of a rotary wing vehicle, according to the present disclosure, having a central buss architecture with power and signal conduits, a guidance system, and a pair of rotor systems coupled to an air frame;

FIG. 27 is an elevation view of a rotary wing vehicle according to the present disclosure showing the rotary wing vehicle includes a streamlined body suited to high-speed translational flight and a coaxial mast module that includes an internal torque tube for driving an upper rotor;

FIG. 28 is an elevation view of the rotary wing vehicle of FIG. 27 with portions of the body shells broken away to reveal the mast module and rotor control systems;

FIG. 29A is an enlarged side elevation view of the rotary wing vehicle of FIG. 28 with portions of the mast module and rotor shroud cut away to reveal interior detail;

FIG. 29B is an enlarged portion taken from the circled region of FIG. 29A;

FIG. 30 is an elevation view of another embodiment of a rotary wing vehicle in accordance with the present disclosure showing the rotary wing vehicle includes a streamlined body suited to high-speed translational flight and a coaxial mast module that includes an upper rotor speed reducer and showing that portions of body shells included in the streamlined body have been broken away to reveal a mast module and rotor control systems;

FIG. 31 is an enlarged elevation view of the rotary wing vehicle of FIG. 29 with portions of the mast module and rotor shroud broken away to reveal interior detail;

FIG. 32 is a sectional view of the mast tube of the rotary wing aircraft of FIG. 28;

FIG. 33 is an enlarged perspective view of a servo module included in a rotary wing vehicle showing that the servo module includes three servo actuators and three Z-links for varying the pitch of the upper and lower rotors at different phase angles simultaneously;

FIG. 34 is an enlarged perspective view of two pitch controller swashplates included in the servo module of FIG. 33 showing the pitch controller swashplates connected by a Z-link to actuate the swashplates at different phase angles;

FIG. 35 is a plan view the swashplates and Z-link of FIG. 34 showing a swashplate phase angle of about 90 degrees;

FIG. 36 is an exploded assembly view of the Z-link pitch control linkage of FIGS. 33 and 34;

FIG. 37 is plan view of a rotary wing vehicle in accordance with the present disclosure showing an upper rotor phase angle (solid double arrow) and a lower rotor phase angle (hollow double arrow) and a resulting total rotor system phase angle (combined solid and hollow double arrow);

FIG. 38 is a side elevation view of a rotorcraft power and control system according to the current disclosure configured for an aircraft with a single drive motor, two rotors and a pusher propeller;

FIG. 39 is an enlarged perspective view of the rotorcraft of FIG. 38 showing details of the main shaft splitter and drive gears for the counter-rotating rotors and the belt-drive system for the pusher propeller;

FIG. 40 is a perspective end view of a main rotor mast configured with internal passageways for a torque tube and electrical wiring or plumbing;

FIG. 41 is a perspective end view of a main rotor mast configured with internal passageways for a torque tube and six mechanical slider linkages;

FIG. 42 is a perspective view of a main rotor mast assembly including the main rotor mast of FIG. 41 and six slider linkages engaging the six interior passageways and connected to upper and lower swashplates;

FIG. 43 is an enlarged perspective end view of the main rotor mast assembly of FIG. 42 showing six swashplate slider linkages engaging the six interior mast passageways;

FIG. 44A is a perspective view of a slider linkage configured with a downward pointing follower link to control a lower swashplate;

FIG. 44B is an exploded perspective view of a slider linkage configured with an upward pointing follower link to control an upper swashplate;

FIG. 45 is a perspective side view of a helicopter with a non-rotating mast and six rotary servo actuators coupled to the mast with upper and lower rotor hubs and rotor blades removed for clarity;

FIG. 46 is an enlarged perspective end view of the non-rotating main rotor mast assembly of FIG. 45 showing the six rotary servo actuators coupled to the mast and connected to the upper and lower swashplates with six individual linkages;

FIG. 47 is a perspective view of a high-speed helicopter in accordance with the present disclosure showing that the high-speed helicopter includes a non-rotating mast supporting an aerodynamic mask shroud between the upper and lower rotor blades to reduce drag;

FIG. 48 is an enlarged partial perspective side view of the helicopter of FIG. 47 with portions broken away to reveal the non-rotating mast, mast shroud, six linear servo actuators, and other control system components including electronics and antennae supported by the mast between the upper and lower rotor blades;

FIG. 49 is an enlarged partial perspective view of the non-rotating mast assembly of the helicopter FIG. 47 showing upper and lower rotor hubs, upper and lower rotor drive gears, and linear servo actuators;

FIG. 50 is a perspective view of the central non-rotating mast of the mast assembly shown in FIG. 49 with the mast sleeve removed to show details of the electrical bus inlays;

FIG. 51 is a sectional view taken along line A-A of FIG. 50 showing a torque tube inside the mast and showing exterior channels for electrical bus inlays;

FIG. 52 is a perspective view of the electrical bus inlays of FIG. 51;

FIG. 53 is a perspective view of a mast sleeve with six interleaved linear servo actuators and two swashplates configured to reduce a mast assembly frontal area; and FIG. 54 is a plan view of the lower swashplate of FIG. 53 showing the relationship between the swashplate arms to reduce the frontal area of the mast assembly.

DETAILED DESCRIPTION

Figure 1:
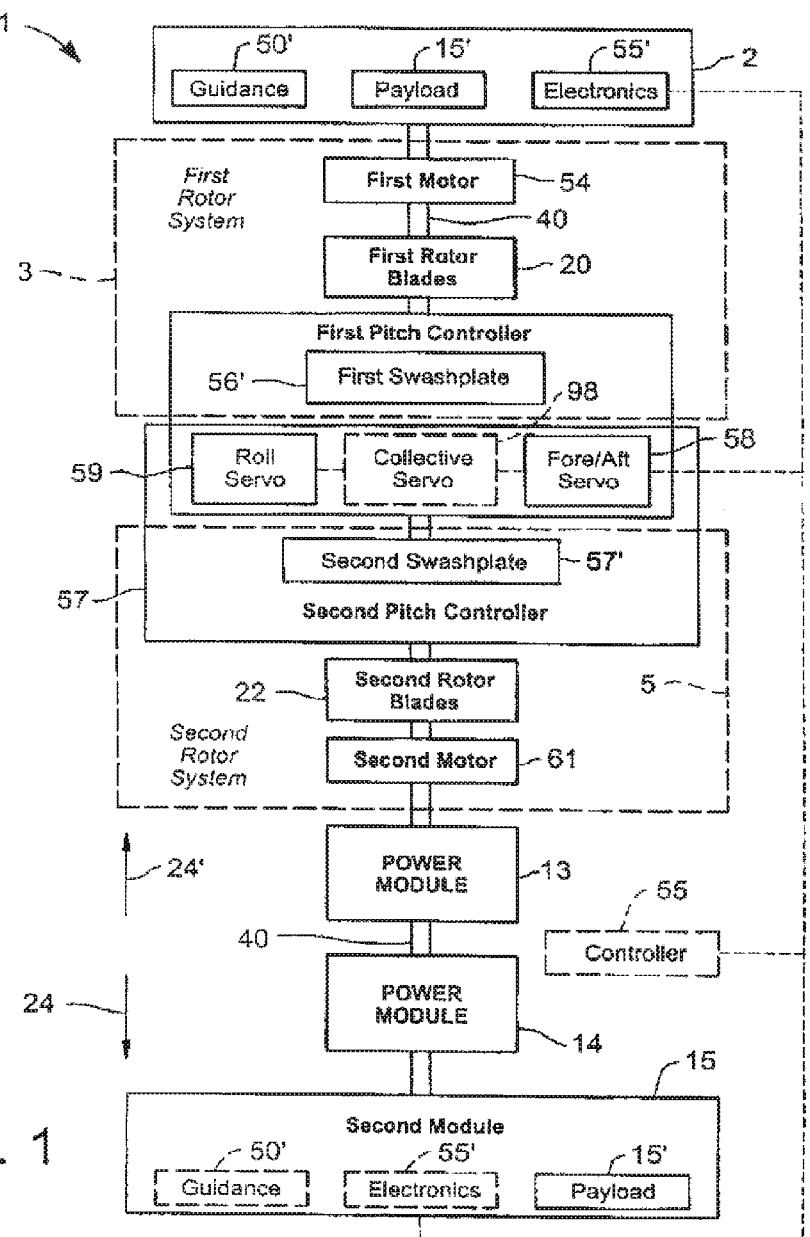
FIG. 1 is a diagrammatic view of a rotary wing vehicle in accordance with the present disclosure showing an aircraft including a guidance system, and a pair of rotor systems coupled to an airframe comprising a non-rotating structural spine or backbone and carrying a payload.

As suggested diagrammatically in FIG. 1, a rotary wing vehicle 1 includes, in series, a first module 2, a first and a second rotor system 3, 5, power modules 13 and 14, and a second module 15 coupled in spaced-apart relation to an airframe 40 extending along a common axis 7. Illustratively, airframe 40 is an elongated central backbone 40 and can be arranged as a hollow core or having a cruciform cross-section. In operation, first rotor system 3, also called first rotor 3, and second rotor system 5, also called second rotor 5, rotate in opposite directions about common axis 7 to direct thrust in direction 24 and create lift in direction 24' to cause controlled flight of rotary wing vehicle 1, as suggested in FIG. 2A. First module 2 is adapted to include a variety of guidance systems 50', electronics 55, or payloads 15'. Second module 15 is adapted to include payload 15', or in some embodiments, a variety of guidance systems 50' and electronics systems 55'. Payload 15' may include, but is not limited to, munitions, radiation sensors, chemical detection sensors, biological agent sensors, active and passive listening devices, video sensors, supplemental power sources, or other mission-specific equipment. Rotary wing vehicle 1 thus provides means for moving reconnaissance, observation, or survey monitoring equipment to an area of interest to obtain information therefrom.

Figure 5:
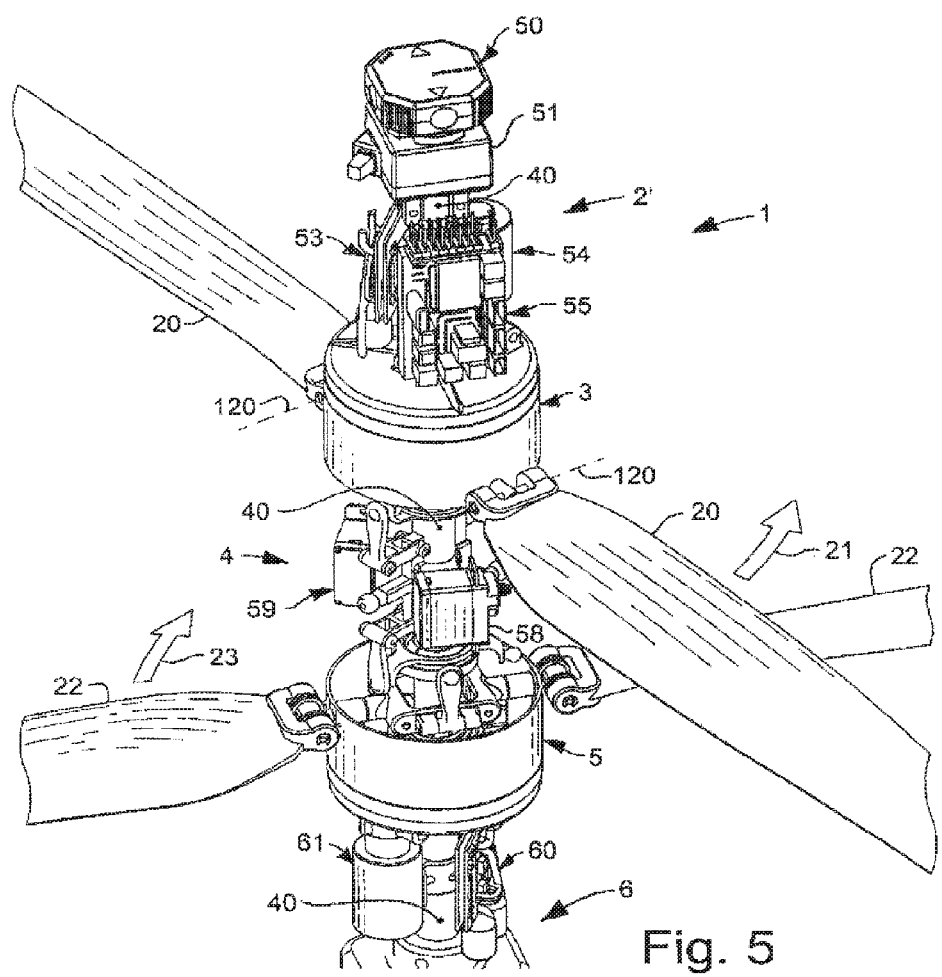
FIG. 5 is an enlarged perspective view of the vehicle of FIG. 2A, with portions broken away, showing an upper interior section of the vehicle and the counter-rotating coaxial rotor system.
Figure 6:
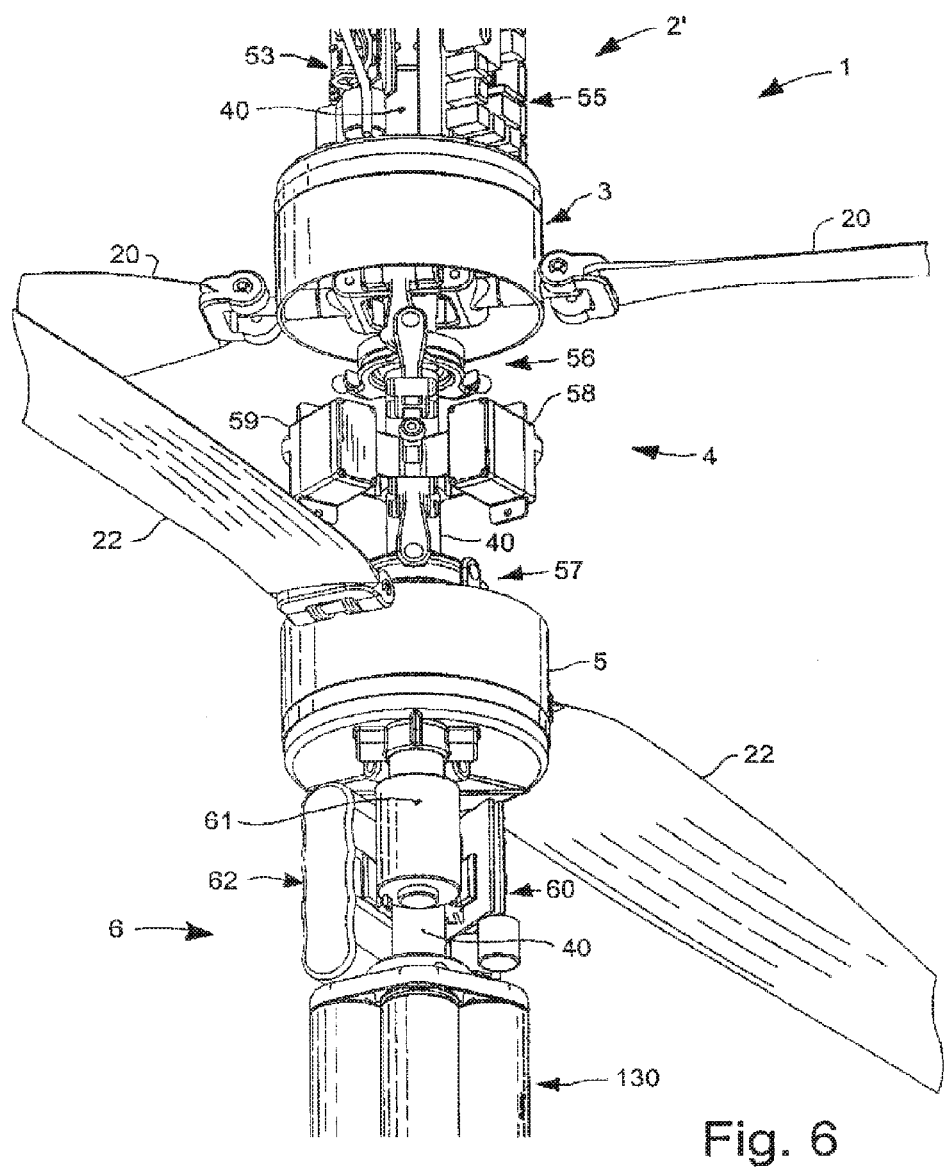
FIG. 6 is an enlarged perspective view of the vehicle of FIG. 2A, with portions broken away, showing a lower interior section of the vehicle and the counter-rotating coaxial rotor system.

As suggested in FIGS. 1, 25A, and 25B, first rotor system 3 includes a first motor 54, first rotor blades 20, and a first pitch controller 56. In illustrative embodiments, motor 54 is an electric motor as shown, for example, in FIGS. 4-6, or other suitable means for providing power to rotate rotor blades 20 about common axis 7. First rotor system 3 and second rotor system 5 are similar to one another in structure and function. Second rotor system 5 includes a second motor 61, second rotor blades 22, and a second pitch controller 57. In illustrative embodiments, motor 61 is an electric motor as shown, for example, in FIGS. 4-6, or other suitable means for providing power to rotate rotor blades 22 about common axis 7. Illustratively, electrical and electronic components are connected and communicate through electrical conduit 173 and electronic conduit 174 which hold power and signal lines, respectively. Although rotary wing vehicle 1 is illustrated having two rotor systems, rotary wing vehicle 1 may have more than two rotor systems as performance and mission demands dictate.

Figure 3:
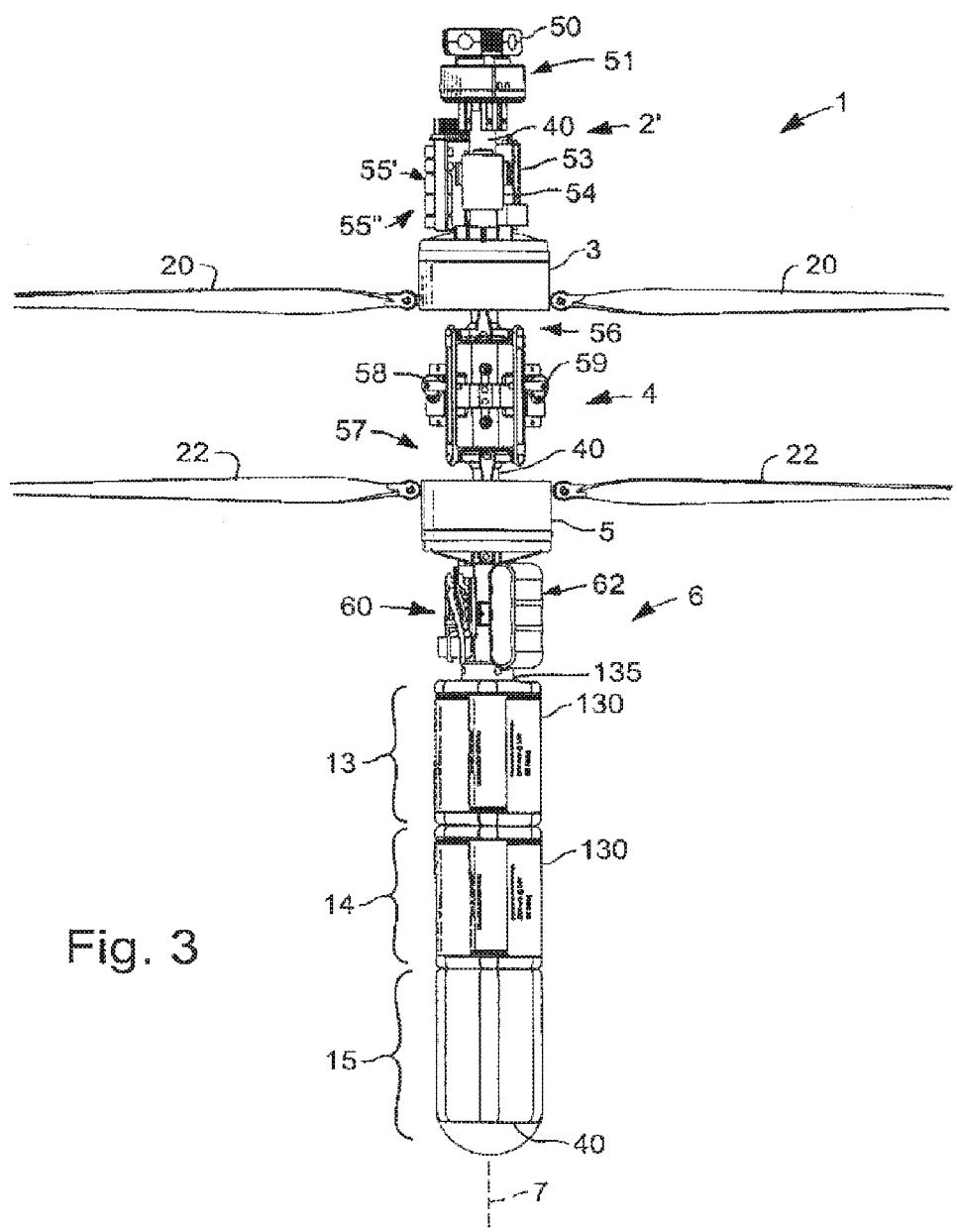
FIG. 3 is a side elevation view of the rotary wing vehicle of FIG. 2A showing exterior body panels, electrical wiring, and booster section removed for clarity.

As shown in FIGS. 1 and 3, airframe 40 is non-rotating and forms a central elongated hollow backbone to receive first module 2, first and second rotor systems 3, 5, power modules 13 and 14, and second module 15. Illustratively, power modules 13 and 14 are positioned to lie in side-by-side relation to one another between second rotor system 5 and second module 15. Because airframe 40 is hollow power modules 13, 14 can be connected electrically through the hollow backbone to motors 54 and 61.

Illustratively, pitch controller 56 is a swashplate 56' coupled to a fore/aft servo 58 and a roll servo 59 to vary the cyclic pitch of rotor blades 20 in response to input from a controller 55. In some embodiments, swashplate 56' is further coupled to a collective servo 98 to collectively change the pitch of rotor blades 20. Likewise, pitch controller 57 is a swashplate 57' coupled to a fore/aft servo 58 and a roll servo 59 to vary the cyclic pitch of rotor blades 20 in response to input from a controller 55. In some embodiments, swashplate 57' is also coupled to a collective servo 98 to collectively vary the pitch of rotor blades 20. In illustrative embodiments, controller 55 is a command signal controller as shown, for example, in FIG. 3, or other suitable means for providing a desired electrical or mechanical directional signal to servos 58, 59, or 98, and motors 54, 61.

Illustratively, rotary wing vehicle 1 has a fixed-pitch rotor system having two servos 58, 59 for aircraft pitch (helicopter-style fore/aft cyclic input) or aircraft roll (helicopter-style right/left cyclic input) control. Servo 98, shown in phantom in FIG. 1, can be mounted similarly to servos 58, 59 if collective pitch control is desired. In embodiments having a fixed-pitch rotor system, rotor systems 3,5 are connected to swashplates 56', 57' by pitch links 119. Servos 58, 59 are connected to swashplates 56', 57' by pitch links 125, 126. A feature of the present disclosure is that rotary wing vehicle 1 can be flown with as few as one or two cyclic servo actuators (servo 58, 59). In a "one-servo" flight mode, differential torque of motors 54, 61 controls yaw orientation, and servo 58 controls forward and backward flight. With only one cyclic servo, rotary wing vehicle 1, also called vehicle 1, can be flown much like an airplane having only rudder and elevator control. In the illustrative "two-servo" flight mode, servos 58, 59 provide fore/aft aircraft pitch and right/left aircraft roll control with differential torque of motors 54, 61 providing yaw control.

In operation, rotor hubs 101 rotate in opposite directions. Servos 58, 59 are controlled by onboard flight control electronics to tilt simultaneously swashplate 56' and swashplate 57' which then cyclically vary the blade pitch angle of rotating rotor blades 20 to tilt vehicle 1 in one of aircraft pitch direction 170 and aircraft roll direction 171. In another embodiment having collective pitch (see FIG. 11B), collective servo 98 and a third pitch link (not shown) are provided to vary the axial location of swashplates 56', 57' along common axis 7 and to vary the collective pitch of rotor blades 20, 22 using electronic Collective-Cyclic Pitch Mixing (CCPM). With collective-cyclic pitch mixing servos 58, 59, and 98 tilt swashplates 56' and 57' in unison to vary cyclic pitch and move swashplates 56', 57' axially in unison along common axis 7 to vary collective pitch.

The illustrative embodiment employs differential motor speed for yaw (heading) control while in a vertical flight configuration. Normally, coaxial helicopters use variable blade pitch and differential blade angle to control yaw motions in flight. In the present disclosure, differential torque generated by operating motors 54, 61 at different speeds relative to the fixed body of vehicle 1 generates yaw forces to stabilize and control yaw motion (i.e. rotation about common axis 7). In this method, the torque (and eventually the speed) of motor 54 is increased or decreased in response to a yaw motion of rotary wing vehicle 1 about vertical common axis 7. The torque (speed) of second motor 61 is adjusted automatically by an onboard computer system, contained within controller 55, in opposition to the torque (speed) of first motor 54 to maintain constant lift so that rotary wing vehicle 1 neither gains nor loses altitude.

Figure 11A:
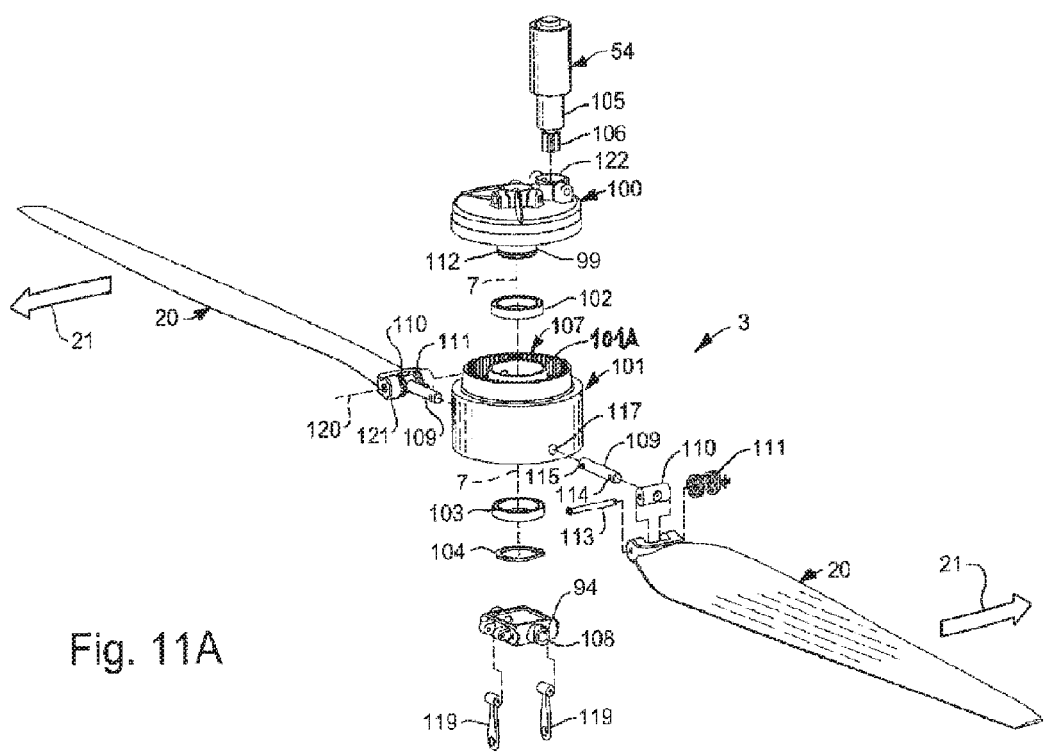
FIG. 11A is an exploded perspective view of a rotor module having rotor blades with variable cyclic pitch and fixed collective pitch.

Rotor blades 20 and 22 are coupled to rotary wing vehicle 1, also called rotary wing aircraft 1, and supported for rotation by rotor hubs 101. Rotor hubs 101 are further coupled for pivotable movement to an internal yolk 108, as shown best in FIG. 11A. Pivot axles 109 extend through rotor hub 101 and are received by yolk 108. Yolk 108 is adapted to couple a pair of rotor blades to rotor hub 101 for rotation about common axis 7. Yolk 108 is further coupled to a first end of a pair of pitch links 119. Each pitch link 119 is further coupled on a second end to a perimeter edge of swashplate 56' or 57'. Thus, yolk 118 is pivoted by input from swashplate 56', 57' in response to linear motion input from servos 58, 59, or 98. This pivoting motion of yolk 118 in turn causes each rotor blade 20, 22 to pivot in response, thus increasing or decreasing the rotor blade pitch of rotor blades 20, 22.

Figure 2A:
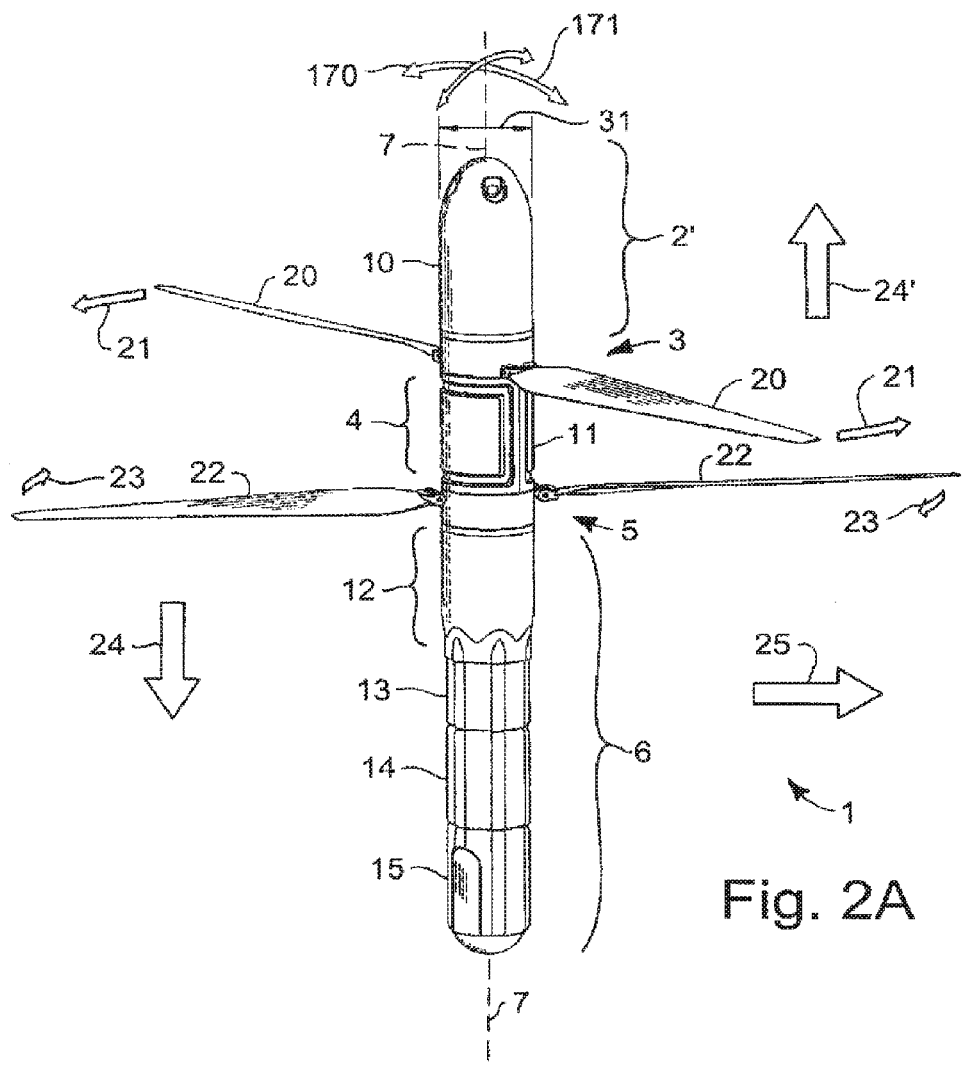
FIG. 2A is a perspective view of a rotary wing vehicle in accordance with the present disclosure showing a counter-rotating coaxial rotor system in a vertical flight mode.
Figure 2B:
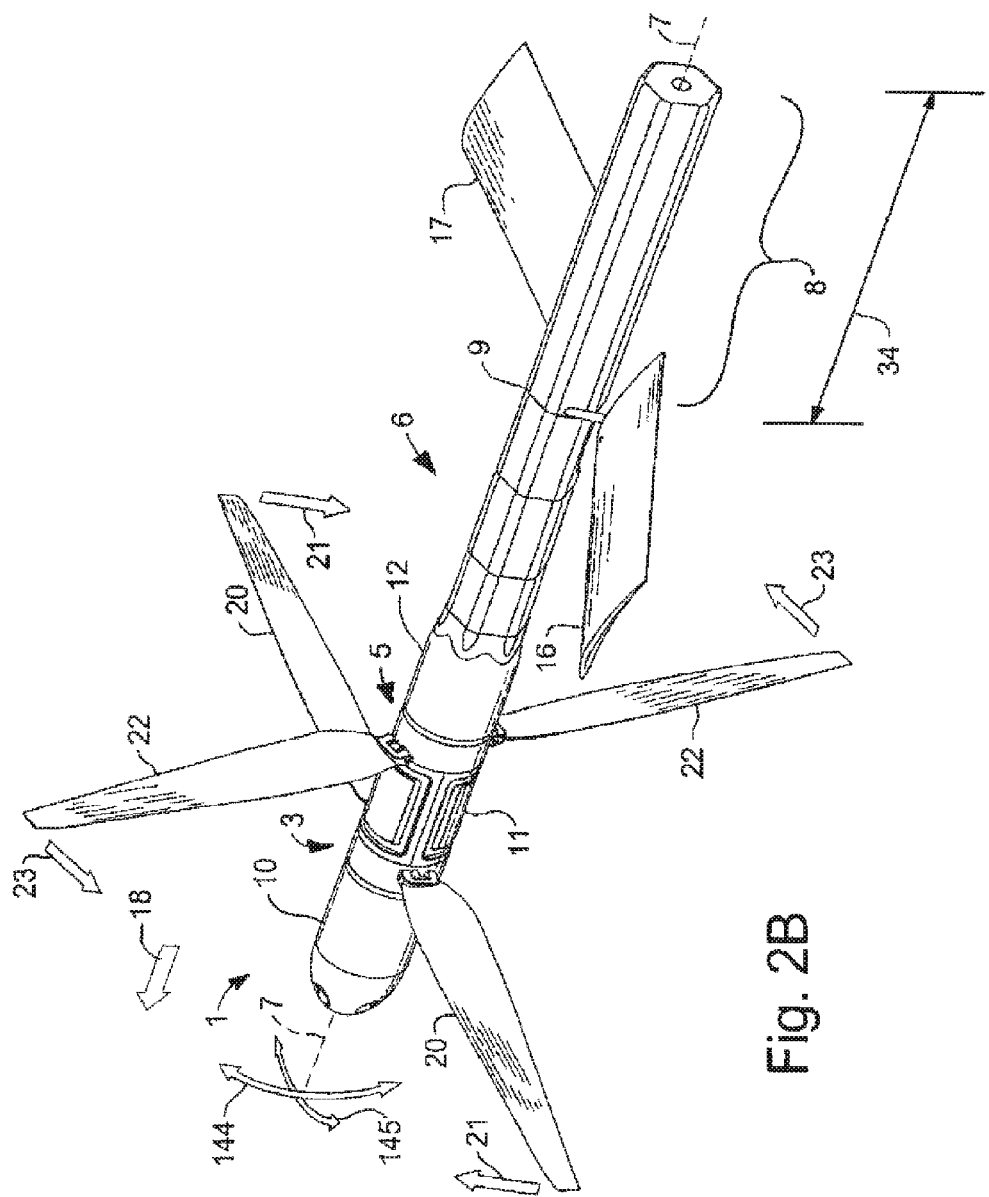
FIG. 2B is a perspective view of the rotary wing vehicle of FIG. 2A having a counter-rotating coaxial rotor system and a fixed-wing booster module in a horizontal flight mode.

As suggested in FIGS. 2A and 2B, a rotary wing vehicle 1 includes an upper section 2', first and second rotors 3 and 5, a middle section 4, a lower section 6, first and second power modules 13, 14, and a payload 15' arranged in spaced apart relation along common axis 7. Referring now to FIGS. 2A-4, internal mechanical and electrical components within upper section 2' and middle section 4 of vehicle 1 are enclosed by a thin-walled upper body shell 10 and a middle body shell 11, respectively. A lower body shell 12 covers a portion of lower section 6, but could be extended to cover all of lower section 6. A feature of the present disclosure is that body shells 10, 11 are blow-molded from a plastic material such as polycarbonate or ABS, and, in conjunction with backbone 40, form a structure for rotary wing aircraft that has both a central strength component and a thin exterior cover component that together are stiff, strong and easy to manufacture.

Figure 10:
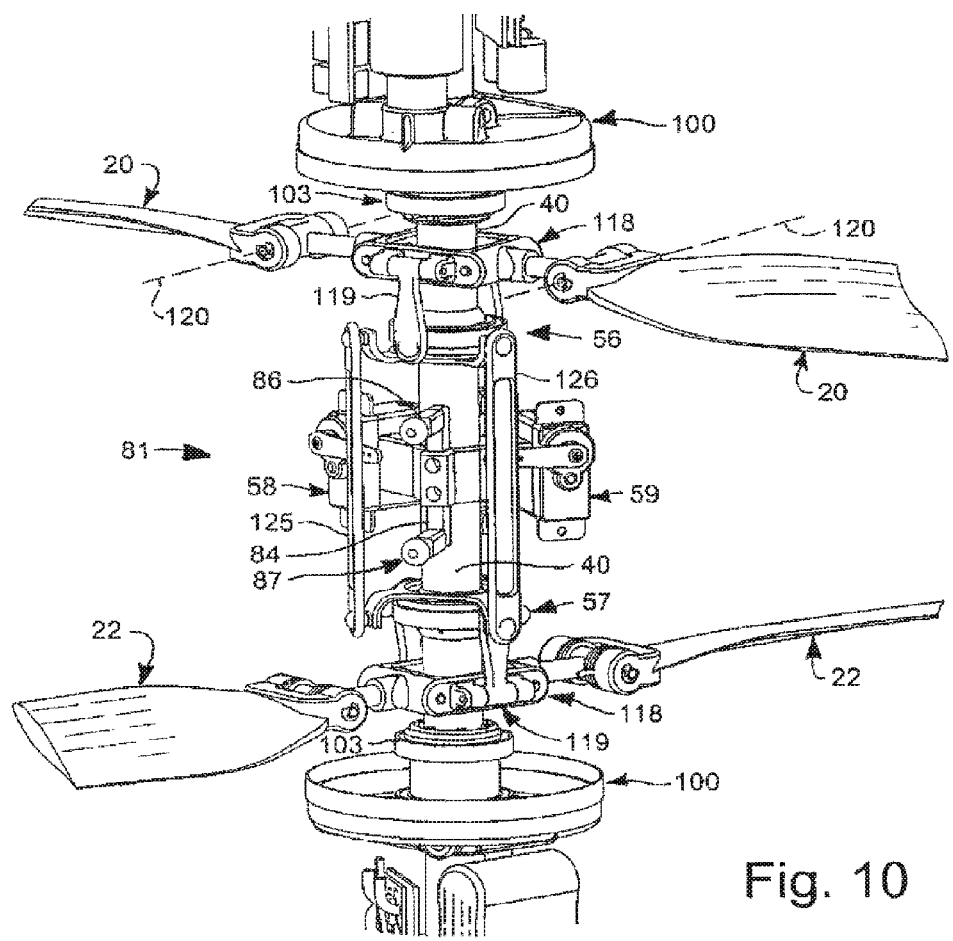
FIG. 10 is an enlarged perspective view of a middle interior section of the vehicle of FIG. 2A, with portions broken away, showing the counter-rotating coaxial rotor system.

As shown in FIG. 3, a rotary wing aircraft 1 in accordance with the present disclosure has a rotor system comprising a motor 54 operably connected to rotor blades 20 by means of a drive train such as gears 106, 107 (FIG. 11). A pitch control such as a swashplate 56' (FIG. 10) is operably connected to rotor blades 20 to vary the cyclic and/or collective pitch of rotor blades 20 in response to output from a servo actuator such as servos 58,59 (FIG. 3) through linkages such as pitch links 125, 126 (FIG. 10). Power such as electricity from batteries (not shown) or fuel from a storage tank (not shown) in a power module 13 flows through a power conduit across rotor system and provides power to operate controller 55, motor 54, and servos 58 and 59. Control signals from controller 55 flow along a signal conduit and regulate the speed of motor 54 and the positioning output of servos 58 and 59. The power conduit and signal conduit are conducted between an inflow side and an outflow side of rotor blades 20 through channels 96, also called interior space 96, formed in the structural spine or backbone 40 (FIGS. 7A, 7B, and 15) of vehicle 1.

In hovering flight, first rotor 3 and second rotor 5 rotate in opposite directions about common axis 7 forcing air downward in direction 24 and lifting vehicle 1 in an upwardly direction, as suggested in FIG. 2A. First rotor 3 has rotor blades 20 configured to rotate in direction 21, and second rotor 5 has rotor blades 22 configured to rotate in direction 23 about common axis 7. Because first rotor blades 20 and second rotor blades 22 are equipped with a cyclic pitch control, vehicle 1 is configured for directional flight in direction 25 wherein common axis 7 is orientated substantially vertically.

Referring now to FIG. 2B, a second embodiment contemplated by the current disclosure is depicted having a booster module 8 appended to lower section 6 at a booster interface 9. Booster module 8 contains, for example, an auxiliary power source (not shown) to augment an internal power source contained in power modules 13 and 14 carried in vehicle 1. Illustratively, the auxiliary power source (not shown) and power modules 13 and 14 are electrical batteries 13 and 14. Booster module 8 includes left and right wings 16, 17 to provide additional lift for vehicle 1 in directional flight in direction 18 wherein common axis 7 is oriented substantially horizontally.

Figure 4:
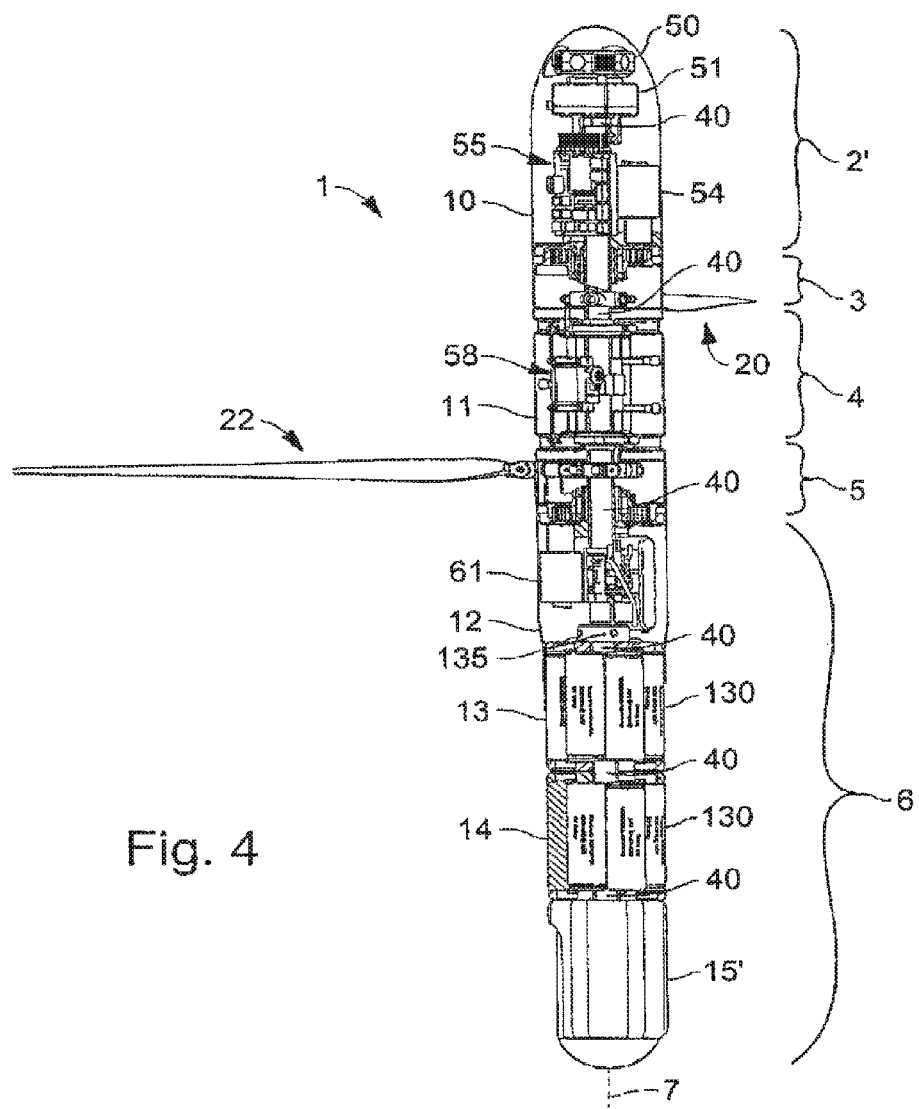
FIG. 4 is a side elevation view, with portions broken away, of the vehicle of FIG. 2A showing a counter-rotating coaxial rotor system and an electrical power source.
Figure 7:
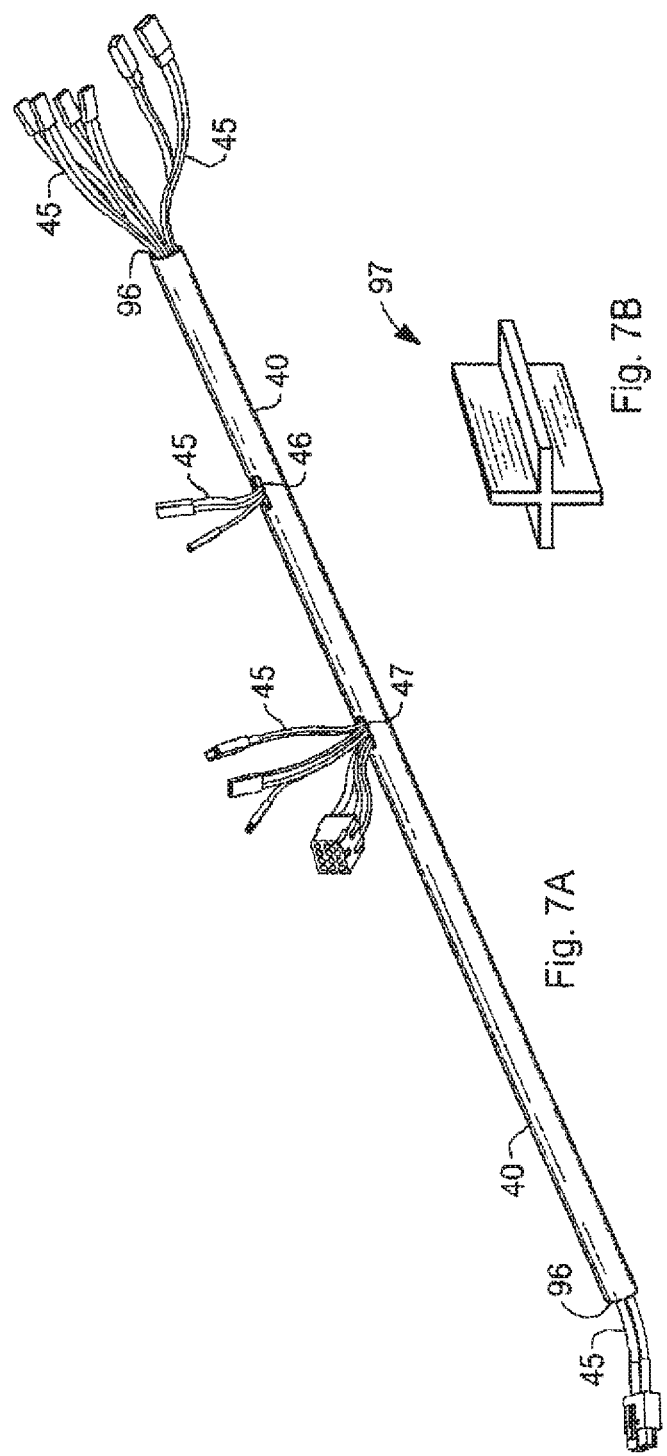
FIG. 7A is a perspective view of a core tube or backbone having a circular cross section and a hollow interior channel that is used as a conduit between sections of the vehicle and showing electrical wiring running through the hollow interior and entering and exiting at various points.
FIG. 7B is a perspective view of backbone having a generally cruciform cross section with exterior channels running the length of the backbone that can be used as conduits between sections of the vehicle.

Airframe 40 forms a structural backbone of rotary wing vehicle 1 and generally runs vertically through the center of rotary wing vehicle 1 from upper section 2' to lower section 6, as shown best in FIG. 4. Illustratively, airframe 40 is a non-rotating core tube with a hollow interior channel 96 (FIG. 7A) or a cruciform beam 97 with exterior channels (FIG. 7B). First and second rotor systems 3, 5, also called first and second rotor modules 3, 5, all components within upper section 2', middle section 4, and lower section 6 are coupled to airframe 40. Referring now to FIG. 7A, elongated central backbone 40, also called non-rotating hollow core tube 40, further acts as a conduit for electrical wiring 45, plumbing (not shown), and mechanical linkages (not shown) passing between components in upper section 2', middle section 4, and lower section 6 of rotary wing vehicle 1. Longitudinal slots 46 and 47 are provided as entry and exits points for electrical wires 45, plumbing, and linkages. Since non-rotating hollow core tube 40 and cruciform beam are unitary and continuous between body sections 2, 4, and 6, the rigidity and light-weight structural properties of vehicle 1 are increased. Illustratively, non-rotating hollow core tube 40 and cruciform beam 97 are preferably made of wound or pultruded carbon graphite fiber, fiberglass, or aluminum alloy number 7075 (or similar) with an outside diameter (core tube 40) or width dimension (cruciform beam) of about 0.5 inches (13 mm) and a wall thickness of between about 0.03 inches (0.76 mm) and about 0.05 inches (1.3 mm).

Rotary wing vehicle 1 is arranged having three body sections, as shown best in FIG. 3. Upper section 2' is arranged having a horizon sensor/stabilizer 50, an electronic gyro stabilizer 51, a gyro mounting table 52 coupled to an upper end of core tube 40, a first motor speed controller 53, a first motor 54, a radio receiver, and controller 55. Middle section 4 includes a first swashplate 56', a second swashplate 57', a fore-aft cyclic servo 58, and a roll cyclic servo 59. Lower section 6 includes a second motor speed controller 60, a second motor 61, a radio battery 62, first and second power modules 13 and 14, and payload module 15.

In the illustrated embodiment, horizon sensor/stabilizer 50 is a model "FS8 Copilot" model by FMA company, electronic gyro stabilizer 51 is a "G500" model silicone ring gyro by JR company, motors 54, 61 are "B2041S" models by Hacker company, and motor speed controllers 53, 60 are "Pegasus 35" models by Castle Creations company which are computer-based digital programmable speed controllers. Rotary wing vehicle 1 is also configured to receive a GPS receiver/controller and telemetry system (not shown), arranged to be coupled to upper section 2'.

Figure 8:
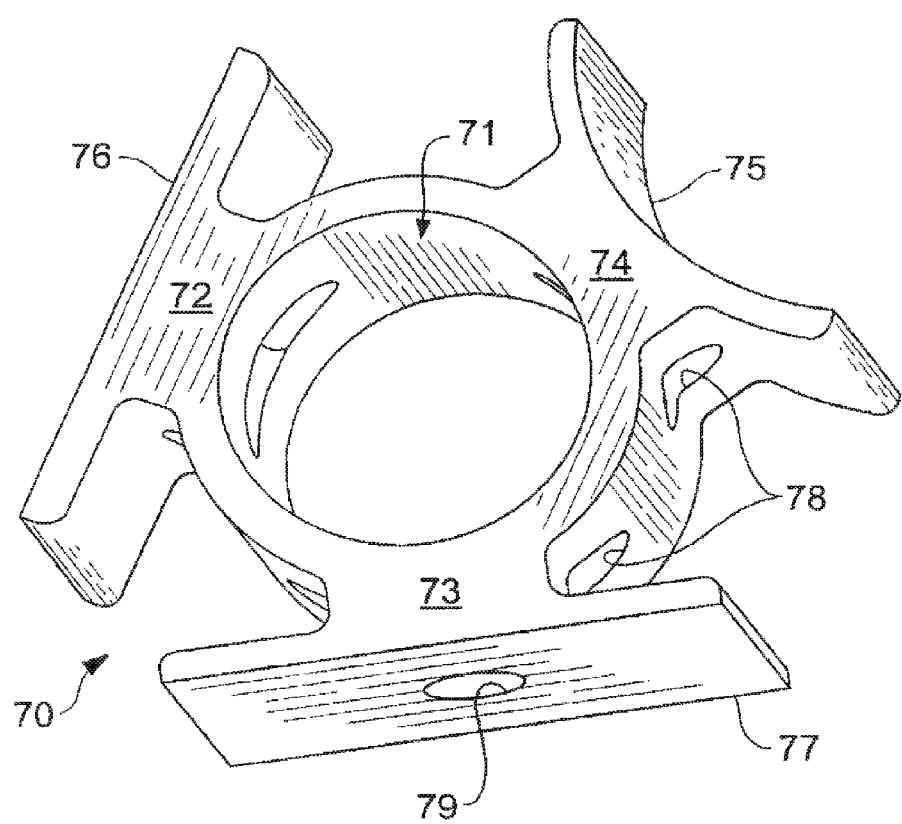
FIG. 8 is an enlarged perspective view of a first ring mount.
Figure 9:
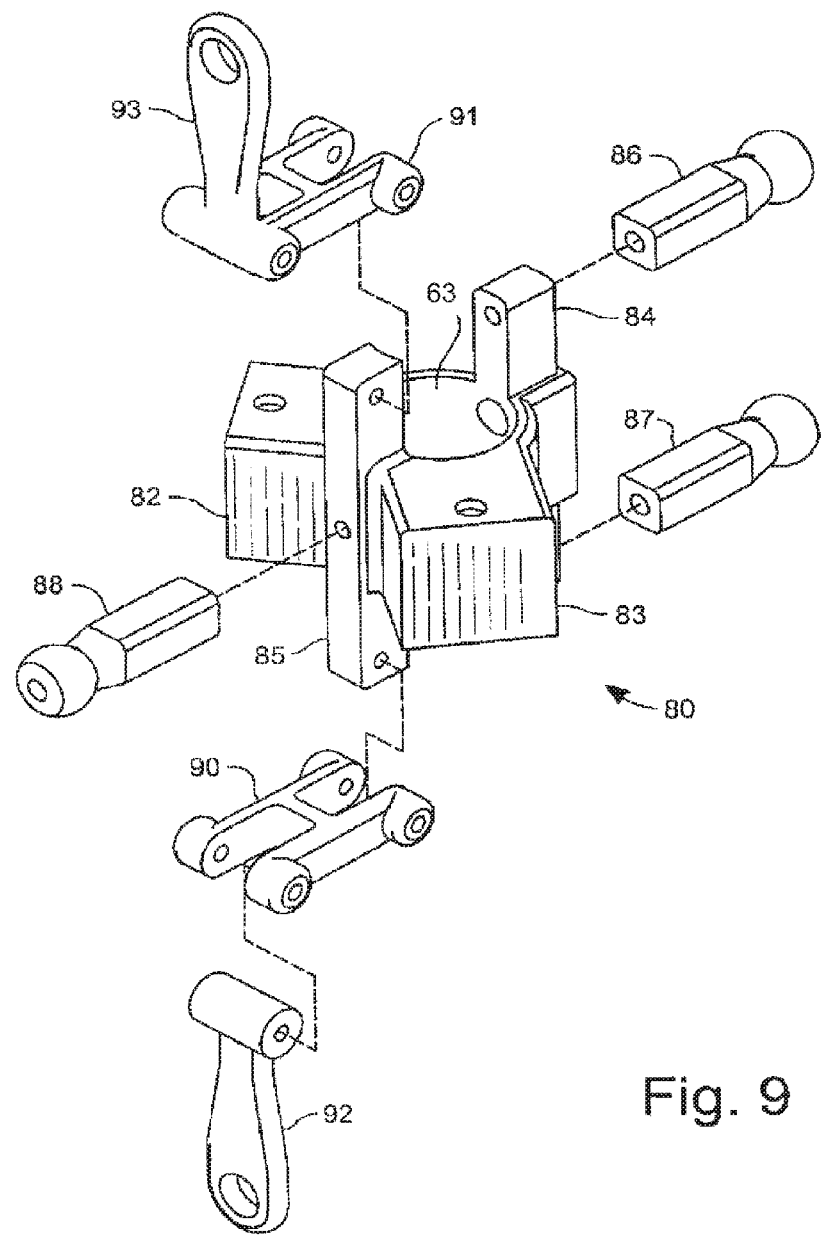
FIG. 9 is an exploded perspective view of a second ring mount showing attached linkages and body supports.

Interior components of rotary wing vehicle 1 are coupled to core tube 40 by ring mounts 70, as shown in FIG. 8. Ring mount 70 includes an annular inner portion 71 conforming to the annular exterior surface of core tube 40. Ring mount 70 includes radially extending mounting arms 72, 73, 74 having flanges 75, 76, 77 adapted to hold mechanical, electrical, and other interior components of rotary wing vehicle 1. Ring mount 70 is arranged to support motor 54 in flange 75, motor speed controller 53 on flange 76, and radio receiver 55" on flange 77. Interior components of vehicle 1 are coupled, for example, to mounting flanges using a variety of fasteners (such a nylon ties through apertures 78) or adhesives. Annular portion 71 provides means for locking ring mount 70 to non-rotating hollow core tube 40 to prevent ring mount 70 from rotating or sliding axially along non-rotating hollow core tube 40. Means for locking ring mount 70 to non-rotating hollow core tube 40 includes fasteners (not shown) received by set screw receiver 79 or a variety of adhesives. A second ring mount 80, as shown in FIG. 9, includes an annular ring 63, arms 82 and 83, and axial posts 84, 85 for supporting body standoffs 86, 87, 88, swashplate anti-rotation arms 90 and 91, and swashplate links 92 and 93.

Servo module 81 includes ring mount 80 supporting pitch servo 58, roll servo 59, and universal body standoffs 86, 87 (as described in U.S. Provisional Patent Application No. 60/525,585 to Arlton which is hereby incorporated by reference herein) which support middle body shell 11, as shown, for example, in FIG. 10. As suggested in FIGS. 3, 4, 5, 6, 9, 10 and 15, body standoffs 86, 87, 88 are secured to ring mount 80. Through-holes 263 in body standoffs 86, 87, 88 are receptive to many types of commercial fasteners such as bolts and rods (not shown) for securing body standoffs 86, 87, 88 to ring mount 80 and middle body shell 11. Middle body shell 11 is generally secured to body standoffs 86, 87, 88 to provide a cover and aerodynamic fairing for servos 58, 59 and swashplates 56', 57'. Ring mounts 70, 80 are arranged to incorporate and support many structural features of rotary wing vehicle 1. Ring mounts 70, 80 assist assembly of rotary wing vehicle 1 because ring mounts 70, 80 and associated interior components can be preassembled as subassemblies and then later assembled along with other modules to non-rotating hollow core tube 40 in a final manufacturing step.

Referring now to FIGS. 11A, 12A, 12B, 13A, 13B and 14, rotor system 3, also called rotor module 3, includes a rotor mount 100, a rotor hub 101 having an internal gear 107, first and second ball bearings 102 and 103, a shaft 101A extending between bearings 102 and 103, a ring clip 104, motor 54, a planetary gearbox 105, a pinion gear 106, a blade yolk 108, pivot axles 109, axle end caps 110, torsion springs 111, and rotor blades 20. A motor mount 122 is receptive to gearbox 105 to couple motor 54 to rotor mount 100. When assembled, bearings 102, 103 are retained by ring clip 104 engaging slot 99 on a boss 112 extending from rotor mount 100. Rotor blade 20 is held in place by a pin 113 extending through cap 110 and aperture 114 formed in axle 109. Axle 109 passes through a bearing aperture 117 formed in rotor hub 101 and into an aperture 94 in yolk 108 when it is retained by another pin (not shown). Pitch links 119 couple yolk 108 to swashplate 56'.

Figure 11B:
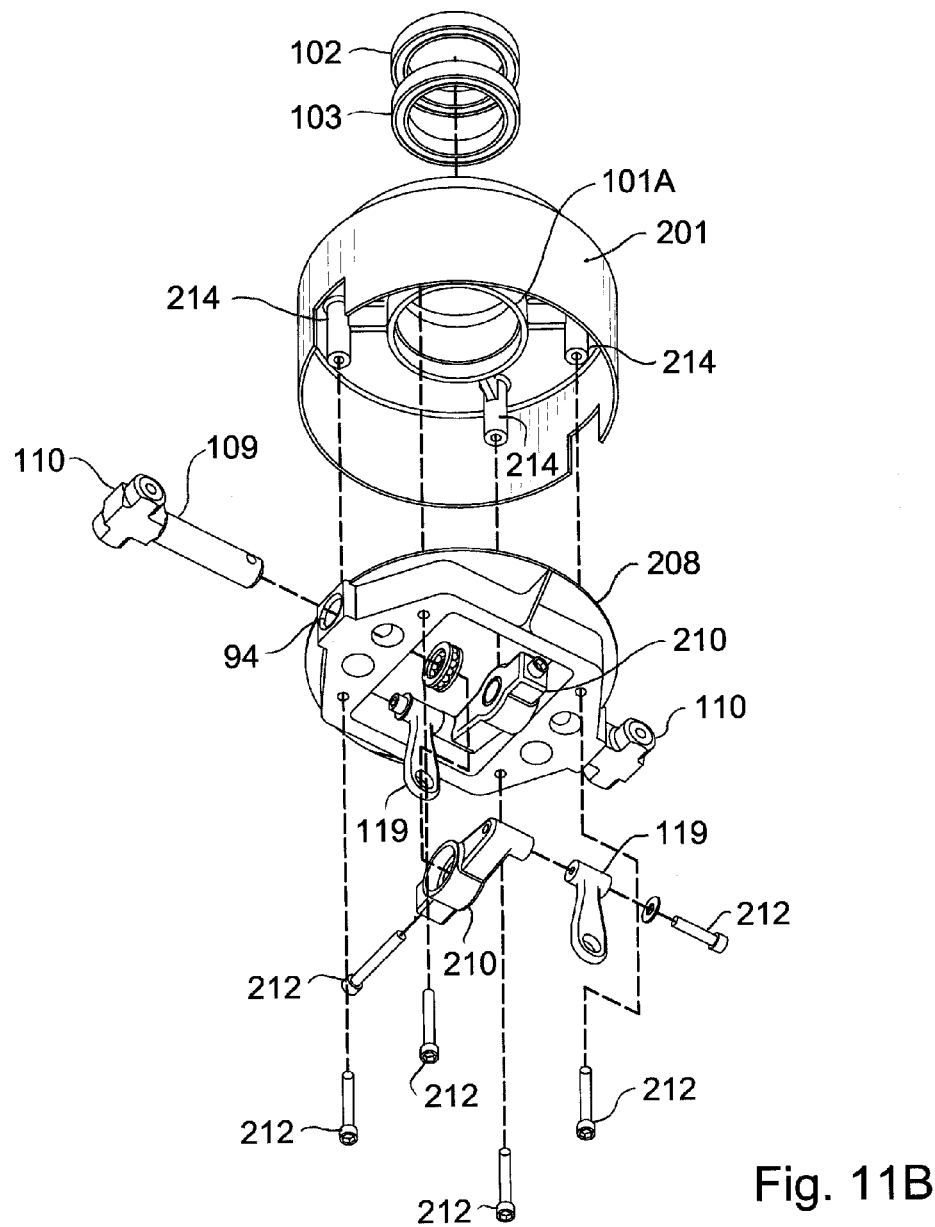
FIG. 11B is an exploded perspective view of a rotor module having rotor blades with variable cyclic and variable collective pitch.
Figures 12A, 12B:
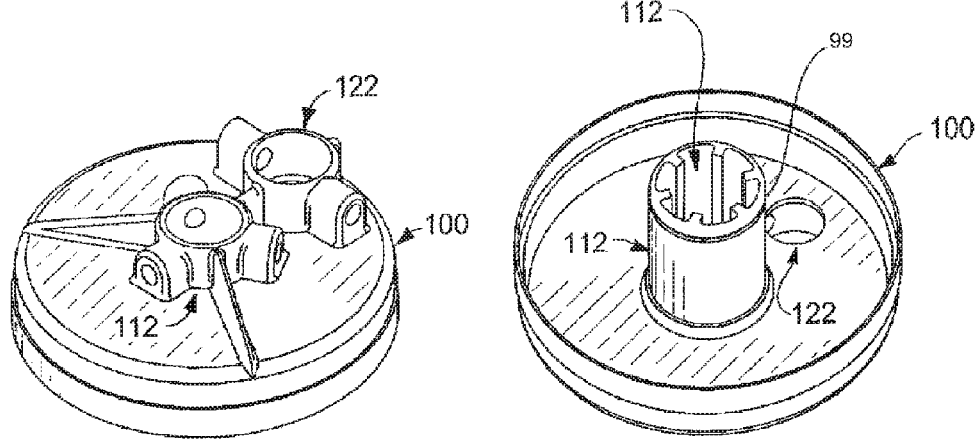
FIGS. 12A and 12B are perspective views of a first side and a second side of a motor mount.
Figure 13A:
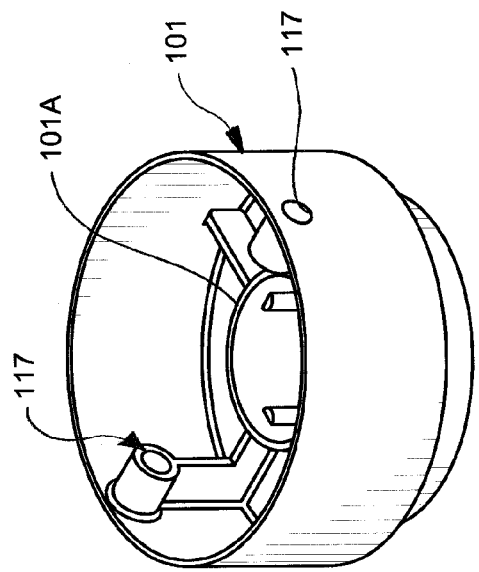
FIGS. 13A and 13B are perspective views of a first side and a second side of a rotor hub.
Figure 13B:
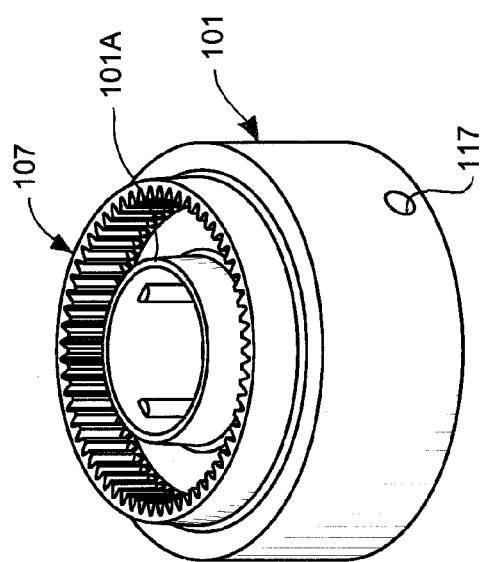

As shown in FIG. 11B, a rotor module adapted to support both cyclically and collectively pitchable rotor blades includes collective rotor hub 201 that is similar to rotor hub 101 and receptive to a collective yolk frame 208 coupled to bosses 214 formed on an interior surface of hub 201 by fasteners 212. Collective yolk frame 208 supports the radial flight loads produced by rotor blades 20 acting through thrust bearings 203. Pitch links 119 couple pitch arms 210 to swashplate 56'.

Illustratively, planetary gearbox 105 has a reducing speed ratio of about 4:1. Pinion gear on motor 54 has nine teeth and engages internal gear 107 on rotor hub 101 which has sixty teeth, so the total speed reduction ratio of rotor module 3 is about 26.7:1 (that is, the output shaft of motor 54 turns 26.7 times for each turn of rotor hub 101). This reduction ratio encourages the use of high efficiency electric motors running at high voltages and high speeds.

Illustratively, motor 54 is a brushless motor. In some applications, especially where flight times are short and economy is a factor (for example, in a short-range disposable munition) several low-cost brushed motors (i.e. motors having carbon brushes and rotating commutators) are used in place of one high-cost brushless motor 54 to turn rotor hub 101. In such cases, while rotor module 3 is shown having one motor 54 to drive rotor hub 101, it is within the scope of this disclosure to include several motors around the circumference of rotor mount 100 to drive rotor hub 101 instead of only one. It is also anticipated that rotor hub 101 itself can be configured with wire coils and magnets to act as a motor so that no separate motors are required to drive rotor hub 101 about common axis 7.

Rotor blade 20 in the embodiment shown is injection molded of polycarbonate plastic material and is of the type described in U.S. Pat. No. 5,879,131 by Arlton, which patent is hereby incorporated by reference herein. Rotor blade 20 is free to flap upward and downward about 6 degrees about flapping axis 120 before tabs 121 on torsion springs 111 contact pitch axle 109 and resist further flapping. This means that rotor blades 20 can flap up and down freely in flight about +/−6 degrees and can fold upward 90 degrees and downward 90 degrees for storage or during a crash landing.

In the embodiment shown in the drawings, rotor mount 100 is injection molded in one piece from a thermoplastic material such as polycarbonate or nylon. Rotor hub 101 is injection molded in one piece from a thermoplastic material such as nylon or acetal. Rotor blades 20 are supported in flight by rotor hub 101 (which forms part of the exterior body shell of vehicle 1 instead of by traditional coaxial shafts coincident with common axis 7. This places rotor support bearings 102, 103 very close to rotor blades 20 and frees space within the central body portion of rotary wing vehicle 1 for other mechanical or electrical components. In a fixed-pitch rotor system (shown in the drawings) radial flight forces produced by rotating blades 20 are supported by internal yolk 108 which connects two rotor blades 20 and which includes an internal aperture surrounding and bypassing core tube 40, thus no special thrust bearings are required.

Referring now to FIG. 15, a coaxial rotor system in accordance with the current disclosure comprises core tube 40, two rotor systems 3, 5, two swashplates 56' and 57', and one servo module 81 coupled to non-rotating hollow core tube 40 in mirrored symmetry around servo module 81. While a coaxial rotor system with two rotors is disclosed, rotary wing vehicle 1 could be equipped with additional rotor systems (not shown) spaced apart along the length of non-rotating hollow core tube 40 for additional thrust or operational capabilities.

In the illustrated embodiment, rotary wing vehicle 1 has a fixed-pitch rotor system which requires only two servos 58, 59 for aircraft pitch (fore-aft cyclic) and aircraft roll (right-left cyclic) control. A third collective servo 98 can be mounted in a similar fashion in middle section 4, for instance, if collective pitch control is desired.

Rotor systems 3,5 are connected to swashplates 56', 57' by pitch links 119. Servos 58, 59 are connected to swashplates 56', 57' by pitch links 125, 126. In operation, rotor hubs 101 rotate in opposite directions. Servos 58, 59 are controlled by onboard flight control electronics 55' to tilt simultaneously swashplate 56' and swashplate 57' which then cyclically vary the blade pitch angle of rotating rotor blades 20 to tilt vehicle 1 in one of aircraft pitch direction and aircraft roll direction. In another embodiment having collective pitch (see FIG. 11 B), a third servo and third pitch link (not shown) are provided to vary the axial location of swashplates 56', 57' along common axis 7 and to vary the collective pitch of rotor blades 20, 22 using electronic Collective-Cyclic Pitch Mixing (CCPM). Using servos positioned to lie between rotor systems 3, 5 and directly coupling control swashplates 56', 57' with linkages to control a coaxial rotor system in this way is a feature of the embodiment.

An illustrative embodiment of the disclosure includes motors 54, 61 positioned to lie above and below rotor blades 20, 22 (see FIG. 25A) with power transmission between the rotor systems 3, 5 accomplished through electrical wiring 45 instead of mechanical shafting thereby reducing mechanical complexity and weight. In another embodiment (see FIG. 26), motors 54, 61 are positioned to lie between the rotor blades 20, 22, and servo actuators 58, 59 are positioned to lie in spaced-apart relation to locate rotor blades 20, 22 therebetween (see FIG. 26). Because power and control of the rotor systems 3, 5 is entirely electrical in nature, the entire control system of rotary wing vehicle 1 can be operated electrically by digital computers and solid-state electronics without mechanical linkages or hydraulic amplification. Locating the motors 54, 61, as shown in FIG. 25A, eliminates the need for concentric rotating shafting between rotor blades 20, 22, and positions servos 58, 59 to drive both swashplates 56', (included in first pitch controller 56) 57' (included in second pitch controller 57) directly.

A feature of the present disclosure is that vehicle 1 can be flown with as few as one or two cyclic servo actuators (servo 58, 59). In a one-servo flight mode, differential torque of motors 54, 61 controls yaw orientation, and servo 58 controls forward and backward flight. With only one cyclic servo, vehicle 1 can be flown much like an airplane having only rudder and elevator control. In a two-servo flight mode, as illustrated in the drawings, servos 58, 59 provide fore/aft aircraft pitch and right/left aircraft roll control with differential torque of motors 54, 61 providing yaw control.

Figure 16A:
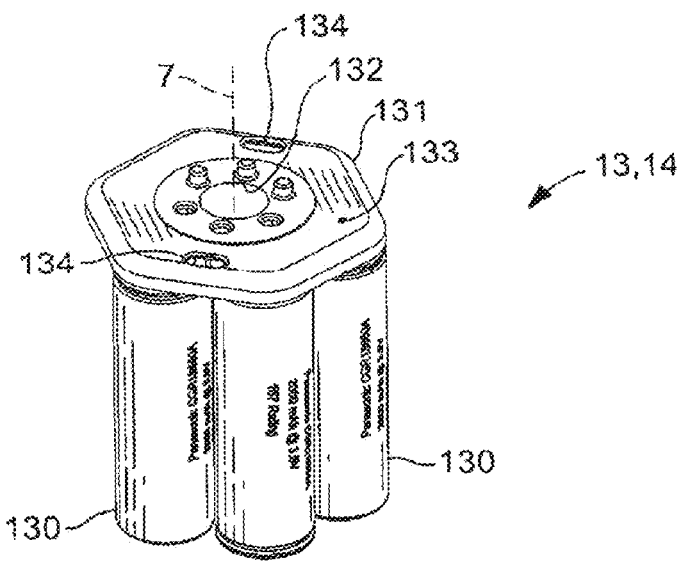
FIGS. 16A and 16B are exploded perspective views of a single power module including several batteries.
Figure 16B:
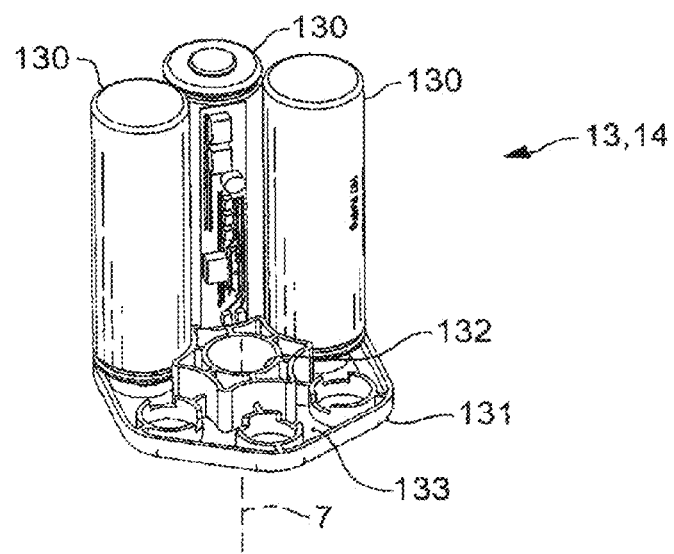

In another embodiment of the current disclosure, power to drive motors 54, 61 in flight is provided by high-capacity electric batteries 130 such as lithium-polymer or lithium-ion batteries, or fuel cells. Referring now to FIGS. 16A and 16B, power module 13 has six rechargeable lithium ion batteries 130 arranged in a hexagonal pattern around non-rotating hollow core tube 40 and wired in series to produce about 21.6 volts of electrical potential. Battery ring mount 131 is formed to include center aperture (ring) 132 to accommodate non-rotating hollow core tube 40 and flange 133 to hold batteries 130. Electrical wires 45 from power module 13 enter non-rotating hollow core tube 40 at opening 47 (see FIG. 7A), and are routed through non-rotating hollow core tube 40 to motor speed controllers 53, 60.

As shown best in FIG. 25A multiple power modules 13, 14 are provided for additional energy capacity during flight and are, illustratively, wired in parallel to increase the electrical current available to motors 54, 61. Flight times of rotary wing vehicle 1 can be adjusted by adjusting the number of power modules 13, 14 carried in flight.

Extra locking rings (or ring mounts with no radial arms) 135 are provided above and below power module 13, 14 to help couple power modules 13, 14 to non-rotating hollow core tube 40, as shown, for example, in FIG. 4. Since power modules 13, 14 are relatively heavy compared to other components of vehicle 1, locking rings 135 prevent power modules 13, 14 from sliding along non-rotating hollow core tube 40 during a crash landing of rotary wing vehicle 1. A feature of the present disclosure is that rotary wing vehicle 1 is well-suited to be manufactured and assembled in modules. Rotor, wing, control, power, booster, electronics, and payload modules are manufactured separately and slid onto core tube 40. Electrical connectors for connections passing through openings 46, 47 in core tube 40 are mounted flush with the surface of core tube 40 to assist in assembly and disassembly of vehicle 1 for maintenance and repairs.

Energy density and power density are considerations in UAV design and can be applied to an aircraft as a whole. Aircraft with higher energy densities and power densities have better overall performance than aircraft with lower densities. In general, energy density and power density are defined as the amount of energy and power available per unit weight. For example, the energy density of a fuel or electric battery (also known as "specific energy") corresponds to the amount of energy contained in a unit measure of fuel or battery (measured, for instance, in Nm/Kg or ft-lbs/slug).

Chemical (liquid) fuels tend to have higher energy densities than electric batteries. One additional characteristic of liquid fuel power as compared to electric battery power is that the weight of a liquid fueled aircraft decreases over the course of a flight (as much as 60%) as it burns fuel. Consequently the energy density of a liquid fueled aircraft (i.e., the energy available per unit weight of the aircraft) decreases slowly and power density (power available per unit weight) increases as it flies. This means that the performance of liquid fueled aircraft actually improves near the end of a flight.

In contrast, the overall power density of an electric-powered aircraft is constant throughout the flight because the maximum output power of the batteries is almost constant and the batteries do not lose weight as they discharge. Energy density also decreases quickly because the total energy available decreases. To improve energy and power density of the current disclosure, an auxiliary electric booster or power module 8 is provided that can be jettisoned in flight after its energy supply is depleted. Thus, booster module 8 comprises additional battery modules (not shown) assembled around common axis 7 with a mechanism to retain booster module 8 to rotary wing vehicle 1.

In another embodiment, booster module 8 includes an internal combustion engine (such as a diesel engine not shown) which drives an electric generator (not shown) to convert chemical energy contained in a chemical fuel to electrical energy. In other embodiments contemplated by this disclosure, a turbo-electric generator system (not shown) may be used to create electrical energy. A consideration of a booster module 8 containing such a gas-electric generator is that the entire weight of the module, fuel system, and engine, can be jettisoned at the end of a first flight phase leaving the relatively low weight rotary wing vehicle 1 to complete a second flight phase.

Figure 17:
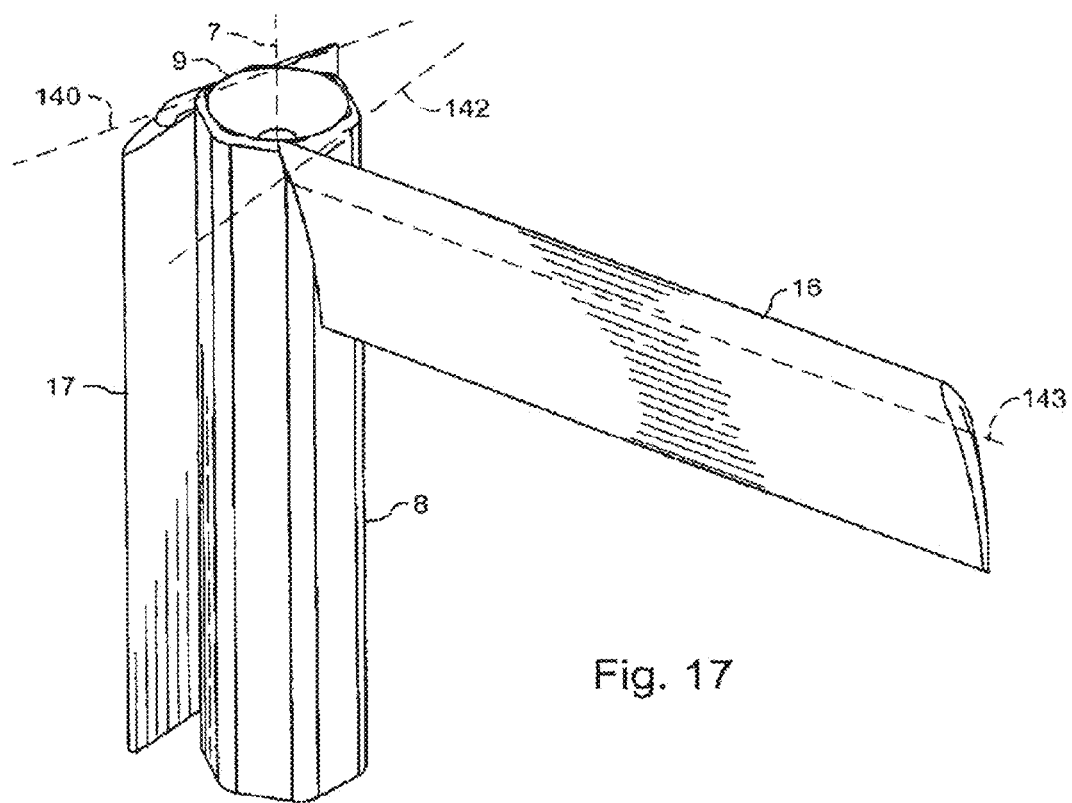
FIG. 17 is an orthographic view of the booster module of FIG. 2B showing one wing folded for storage and one wing extended in a flight configuration.

In the illustrative embodiment, booster module 8 includes foldable wings 16, 17 to increase lift in a horizontal flight mode of rotary wing vehicle 1. As shown in FIG. 17, wing 17 is folded about folding axis 140 for compact storage. Wings 16, 17 are attached at about their "quarter chord" location to pivot shafts (not shown). When deployed for flight with pivot shafts held rigidly perpendicular to common axis 7 (see also FIG. 2), wing 16 is free to pivot about pitch axis 143 to find its own best angle of attack. Because wings 16, 17 are free to rotate about their own pitch axes in flight, appendages such as wings 16, 17 are sometimes referred to as "free-wings." It should be noted that wings 16, 17, being free-wings, can operate efficiently over a wide speed range because of their ability to change pitch automatically to meet the oncoming airflow. Application of such a free wing to a rotary wing UAV is a feature of the disclosure.

In high-speed horizontal flight, common axis 7 is orientated substantially horizontally with rotor modules 3, 5 together acting like a single counter-rotating propeller to pull rotary wing vehicle 1 in a horizontal direction 18. Wings 16, 17 help to lift lower section 6 and booster module 8 so that rotor modules 3 and 5 can apply more power to forward propulsion and less to vertical lifting.

It should also be noted that the current disclosure does not require aerodynamic control surfaces (such as on wings 16, 17) because cyclic control of rotor module 3, 5 provides control power for maneuvering in aircraft pitch (elevation) direction 144 and aircraft yaw (heading) direction 145 when common axis 7 is substantially horizontal. Airplane-style roll control (about common axis 7) during high-speed horizontal flight is accomplished though differential torque/speed of rotor modules 3, 5. This method of control for horizontal flight of a rotary-wing UAV is a feature of the illustrative embodiment.

Figures 18A, 18B:
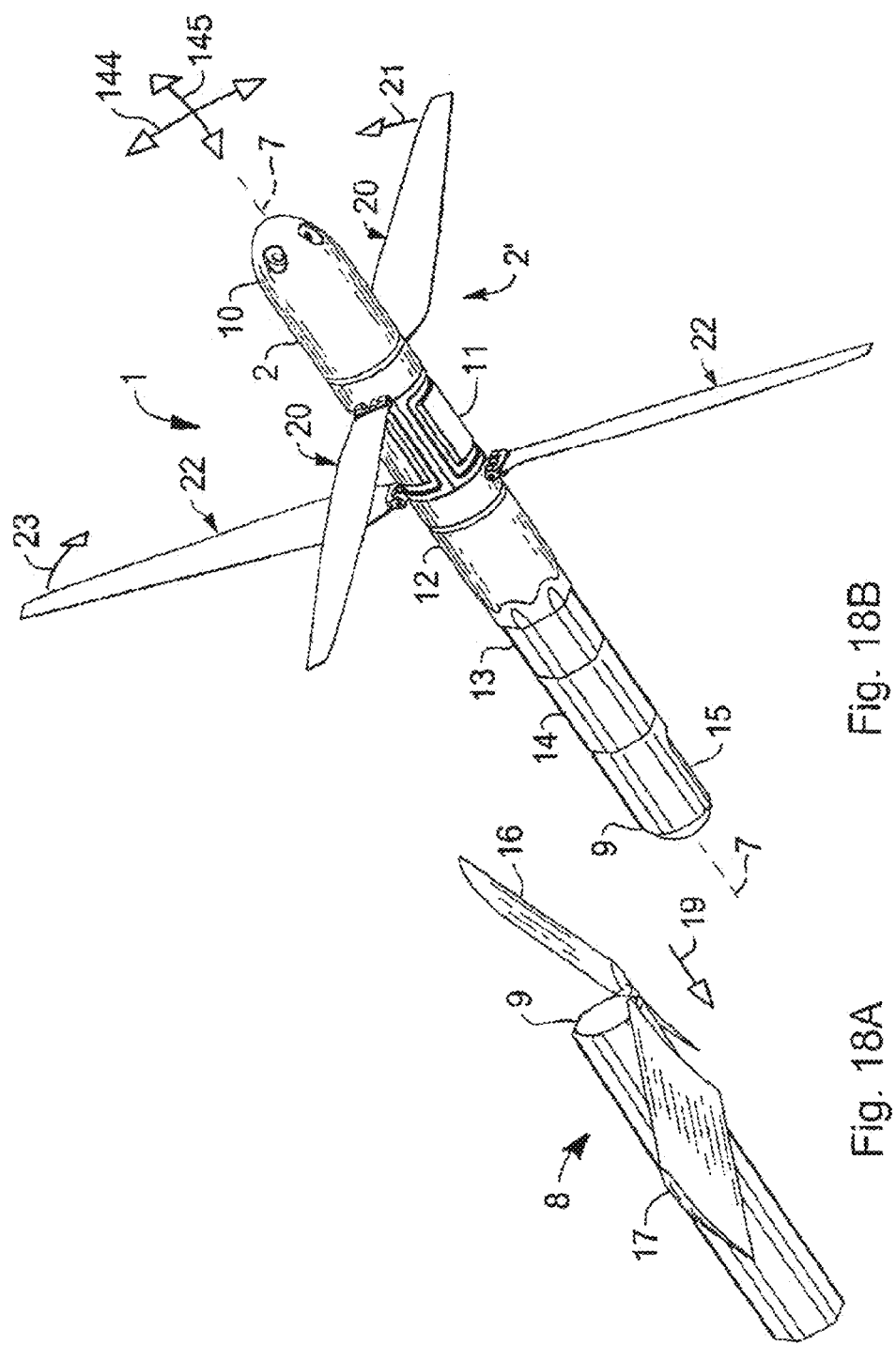
FIG. 18A is an orthographic view depicting a rotary wing vehicle in flight after separation from the booster module.
FIG. 18B is an orthographic view depicting the booster module after separation from the rotary wing vehicle of FIG. 18A.

Referring now to FIGS. 18A and 18B, when the energy of booster module 8 has been depleted, a command from on-board controller 55 of rotary wing vehicle 1 actuates a mechanism such as a latch (not shown) that separates booster module 8 from rotary wing vehicle 1 and booster module 8 falls away in direction 19. Rotary wing vehicle 1 then, in one flight mode, assumes a more vertical orientation and flies like a helicopter.

Figure 19:
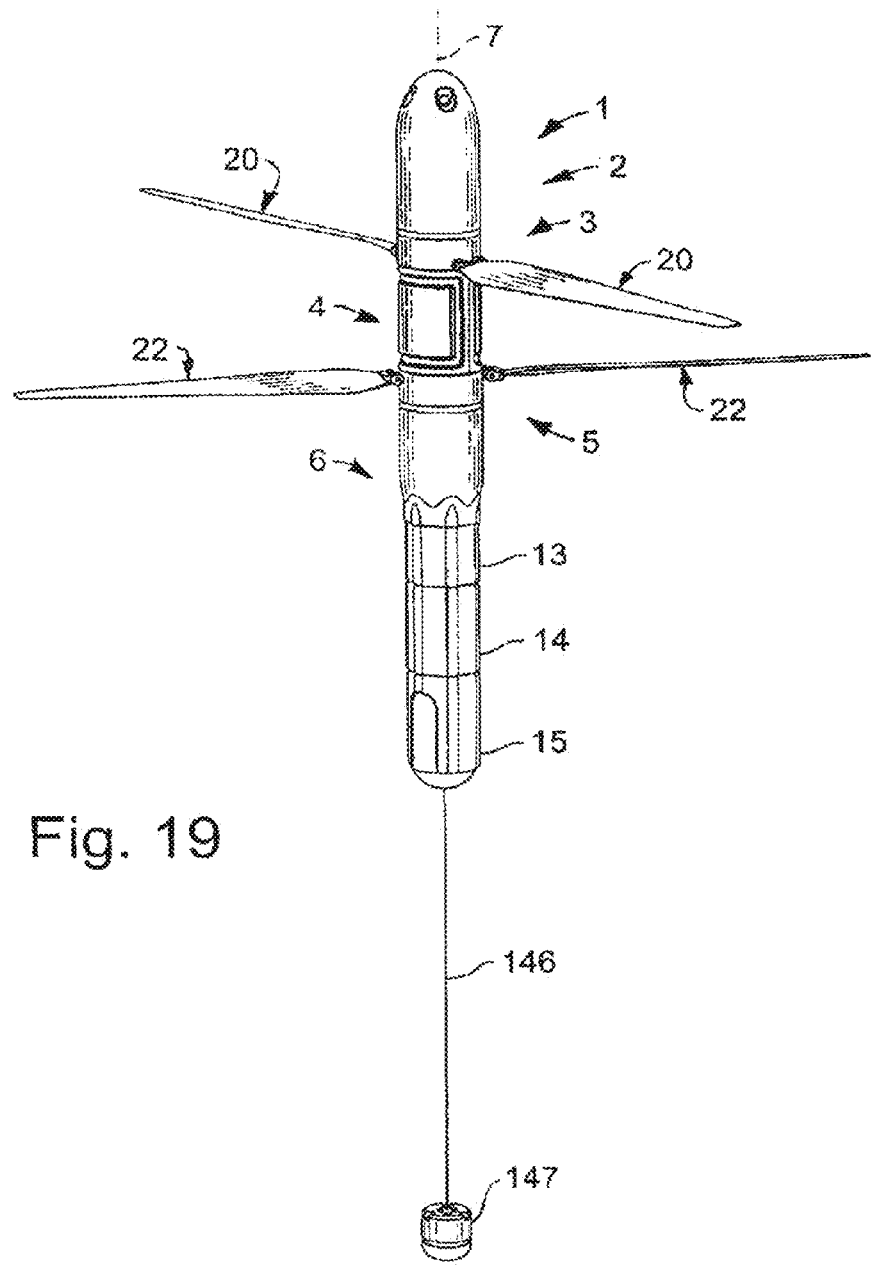
FIG. 19 is an elevation view of the rotary wing vehicle showing a dipping sonar or hydrophone assembly depending from a bottom portion of the vehicle.

In another embodiment, booster module 8 includes a mission-specific payload 147 such as an explosive munition, dipping sonar, hydrophones, radio ID marker, or a sonobouy. As illustrated in FIG. 19, upon separation from rotary wing vehicle 1, booster module 8 falls away leaving a sonar or hydroponic system 147 or other sensor connected to rotary wing vehicle 1 by wire or fiber optic cable 146 so that rotary wing vehicle 1 can move payload 147 from place to place, deliver payload 147 accurately to a desired location, and act as a telemetry link between payload 147 and a remote receiver (not shown). This can be an effective method of, for example, monitoring a target or marking a ship at sea with a remote radio ID marker or other marking instrument.

FIG. 22 illustrates a method of delivering a marker comprising, for example, a sensor, or a marking device, such as indelible paint or a radio transmitter, to a remote location, in this case a ship on an open ocean 157. Vehicle 1 is shown approaching ship S (in frame), maneuvering to touch ship S and leaving the marker on ship S (in frame) and exiting the area (in frame). This method of marking is a feature of the present disclosure that allows a point of interest to be monitored after vehicle 1 has left the local area. Alternatively or in conjunction, vehicle 1 can retain a sensor when it leaves the local area which may, for instance, have taken a sample of the atmosphere near ship S, and return the sensor and sample to a remote processing point for further analysis by a mass spectrometer, biological or radiological measuring device or other such device (not shown). While the point of interest shown in the drawings as a ship S, it will be understood that ship S could be any other point of interest accessible to vehicle 1 such as a truck, aircraft, building, tower, power line, or open area of land.

Another embodiment of the current disclosure shown in FIGS. 20A, 20B, and 20C, has unequal length folding, coaxial rotor blades 148, 149 with upper blades 148 having a greater span than lower blades 149. This is a feature arranged so that during a crash landing of vehicle when upper blades 148 contact the ground 155 before lower, shorter blades 149 so that upper blades 148 fold away from, or faster than, lower blades 149 thereby reducing the possibility that upper blades 148 and lower blades 149 will contact each other while still rotating at high speed. As shown in the drawings, lower blades 149 span about 20 to 22 inches (51 cm to 56 cm).

The ability to fold for compact storage and for landing is another feature of the current disclosure. As shown in FIGS. 21A and 21B, rotary wing vehicle 1 is compact enough to fit inside a standard A-size sonobouy tube used by the United States Navy. The unique core-tube structure of the current disclosure not only allows rotary wing vehicle 1 to be miniaturized to fit within a sonobouy tube, it also absorbs the forces of launch with a Charge Actuated Device (CAD) from an aircraft such as the Navy's P-3 maritime surveillance aircraft.

In one embodiment suggested in FIG. 21A, disposable launch canister 150 is provided to protect the aerodynamic surfaces of rotary wing vehicle 1 as it is launched from an aircraft traveling 150-250 knots at an altitude of 10,000 to 20,000 feet. A parachute (not shown) attached to canister 150 slows and stabilizes the descent of canister 150 which separates from rotary wing vehicle 1 at a lower altitude. Illustratively, rotary wing vehicle 1 is shown to scale and has a body length 30 of about 24 inches (51 cm), upper diameter 31 of about 2.25 inches (5.7 cm), upper rotor diameter 32 of about 28 inches (71 cm) and lower rotor diameter 33 of about 24 inches (61 cm) or less. Booster module 8 has a length 34 of about 12 inches (30 cm). First rotor 3 and second rotor 5 rotate at about 1400 RPM in hovering flight and at about or above 2000 RPM during vertical ascent and high-speed maneuvers.

Another embodiment contemplated by this disclosure is adapted for use with a munition for assessing target damage done by the munition. As shown in FIG. 23, vehicle 1 is adapted for use with the munition, illustratively shown in the drawings as a gravity-delivered bomb 160. Bomb 160 is dropped from a launch platform such as an aircraft. In operation, gravity-delivered bomb 160 transports vehicle 1 to the vicinity of a target site whereupon vehicle 1 is released to fall away from bomb 160, illustratively slowed by use of an auxiliary drag chute 162, or ejected from bomb 160 by an explosive charge-actuated device, before bomb 160 reaches its target. Vehicle 1 then orbits or hovers in the target area near the impact site to observe bomb damage and transmits video and other information to a remote operator (not shown). This method of munition damage assessment is a feature of the disclosure which provides immediate battle damage assessments without requiring a launch platform to remain in the strike zone and reduces the need for subsequent strikes against the same target while minimizing risk to human crew members.

As shown in FIG. 26, motors 54, 61 are positioned to lie between rotor blades 20, 22. Servo actuators 58, 59 are positioned to lie in spaced-apart relation to locate rotor blades 20, 22 therebetween.

In another illustrative embodiment motors 54, 61 are located below rotor blades 22 and rotating torque tube 254 runs inside non-rotating mast tube 253 for transmitting power to rotor 22 as shown, for example, in FIGS. 28-31. In another embodiment a gas engine (not shown) may be provided to generate electric power from a heavy fuel such as diesel fuel or JP8 to operate motors 54, 61. In yet another embodiment, a gas engine (not shown) may be connected to torque tube 254 and rotor mount 100 through a gearbox (not shown) to drive rotors blades 20, 22, also called rotors 20, 22, about common axis 7, also called rotor axis 7.

Torque tube 254 may be connected directly to upper rotor hub 270 as suggested in FIGS. 28 and 29 or to a belt or gear powered transmission and speed reduction system 271 provided at the upper end of mast tube 253 as suggested in FIGS. 29 and 30. Speed reduction system 271, also called transmission system 271, may be located at the upper end of mast tube 253 so that torque tube 254 may be configured for high-speed, low-torque operation. As a result, torque tube 254 may be of lower weight construction than a comparably sized main rotor shaft for a helicopter that must support the full flight loads of rotor hub 270 and upper rotor blades 20.

Referring to FIGS. 27-31, rotary wing vehicles 250, 251 contemplated by this disclosure include a streamlined body 260 and other features suitable for high-speed horizontal flight. Body 260 may be adapted in some embodiments to carry one or more human pilots or one or more passenger. Rotary wing vehicles 250, 251 include counter-rotating rotor blades 20, 22 rotatable about common axis 7, landing gear 261, streamlined mast shroud 257, pusher propeller 258, and stabilizing tail fins 259. Mast shroud 257 is generally airfoiled in cross section when viewed from above to reduce frontal drag. Mast shroud 257 is shown secured to body shell 11 and hence by screws 277 to body shell standoffs 86, 87, 88 which secure mast shroud 257 to mast tube 253 and prevent mast shroud 257 from rotating about common axis 7.

As described in FIGS. 28 and 29, a rotor module 264 includes upper rotor blades 20, lower rotor blades 22, rotor control assembly 255, rotor drive assembly 262, and mast assembly 252. Rotor control assembly 255 includes swashplates 56', 57', servos 58, 59, and pitch links 125, 126. Rotor drive assembly 262 includes motors 54, 61 with associated drive gears for driving rotors 20, 22 about rotor axis 7.

Mast assembly 252 includes torque tube 254 running inside mast tube 253 and supported by upper mast bearing 273 and lower mast bearing 274 as shown in FIG. 32. Mast assembly 252 is secured to body 260 by mast brackets 266, 267 and mast bolts 202.

Torque tube 254 is smaller in diameter than mast tube 253 leaving an annular space 275 running through the interior of mast tube 253 to act as a conduit for electrical wiring to servos 58, 59 and other electrical/electronic components. Wire slots 265, 269 are provided as entry and exits points for wiring, plumbing, and linkages (not shown). In one embodiment mast tube 253 is constructed of carbon fiber composite material and supports lateral flight loads produced by rotor blades 20, 22 and damps in-flight vibration of torque tube 254 especially at upper mast bearing 273. Torque tube 254 may be constructed from carbon fiber, aluminum, or steel and may support vertical flight loads in addition to torsion. Mast bearing 273, 274 may be configured to support axial as well as radial loads. Because mast tube 253 is generally rigid and non-rotating, mast assembly 252 may be stronger and produce less vibration than a rotor shaft on a conventional coaxial rotor helicopter which is generally unsupported by airframe structure above the lower rotor.

Referring now to FIGS. 33-36, a rotor control assembly 282 in accordance with one embodiment of the current disclosure includes upper swashplate 279, lower swashplate 280, servo actuators 284, 285, 286, servo ring mounts 288, 289 and three blade pitch Z-links 291. While Z-link 291 may be constructed as a single piece, it is shown in the drawings as an assembly of parts consisting of a generally rigid Z-link body 292 made of glass-filled nylon and two wear-resistant universal ball links 293, 294 made of a softer material such as unfilled nylon. Universal ball links 293, 294 fit into link recesses 299, 300 in Z-link body 292 and are attached by screws 295.

Simultaneous, uniform, axial displacement of all three Z-links 291 in rotor control assembly 282, also called swashplate control assembly 282, parallel to common axis 7 causes swashplate 279 and swashplate 280 to move axially along common axis 7 which displaces pitch links 119 thereby changing the collective pitch of rotor blades 20, 22 simultaneously. Non-uniform and independent axial displacement of Z-links 291 causes swashplates 279, 280 to tilt simultaneously inducing a cyclic pitch control in rotor blades 20, 22. Z-links 291 are also constrained to move parallel to common axis 7 by anti-rotation tabs 287 appended to ring mounts 288, 298 and act as swashplate anti-rotation links.

Z-link body 292 is configured to hold universal ball links 293, 294 at a fixed differential phase angle 290 so that non-uniform axial displacement of Z-links 291 parallel to common axis 7 in direction 298 causes swashplate 279 and swashplate 280 to tilt in different directions which affects the relative cyclic phase angle of rotor blades 20 and 22. Differential phase angle 290 is shown as 90 degrees but may lie between about 60 to about 120 degrees depending on the characteristics of rotor blades 20, 22 and their speed of rotation. Differential phase angle 290 may be changed by varying the length of universal ball links 293, 294.

Z-link 291 aligns the cyclic phase angles of upper rotor blades 20 and lower rotor blades 22. Rotor phase angle can be described as the angle measured between the cyclic pitch control input of a swashplate to a rotor system of rotating rotor blades and the resulting flapping motion of the rotor blades and apparent tilt of the rotor disk. Normally the phase angle of a single rotor helicopter is close to 90 degrees.

Because of the aerodynamic interaction of the upper and lower blades on a coaxial rotor helicopter, however, the rotor phase response of each rotor on a coaxial rotor helicopter is much different than 90 degrees. For instance as illustrated in FIG. 37, if upper swashplate 279 and lower swashplate 280 are tilted forward in direction 297, upper rotor blades 20 will appear to tilt in upper rotor phase direction 302 and lower rotor blades 22 will appear to tilt in lower rotor phase direction 303 which means that the absolute upper and lower rotor phase angles are each about 45 degrees. The phase angle difference 304 therefore is about 90 degrees. When upper swashplate 279 and lower swashplate 280 are each rotated 45 degrees about common axis 7 by the fixed differential phase angle 290 of Z-links 291 before being tilted then upper rotor blades 20 and lower rotor blades 22 will both appear to tilt in direction 297. At this point upper rotor blades 20 and lower rotor blades 22 are said to be in phase with each other. Rotors that react in phase with each other produce powerful control forces.

As illustrated in FIGS. 38 and 39, a rotary wing vehicle according to the current disclosure includes a streamlined fuselage or body 260, a rotorcraft power and control system 306, a co-axial, counter-rotating rotor system 307 capable of producing vertical lift and a rearward facing propeller 258 capable of producing horizontal thrust.

In operation, power from a motor or engine 309 turns first stage pinion gear 311 which turns crown gear 312,313 in opposite directions as described in FIGS. 38 and 39. Crown gear 312 is connected by a transfer shaft to second stage pinion 314 which drives lower rotor main gear 316 and lower rotors 22. Crown gear 313 is connected by a transfer shaft to second stage pinion 315 which drives upper rotor main gear 317, torque tube 254 inside mast 319 and upper rotors 20. A belt drive system consisting of pulleys 321,322 and V-belt 323 drive propeller shaft 324 from the aft end of motor 309.

As illustrated in FIG. 40, a non-rotating structural mast 319 according to the current disclosure is configured with interior passageways or conduits 325 to accommodate both mechanical and electrical power and signal transmission components. Mast 319 may include center column 326 and outer sheath 327 which are generally circular in cross section and connected by radially extending ribs 328 which function to both separate and stiffen center column 326 and outer sheath 327. In operation torque tube 254 runs between bearings 273, 274 (see FIG. 32) inside center column 326 to transmit rotary motion from a power source located below mast 319 to rotor blades 20 located near the upper end 318 of mast 319. Bearings 273, 274 act to align mast inside of center column 326 and prevent torque tube 254 from bending or touching the interior surface of center column 326. Torque tube 254 is mechanically separated from wiring, plumbing, hoses and linkages (not shown) which are located between center column 326 and outer sheath 327 in interior conduits 325. In essence, center column 326, outer sheath 327 and ribs 328 form a plurality of signal and power conduits which effectively separate mechanical, electrical and fluidic power and signal lines running inside mast 319.

Referring now to FIG. 41-43, a non-rotating structural mast 330 according to the current disclosure is configured with six interior passageways 331 to accommodate swashplate linkages 332 that transfer mechanical control signals from servos actuators (not shown) located below lower rotors 22 to swashplates 279, 280. Mast 330 may include center column 333 and outer sheath 334 which may be generally circular in cross section and connected by radially extending ribs 335 which function to both separate and stiffen center column 333 and outer sheath 334. In operation torque tube 254 runs inside center column 326 to transmit rotary motion from a power source located below rotor blades 22 to rotor blades 20 located near the upper end 336 of mast 330.

Apertures or slots 342 may be provided in outer sheath 334 to accommodate entry and exit of wiring, plumbing, hoses (not shown) and swashplate linkages 332. A feature of the current disclosure is that ribs 335 and center column 33 act to transmit structural loads around apertures 342 thereby improving the structural integrity of mast 330 especially when many power and signal lines are routed through mast 330 and much of outer sheath 334 is perforated by slots or holes. Another feature is that apertures 342 may extend completely to an end 337 of mast 330 to allow removal of mast 330 from an aircraft during maintenance operations. In one embodiment, power and signal lines running inside mast 330 may be removed and reinstalled without first removing plugs and connectors that may not easily fit through interior passageways 331 thereby reducing maintenance costs. Yet another feature of the current disclosure is that mast 330 may be economically manufactured, for instance, in an extrusion process from aluminum alloy 7075 or in a pulltrusion process from epoxy impregnated carbon fibers for low weight and high strength.

As shown in FIGS. 44A and 44B, each swashplate linkage 332 may be assembled from lower slider 338, upper slider 339, slider pushrod 340 and pitch control link 341. Lower sliders 338 may be connected to a servo actuator (not shown) to move swashplate linkages 332 axially inside interior passageway 331 of mast 330. Upper sliders 339 are pivotably connected to pitch control links 341 which transmits axial motion of swashplate linkages 332, also called swashplate sliders 332, to swasplates 279,280. Slider pushrod 340 is shown with threaded ends and rigidly connects upper slider 339 and lower slider 338 to move as a unit.

Three servo actuators (not shown) connected to lower sliders 338 may cooperate to move three swashplate linkages 332 to control upper swashplate 279 and the cyclic and collective pitch of rotor blades 20. Three additional servo actuators (not shown) connected to lower sliders 338 may cooperate to move three swashplate linkages 332 to control lower swashplate 280 and the cyclic and collective pitch of rotor blades 22. While shown in the drawings with pitch control link 341, swashplate linkages 332 may also incorporate Z-link 291 in place of pitch control link 341 in which case only three servos would be needed to control the cyclic and collective pitch of both rotor blades 20, 22.

As illustrated in FIGS. 45 and 46, a rotary wing vehicle 350 in accordance with the present disclosure includes a streamlined fuselage or body 351, a co-axial, counter-rotating rotor system with counter-rotating rotor blades (not shown) capable of producing vertical lift and a rearward facing propeller 353 capable of producing horizontal thrust. A non-rotating backbone or mast 330 supports a plurality of rotary output servo actuators 354 located behind mast 330 and a plurality of rotary output servo actuators 355 located in front of mast 330. Servo actuators 354, 355 are configured to lie in close proximity to a longitudinally extending plane defined by common axis 7 and longitudinal axis 356 to reduce the forward-facing surface area of the servo actuators 354, 355 in high-speed forward flight. This reduces the width of a shroud (not shown but similar to shroud 257 in FIG. 27 and shroud 368 shown in FIG. 48) needed to cover servo actuators 354, 355 and minimize aerodynamic drag in high speed forward flight. Bolt holes 357, as shown in FIG. 46, are provided to mount a streamlined mast shroud such as shroud 257. One feature of the current disclosure is that control system components such as servo actuators 354, 355 are located in front of and behind mast 330 to minimize the width of the mast assembly to reduce drag in forward flight.

Another embodiment of a rotary wing vehicle 360 is shown, for example in FIGS. 47-57. Rotary wing vehicle 360 includes a streamlined fuselage or body 361, a co-axial, counter-rotating rotor system with counter-rotating rotor blades 362, 375 capable of producing vertical lift and a rearward facing propeller 353 capable of producing horizontal thrust. A non-rotating mast 364 supports mast sleeve 366 and a plurality of linear (screwtype) servo actuators 365. In one example, the linear (screwtype) servo actuators 365 may be Moog model 880 Electric Linear Servo Actuators that are mounted thereto by brackets or arms protruding therefrom. Servo actuators 365 are configured to lie in close proximity to a longitudinally extending plane defined by common axis 7 and longitudinal axis 367 to reduce the width and aerodynamic drag of mast shroud 368 in high-speed forward flight. Engine 363, which may be a GE T700 turboshaft engine for example, is provided to turn upper rotor 362 about common axis 7 through gearbox 369, upper rotor drive gear 370 and upper rotor torque tube 379, and to turn lower rotor 375 through gearbox 369 and lower rotor drive gear 371 attached to lower rotor shaft 380.

A feature of the current disclosure is that non-rotating mast 364 may support aircraft components inside of mast shroud 368 to take advantage of the air wake produced by mast shroud 368 in high-speed forward flight. Electronic or hydraulic components 372, including, for example, hydraulic motors and hydraulic valves, and antennae 373 may be supported by non-rotating bracket 374 in some embodiments. This reduces the need for space inside the body 361, also called fuselage 361, of rotary wing vehicle 360 and places electronic or hydraulic components closer to servo actuators 365.

Non-rotating mast 364 may be fabricated from a metal or carbon fiber composite material and include channels 376 extending axially along an exterior surface of mast 364 to accommodate electrical bus inlays 378 as suggested in FIGS. 50-52. Electrical bus inlays 378 extends from a point 390 between upper and lower rotors 362, 375 to a point 391 below the lower rotor 375 and between upper rotor drive gear 370 and lower rotor drive gear 371 to facilitate transmission of electrical and/or hydraulic power and signals from components located in fuselage 361 of rotary wing vehicle 360 to other components located between upper rotor 362 and lower rotor 375 or above the upper rotor 362. Electrical bus inlays 378 may include a protective sheath made of a non-conducting material such as silicone and contain a plurality of copper conductors or hoses 382. In one embodiment mast sleeve 366 slides over mast 364 to provide a mounting structure for servo actuators 365 and bracket 374 and a smooth exterior running surface for swashplates 384,385. Apertures 387 may be provided in mast sleeve 366 to provide access to copper conductors or hoses 382 for electrical or hydraulic connections (not shown) to other components such as servo actuators 365 and flight control system electronics (not shown). In operation a plurality of electrical wires and/or hydraulic hoses (not show for clarity) may connect to bus inlays 378 at copper conductors or hoses 382 to transmit electrical or hydraulic power and signals to and from other control system components such as a flight management system computer (not shown), servo drivers (not shown), hydraulic motor 372, hydraulic values (not shown), and generators (not shown). A sturdy truss structure 388 may be provided to connect mast 364 to fuselage 361 of rotary wing vehicle 360.

An important feature of the current disclosure is the reduction of aerodynamic drag in high-speed flight. To reduce the width and associated drag of mast shroud 368, swashplates 384 and 385 are configured to locate all six servo actuators 365 in close proximity to a longitudinally extending plane defined by common axis 7 and longitudinal axis 367 as illustrated in FIG. 53. Swashplate arms 392 and 393 are closer to each other than arms 393 and 394. As shown in FIG. 54, angle 395 is about 90 degrees or less. Swashplates 384 and 385 are also rotated 180 degrees relative to each other about common axis 7 so that servo actuators 365 may be interleaved around the circumference of mast sleeve 366 for a very compact installation.

One feature of the disclosure is the non-rotating hollow core tube 40, mast 330, 364 or cruciform beam structural backbone that can, in some embodiments, double as a conduit for wiring and plumbing. A method or system of assembling mechanical and electrical components to the core or backbone is described to promote ease of assembly of a variety of aircraft from a kit of basic modules.

Another feature is that each of the rotors 20, 22 of the coaxial system of the current disclosure are driven by one or more separate electric motors, and the motors are positioned to lie on opposites sides of the rotors, with power transmission to and between the motors accomplished through electrical wiring (passing through the hollow core) instead of mechanical shafting, clutches, and gears. Compact rotor assemblies support the rotors for rotation without the need for traditional rotating coaxial shafting.

Still another feature is that a swashplate control system and one or more electric motors may be provided for each rotor and may be positioned to lie on opposite sides of each rotor thereby simplifying the mechanical and electrical connections needed to drive and control the rotors. Rotor modules are provided to quickly and easily assemble systems of rotors to the hollow core. Multiple rotor modules and swashplates are controlled by a single group of servos housed in a module.

Another feature of the disclosure is the provision of phase links to produce differential phase control of the upper and lower rotors simultaneously. In some embodiments, fixed-phase links can provide collective and cyclic control of both rotors with only three rotor control servos instead of the four to six servos generally required for coaxial rotor control.

Another feature is that full collective and cyclic control of the upper and lower rotor blades of a coaxial helicopter can be accomplished with servo actuators located below the lower rotor so that the axial distance between the upper and lower blades can be minimized.

Another feature is that a streamlined, non-rotating body shell may be mounted between the upper and lower rotor blades of a coaxial helicopter to reduce drag in high-speed forward flight.

Yet another feature of one embodiment is that power and control signals may be passed from a point located below the lower rotor blades to a point located between the rotor blades to facilitate locating the rotor control system, radio electronics, antennae, and other electrical and control system components between the rotor blades to make productive use of the space between and the blades in high speed forward flight.

Yet another feature of one embodiment is that upper rotor blades 20 may be driven by a torque tube 254 running inside the mast tube 253 and connected to a motor 54 or engine located below rotor blades 22. Both upper and lower rotors may be driven by a single gas-powered engine located below the rotors if desired.

An additional feature is that folding rotor blades 148, 149 are of unequal length. On the current disclosure with counter-rotating rotors 3, 5, folding blades 148, 149 of unequal length reduce the chance that the blades will contact one another as they fold at high speed during a crash-landing.

Another feature is that a mounting structure is provided between counter-rotating rotors 20, 22 to support a body shell 11 or other type of aerodynamic fairing between rotor blades 20, 22. Body shell 11 protects the control assembly 255 from weather and reduces the air resistance of exposed servos 58, 59, swashplates 56', 57', and pitch links 125, 126, also called pushrods 125, 126.

Another feature of the disclosure is a method of improving energy and power density on UAV's which can include a booster module 8 which is separable from the main vehicle in flight. A booster module 8 is provided to operate the UAV during a first flight phase. At the end of the first flight phase, the booster module falls away thereby reducing the weight of the UAV for continued operation in a second flight phase. On electric powered UAV's, the power module may comprise a pack of batteries with or without an auxiliary lifting surface which is jettisoned in flight after the battery power is depleted, or payloads specific to a particular mission.

The invention claimed is:

1. A rotary wing aircraft comprising
a first variable pitch rotor blade supported for rotation about a common rotor axis of rotation in a first rotor plane of rotation,
a second variable pitch rotor blade supported for rotation about the common rotor axis of rotation in a second rotor plane of rotation,
a first blade pitch controller located between the first rotor plane of rotation and the second rotor plane of rotation and configured to control a pitch of the first rotor blade,
a second blade pitch controller located between the first rotor plane of rotation and the second rotor plane of rotation and configured to control a pitch of the second rotor blades,
a first pitch control linkage having a first end coupled to the first blade pitch controller and a second end coupled to the second blade pitch controller so that displacement of the first pitch control linkage operates both the first blade pitch controller and second blade pitch controller at the same time, and
a first servo actuator located between the first rotor plane of rotation and the second rotor plane of rotation and coupled to the first pitch control linkage to operate the first pitch control linkage.

2. The rotary wing aircraft of claim 1, wherein displacement of the first pitch control linkage causes the first blade pitch controller to vary a cyclic pitch of the first rotor blade and causes the second blade pitch controller to vary a cyclic pitch of the second rotor blade.

3. A rotary wing aircraft comprising
a first variable pitch rotor blade supported for rotation about a common rotor axis of rotation in a first rotor plane of rotation,
a second variable pitch rotor blade supported for rotation about the common rotor axis of rotation in a second rotor plane of rotation,
a first blade pitch controller located between the first rotor plane of rotation and the second rotor plane of rotation and configured to control a pitch of the first rotor blade,
a second blade pitch controller located between the first rotor plane of rotation and the second rotor plane of rotation and configured to control a pitch of the second rotor blades, and
a first pitch control linkage having a first end coupled to the first blade pitch controller and a second end coupled to the second blade pitch controller so that displacement of the first pitch control linkage operates both the first blade pitch controller and second blade pitch controller at the same time,
wherein the first pitch control linkage is configured to tilt the first and second blade pitch controllers in different directions.

4. The rotary wing aircraft of claim 3, wherein the first pitch control linkage is a Z-link and the first end and second end cooperate to hold the first blade pitch controller and second blade pitch controller at a fixed-phase angle relative to each other.

5. The rotary wing aircraft of claim 3, wherein a fixed phase angle between a first blade pitch controller tilt axis and a second blade pitch controller tilt axis is between about 60 degrees and 120 degrees.

6. A rotary wing aircraft comprising
a first variable pitch rotor blade supported for rotation about a common rotor axis of rotation in a first rotor plane of rotation,
a second variable pitch rotor blade supported for rotation about the common rotor axis of rotation in a second rotor plane of rotation,
a first blade pitch controller located between the first rotor plane of rotation and the second rotor plane of rotation and configured to control a pitch of the first rotor blade,
a second blade pitch controller located between the first rotor plane of rotation and the second rotor plane of rotation and configured to control a pitch of the second rotor blades,
a first pitch control linkage having a first end coupled to the first blade pitch controller and a second end coupled to the second blade pitch controller so that displacement of the first pitch control linkage operates both the first blade pitch controller and second blade pitch controller at the same time, and
a second pitch control linkage interconnecting the first blade pitch controller and the second blade pitch controller to form a system of common pitch control linkages and the system of common pitch control linkages cooperate to control the cyclic pitch of the first and second rotor blades and a collective pitch of the first and second rotor blades.

7. A rotary wing aircraft comprising
a first variable pitch rotor blade supported for rotation about a common rotor axis of rotation in a first rotor plane of rotation,
a second variable pitch rotor blade supported for rotation about the common rotor axis of rotation in a second rotor plane of rotation,
a first blade pitch controller located between the first rotor plane of rotation and the second rotor plane of rotation and configured to control a pitch of the first rotor blade,
a second blade pitch controller located between the first rotor plane of rotation and the second rotor plane of rotation and configured to control a pitch of the second rotor blades, and
a first pitch control linkage having a first end coupled to the first blade pitch controller and a second end coupled to the second blade pitch controller so that displacement of the first pitch control linkage operates both the first blade pitch controller and second blade pitch controller at the same time,
wherein displacement of the first pitch control linkage causes the first blade pitch controller to operate along a first cyclic phase angle to vary the cyclic pitch of the first rotor blade and causes the second blade pitch controller to operate along a second cyclic phase angle to vary the cyclic pitch of the second rotor blade and the first cyclic phase angle of the first blade pitch controller is different from the second cyclic phase angle of the second blade pitch controller.

8. A rotary wing aircraft comprising
a first variable pitch rotor blade supported for rotation about a common rotor axis of rotation in a first rotor plane of rotation,
a second variable pitch rotor blade supported for rotation about the common rotor axis of rotation in a second rotor plane of rotation,
a first blade pitch controller located between the first rotor plane of rotation and the second rotor plane of rotation and configured to control a pitch of the first rotor blade, a second blade pitch controller located between the first rotor plane of rotation and the second rotor plane of rotation and configured to control a pitch of the second rotor blades, and a first pitch control linkage having a first end coupled to the first blade pitch controller and a second end coupled to the second blade pitch controller so that displacement of the first pitch control linkage operates both the first blade pitch controller and second blade pitch controller at the same time, wherein the first pitch control linkage acts as an anti-rotation linkage and blocks the first and second blade pitch controllers from rotating about the common rotor axis of rotation.

9. A rotary wing aircraft comprising a non-rotating structural backbone, a first rotor system coupled to the non-rotating structural backbone and including a first variable pitch rotor blade supported for rotation in a first rotor plane of rotation about an axis of rotation and a first blade pitch controller, a second rotor system coupled to the non-rotating structural backbone and including a second variable pitch rotor blade supported for rotation in a second rotor plane of rotation about the axis of rotation and a second blade pitch controller, and a first pitch linkage interconnecting the first blade pitch controller to the second blade pitch controller, and a first servo actuator coupled to the non-rotating structural backbone and located between the first and second rotor planes of rotation, wherein the first blade pitch controller and the second blade pitch controller are positioned to lie between the first rotor plane and second rotor plane in axially spaced-apart relation to one another and displacement of the first pitch linkage operates the first blade pitch controller and second blade pitch controller simultaneously.

10. A rotary wing aircraft comprising a non-rotating structural backbone, a first rotor system coupled to the non-rotating structural backbone and including a first variable pitch rotor blade supported for rotation in a first rotor plane of rotation about an axis of rotation and a first blade pitch controller, a second rotor system coupled to the non-rotating structural backbone and including a second variable pitch rotor blade supported for rotation in a second rotor plane of rotation about the axis of rotation and a second blade pitch controller, and a first pitch linkage interconnecting the first blade pitch controller to the second blade pitch controller, and an aerodynamic body shell supported by the non-rotating structural backbone and surrounding and the first pitch control linkage to minimize air resistance of the rotary wing aircraft.

11. A rotary wing aircraft comprising a first variable pitch rotor blade supported for rotation about a common rotor axis of rotation in a first rotor plane of rotation and the first variable pitch rotor blade includes cyclic pitch control, a second variable pitch rotor blade supported for rotation about the common rotor axis of rotation in a second rotor plane of rotation and the second variable pitch rotor blade includes cyclic pitch control, a first servo actuator located between the first rotor plane of rotation and the second rotor plane of rotation and configured to vary a pitch of the first rotor blade, and a non-rotating structural backbone formed to include a hollow interior extending along the common rotor axis of rotation through the second rotor plane of rotation and the first servo actuator is coupled to the non-rotating structural backbone, a first blade pitch controller located between the first rotor plane of rotation and the second rotor plane of rotation for controlling a pitch of the first rotor blade and the first servo actuator is coupled to the first blade pitch controller by a first pitch linkage, and an aerodynamic body shell coupled to the non-rotating structural backbone and arranged to surround the non-rotating structural backbone between the first rotor plane of rotation and the second rotor plane of rotation.

12. The rotary wing aircraft of claim 11, further comprising a power source located below the second rotor plane of rotation and configured to provide power to drive the first variable pitch rotor blade and the power is transmitted through the non-rotating structural backbone.

13. The rotary wing aircraft of claim 11, further comprising a power source located below the second rotor plane of rotation and configured to provide power to the first servo actuator and the power is transmitted through the non-rotation structural backbone.

14. The rotary wing aircraft of claim 11, further comprising a second blade pitch controller configured to vary a pitch of the second variable pitch rotor blade and a second servo actuator supported by the non-rotating structural backbone between the first rotor plane of rotation and the second rotor plane of rotation and coupled to the second blade pitch controller by a second pitch linkage and wherein the second variable pitch rotor blade includes cyclic pitch control and the first servo actuator and the second servo actuator cooperate to vary the pitch of the first and second rotor blades.

15. The rotary wing aircraft of claim 11, further comprising a second servo actuator coupled to the non-rotating structural backbone between the first rotor plane of rotation and the second rotor plane of rotation and a second pitch linkage interconnecting the second servo actuator and the second blade pitch controller to vary a pitch of the second rotor blade.

16. The rotary wing aircraft of claim 11, wherein the non-rotating structural backbone supports the first variable pitch rotor blade for rotation about the common rotor axis of rotation.

17. The rotary wing aircraft of claim 11, wherein power to drive the first variable pitch rotor blade about the common rotor axis of rotation is transmitted through the hollow interior of the non-rotating structural backbone.

18. The rotary wing aircraft of claim 11, further comprising a second blade pitch controller located between the first rotor plane of rotation and the second rotor plane of rotation and configured to control a pitch of the second rotor blade and the first pitch control linkage is coupled to the second blade pitch controller to cause the pitch of the first rotor blade and second rotor blade to be varied simultaneously.

19. The rotary wing aircraft of claim 11, wherein the aerodynamic body shell is fixed to the non-rotating structural backbone and is non-rotatable about the common rotor axis of rotation.

20. The rotary wing aircraft of claim 11, wherein the aerodynamic body shell is configured to reduce drag of the rotary wing aircraft in high speed flight.

21. The rotary wing aircraft of claim 11, further including a rearward facing propeller capable of creating a horizontal thrust force to push the rotary wing aircraft horizontally.

22. The rotary wing aircraft of claim 21, wherein the aerodynamic body shell is configured to reduce drag of the rotary wing aircraft in high speed flight.

23. A rotary wing aircraft comprising
a non-rotating structural backbone formed to include an interior space therein,
a first variable pitch rotor blade supported for rotation about a rotor axis of rotation in a first rotor plane of rotation and a first swashplate connected to the non-rotating structural backbone for controlling a cyclic pitch of the first rotor blade,
a second variable pitch rotor blade supported for rotation about the rotor axis of rotation in a second rotor plane of rotation and a second swashplate connected to the non-rotating structural backbone for controlling a cyclic pitch of the second rotor blade,
a power module located below the second rotor plane of rotation and configured to provide power to drive the first variable pitch rotor blade about the rotor axis of rotation, and
a first motor located below the second variable pitch rotor blade and coupled to the first variable pitch rotor blades by a rotating torque tube and the rotating torque tube is arranged to extend through the interior space of the non-rotating structural backbone,
wherein the power is transmitted through the interior space, the non-rotating structural backbone supports a majority of flight loads of the first variable pitch rotor blade and the rotating torque tube transmits rotational motion to drive the first variable pitch rotor blade about the rotor axis of rotation.

24. The rotary wing aircraft of claim 23, wherein the rotating torque tube is supported adjacent to the first variable pitch rotor blades by the non-rotating structural backbone.

25. The rotary wing aircraft of claim 23, wherein the non-rotating structural backbone supports horizontal flight loads generated by the first variable pitch rotor blade and stabilizes the rotation of the first variable pitch rotor blade about the rotor axis of rotation.

26. The rotary wing aircraft of claim 23, wherein the non-rotating structural backbone supports vertical flight loads generated by the first variable pitch rotor blade.

27. The rotary wing aircraft of claim 23, wherein the rotating torque tube supports vertical flight loads generated by the first variable pitch rotor blade.

28. The rotary wing aircraft of claim 23, further including a rearward facing propeller capable of creating a horizontal thrust force to push the rotary wing aircraft horizontally.

29. The rotary wing aircraft of claim 23, further including an aerodynamic body shell coupled to the non-rotating structural backbone and arranged to surround the non-rotating structural backbone between the first rotor plane of rotation and the second rotor plane of rotation and configured to reduce drag of the rotary wing aircraft in high speed flight.

30. A rotary wing aircraft comprising
a non-rotating structural backbone formed to include a space therein,
a first variable pitch rotor blade supported for rotation about a rotor axis of rotation in a first rotor plane of rotation and a first swashplate connected to the non-rotating structural backbone for controlling a cyclic pitch of the first variable pitch rotor blades,
a second variable pitch rotor blade supported for rotation about the rotor axis of rotation in a second rotor plane of rotation and a second swashplate connected to the non-rotating structural backbone for controlling a cyclic pitch of the second variable pitch rotor blades, and
a first motor located below the second rotor plane of rotation and coupled to the first variable pitch rotor blade to drive the first variable pitch rotor blade about the rotor axis of rotation, and
a second motor located below the second rotor plane of rotation and coupled to the second variable pitch rotor blade to drive the second variable pitch rotor blade about the rotor axis of rotation,
wherein power to drive the first variable pitch rotor blade about the rotor axis of rotation is transmitted from the first motor to the first variable pitch rotor blade by a rotating torque tube located in the space formed in the non-rotating structural backbone.

31. A rotary wing aircraft comprising
a non-rotating structural backbone formed to include a space therein,
a first variable pitch rotor blade supported for rotation about a rotor axis of rotation in a first rotor plane of rotation and a first swashplate connected to the non-rotating structural backbone for controlling a cyclic pitch of the first variable pitch rotor blades,
a second variable pitch rotor blade supported for rotation about the rotor axis of rotation in a second rotor plane of rotation and a second swashplate connected to the non-rotating structural backbone for controlling a cyclic pitch of the second variable pitch rotor blades, and
a first motor located below the second rotor plane of rotation and coupled to the first variable pitch rotor blade to drive the first variable pitch rotor blade about the rotor axis of rotation, and
a speed reduction system located adjacent to an upper end of the non-rotating structural backbone and arranged to interconnect the first variable pitch rotor blade and the torque tube,
wherein power to drive the first variable pitch rotor blade about the rotor axis of rotation is transmitted from the first motor to the first variable pitch rotor blade by a rotating torque tube located in the space formed in the non-rotating structural backbone.

32. The rotary wing aircraft of claim 31, further comprising an aircraft fuselage coupled to a lower end of the non-rotating structural backbone.

33. The rotary wing aircraft of claim 31, wherein the non-rotating structural backbone supports flight loads generated by the first variable pitch rotor blade and stabilizes the rotation of the first variable pitch rotor blade about the rotor axis of rotation.

34. A rotary wing aircraft comprising
a non-rotating structural backbone or mast extending in parallel relation to a rotor axis of rotation,
first variable pitch rotor blades supported for rotation about the rotor axis of rotation in a first rotor plane of rotation,
second variable pitch rotor blades supported for rotation about the rotor axis of rotation in a second rotor plane of rotation,
a first swashplate located between the first rotor plane of rotation and the second rotor plane of rotation for controlling the pitch of the first variable pitch rotor blades, a second swashplate located between the first rotor plane of rotation and the second rotor plane of rotation for controlling the pitch of the second variable pitch rotor blades, a plurality of first pitch control linkages coupled to the first swashplate so that displacement of the first pitch control linkages operates the first swashplate, a plurality of second pitch control linkages coupled to the second swashplate so that displacement of the second pitch control linkage operates the second swashplate, wherein the first swashplate and second swashplate are rotated about the rotor axis of rotation relative to each other by an angle so that the first control linkages and the second control linkages are interleaved around the circumference of the non-rotating backbone or mast and alternately connected to the first swashplate and the second swashplate thereby forming a compact installation.

35. The rotary wing aircraft of claim 34 further including servo actuators attached to linkages and the servo actuators are configured to lie adjacent to a longitudinally extending plane defined by the rotor axis of rotation and a longitudinal axis to reduce the forward facing surface area of the servo actuators and minimize aerodynamic drag of the rotary wing aircraft in high-speed forward flight.

36. The rotary wing aircraft of claim 35 further including a motor located below the second variable pitch rotor blades and a torque tube running inside the non-rotating backbone or mast for transmitting power between the motor and first rotor blades.

37. The rotary wing aircraft of claim 34 further including a streamlined mast shroud supported by the non-rotating backbone or mast and covering the servo actuators to minimize aerodynamic drag of the rotary wing aircraft in high-speed forward flight.

38. The rotary wing aircraft of claim 34 further including servo actuators located at a lower end of the non-rotating backbone or mast and pushrods connecting the servo actuators to the pitch control linkages, wherein the non-rotating backbone or mast is configured with internal passageways or conduits receptive to pushrods and operation of the pushrods within the internal passageways or conduits actuates the pitch control linkages and at least one of the first swashplate and the second swashplate.

39. The rotary wing aircraft of claim 34 further including a Z-link body and the Z-link body holds a first pitch control linkage in fixed relation to a second control linkage to form a Z-link and displacement of the Z-link parallel to axis of rotation operates first swashplate and second swashplate simultaneously.

40. The rotary wing aircraft of claim 39 wherein displacement of the Z-link parallel to axis of rotation causes first swashplate and second swashplate to simultaneously tilt in different directions separated by a differential phase angle of about 90 to 120 degrees to induce first variable pitch rotor blades and second variable pitch rotor blades to operate in phase with each other and produce power control forces.

41. The rotary wing aircraft of claim 34 further including servo actuators and the servo actuators are linear screwtype actuators each having a first end coupled to the non-rotating backbone or mast and a second end coupled to at least one of the first and second pitch control linkages for actuating at least one of the first swashplate and the second swashplate.

42. The rotary wing aircraft of claim 34, wherein the first swashplate and the second swashplate each include three swashplate arms and two of the swashplate arms of each of the first and second swashplates are located closer to each other than to the remaining swashplate arm of the respective swashplate to reduce the forward facing width of first swashplate and second swashplate and reduce aerodynamic drag in high-speed flight.

43. The rotary wing aircraft of claim 42, wherein the first swashplate and the second swashplate are rotated 180 degrees about the rotor axis of rotation.

44. The rotary wing aircraft of claim 34, further including a rearward facing propeller capable of creating a horizontal thrust force to push the rotary wing aircraft horizontally.

45. The rotary wing aircraft of claim 34, further including an aerodynamic body shell coupled to the non-rotating structural backbone or mast and arranged to surround the non-rotating structural backbone or mast between the first rotor plane of rotation and the second rotor plane of rotation and configured to reduce drag of the rotary wing aircraft in high-speed flight.

* * * * *